(12) United States Patent
Suzuki et al.

(10) Patent No.: US 10,909,435 B2
(45) Date of Patent: Feb. 2, 2021

(54) APPARATUS FOR MANAGING BAGGAGE, A METHOD FOR MANAGING BAGGAGE AND A BAGGAGE MANAGEMENT SYSTEM

(71) Applicant: Maxell, Ltd., Kyoto (JP)

(72) Inventors: Motoyuki Suzuki, Oyamazaki (JP); Kazuhiko Yoshizawa, Oyamazaki (JP); Yasunobu Hashimoto, Oyamazaki (JP); Shigetaka Kimura, Tokyo (JP); Shinji Shibuya, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/847,734

(22) Filed: Apr. 14, 2020

(65) Prior Publication Data

US 2020/0242438 A1 Jul. 30, 2020

Related U.S. Application Data

(63) Continuation of application No. 16/536,472, filed on Aug. 9, 2019, now Pat. No. 10,635,962, which is a continuation of application No. 15/779,554, filed as application No. PCT/JP2016/086576 on Dec. 8, 2016, now Pat. No. 10,467,515.

(30) Foreign Application Priority Data

Dec. 25, 2015 (JP) ................................ 2015-253456
Apr. 26, 2016 (JP) ................................ 2016-088037

(51) Int. Cl.
 *G06Q 10/08* (2012.01)
 *G06K 19/07* (2006.01)
(Continued)

(52) U.S. Cl.
 CPC ... *G06K 19/0727* (2013.01); *G06K 19/07749* (2013.01); *G06Q 10/08* (2013.01);
(Continued)

(58) Field of Classification Search
 CPC .......................... H04L 7/0008; G06K 19/0727
 See application file for complete search history.

(56) References Cited

U.S. PATENT DOCUMENTS 5,251,234 A * 10/1993 Iida ...................... H04L 5/1423
  327/108
9,473,878 B2 * 10/2016 Sydir ..................... G08B 21/24
(Continued)

FOREIGN PATENT DOCUMENTS

| JP | 2004-086718 A | 3/2004 |
|---|---|---|
| JP | 2006-011501 A | 1/2006 |
| JP | 2014-44522 A | 3/2014 |

OTHER PUBLICATIONS

International Search Report of PCT/JP2016/086576 dated Mar. 7, 2017.

*Primary Examiner* — Qutbuddin Ghulamali
(74) *Attorney, Agent, or Firm* — Mattingly & Malur, PC

(57) ABSTRACT

The purpose of the present invention is to provide an apparatus for managing baggage and a method for managing baggage with which improved usability can be obtained. In order to solve the problem, an apparatus for managing baggage is provided with: a reader unit which reads tag information of a wireless tag attached to a baggage; a storage unit in which the tag information read by the reader unit is stored; and a control unit which makes a determination of a forgotten baggage by comparing the tag information stored in the storage unit with tag information newly read by the reader unit.

12 Claims, 36 Drawing Sheets

(51) Int. Cl.
    *G08B 25/10*     (2006.01)
    *G06K 19/077*     (2006.01)
    *G08B 21/24*     (2006.01)
    *H04M 1/725*     (2006.01)

(52) U.S. Cl.
    CPC ..... *G06Q 10/0832* (2013.01); *G06Q 10/0833* (2013.01); *G08B 25/10* (2013.01); *G08B 21/24* (2013.01); *H04M 1/72522* (2013.01); *H04M 2250/04* (2013.01); *H04M 2250/10* (2013.01)

(56) References Cited

U.S. PATENT DOCUMENTS

| | | | | |
|---|---|---|---|---|
| 9,639,500 | B2* | 5/2017 | Bas | G06F 1/3212 |
| 9,762,229 | B2* | 9/2017 | Kim | H03K 7/08 |
| 2002/0167405 | A1* | 11/2002 | Shanks | G06K 7/10069 |
| | | | | 340/572.1 |
| 2003/0009396 | A1* | 1/2003 | DeVries | G06Q 10/087 |
| | | | | 705/28 |
| 2003/0227392 | A1* | 12/2003 | Ebert | H04L 67/12 |
| | | | | 340/8.1 |
| 2004/0027872 | A1* | 2/2004 | Nishikawa | G01D 3/022 |
| | | | | 365/200 |
| 2004/0164844 | A1* | 8/2004 | Maeda | G06Q 10/087 |
| | | | | 340/5.8 |
| 2008/0279320 | A1* | 11/2008 | Rocas | H04L 7/044 |
| | | | | 375/355 |
| 2012/0030388 | A1* | 2/2012 | Bas | G06F 13/4295 |
| | | | | 710/106 |
| 2012/0206091 | A1* | 8/2012 | Tanaka | H04L 5/1423 |
| | | | | 320/107 |
| 2015/0039801 | A1* | 2/2015 | Mori | G06F 13/4072 |
| | | | | 710/305 |
| 2019/0173660 | A1* | 6/2019 | Akahane | H03K 17/567 |

* cited by examiner

F I G. 1A
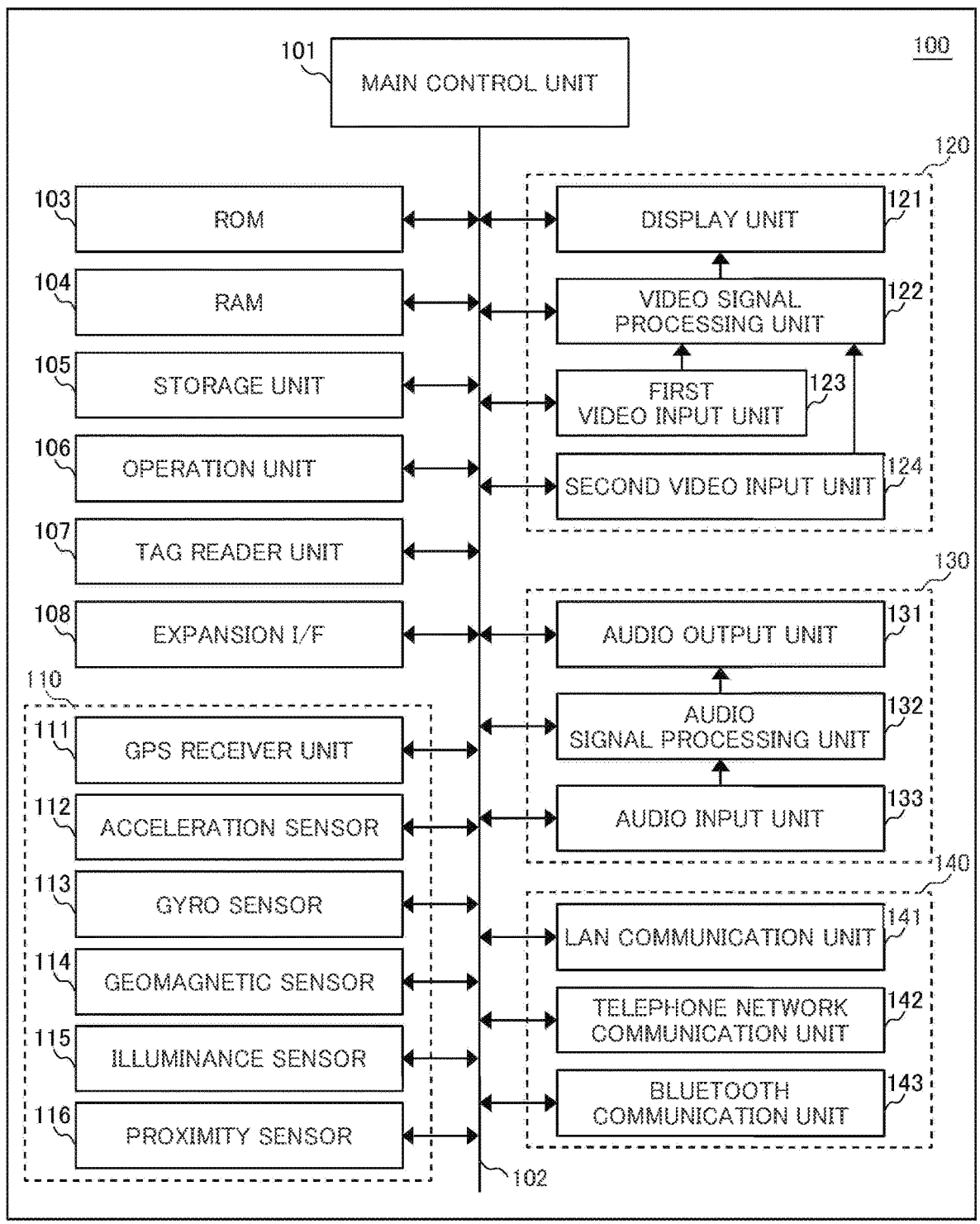

F I G. 1 4
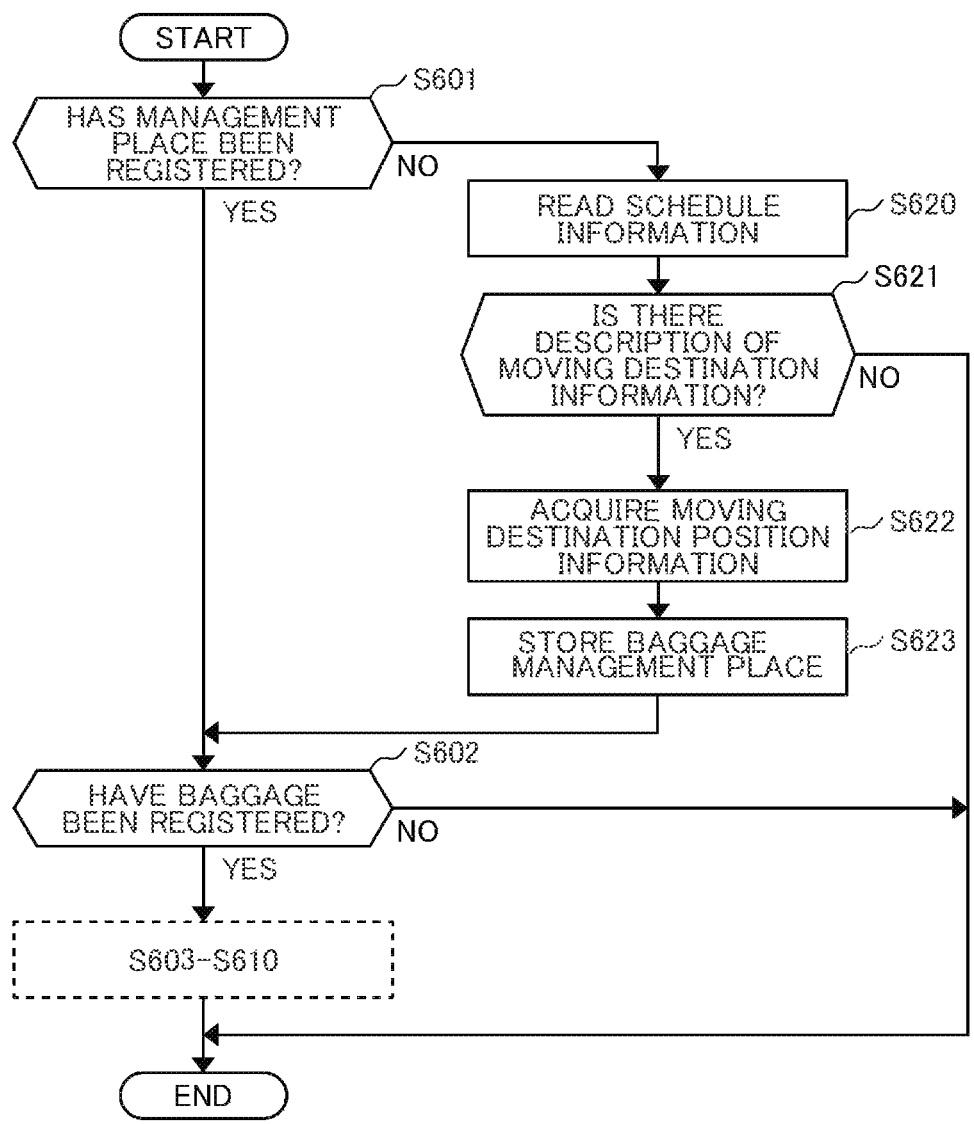

F I G. 1 7 B
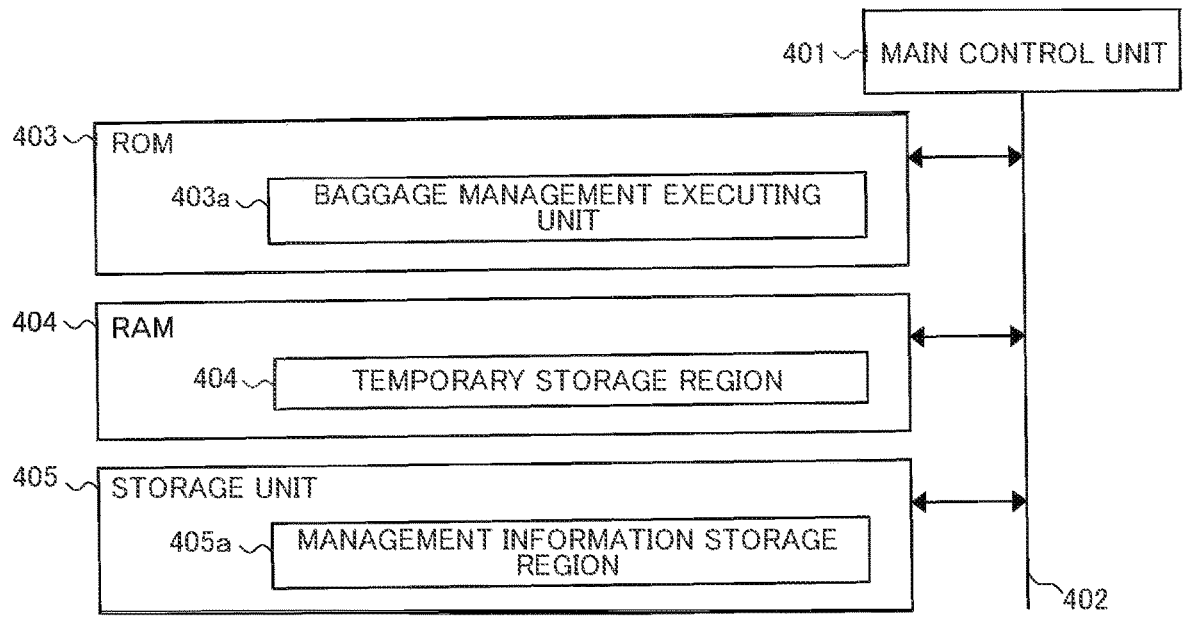
F I G. 1 8
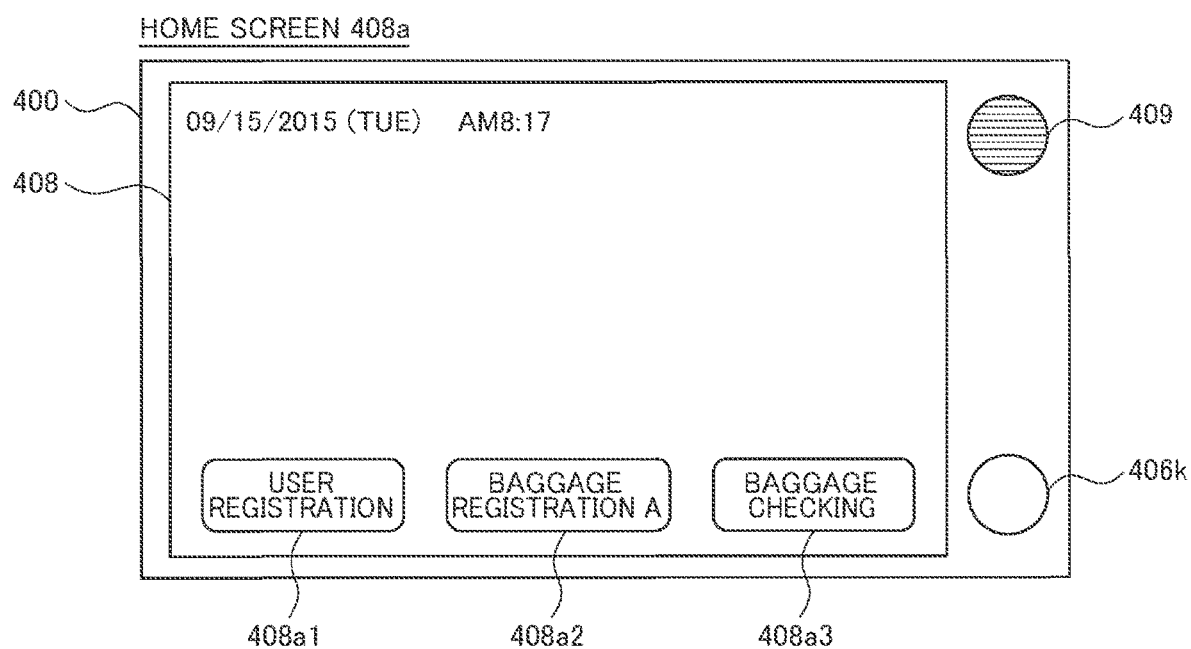

FIG. 21C

BAGGAGE LIST SCREEN B 408d

09/15/2015 (TUE) AM8:17    TARO
BAGGAGE LIST

| No | ID | ITEM NAME |
|----|------|----------------|
| 1  | XXXX1 | TARO_Sphone |
| 2  | XXXX2 | TARO_WALLET |
| 3  | XXXX3 | TARO_BAG 1 |
| 4  | XXXX4 | TARO_PASS CASE |
| 8  | XXXX9 | |

[ADD] [CORRECT] [DELETE] [RETURN]

BAGGAGE REGISTRATION SCREEN B 408e

09/15/2015 (TUE) AM8:17
BAGGAGE REGISTRATION
- 408e1  No.      : 008
- 408e2  ID       : XXXX9
- 408e3  ITEM NAME :
- 408e4  USER     : TARO

CARRYING CONDITION SETTING

408e5  DAY OF WEEK: MON ☐ TUE ☐ WED ☐ THU ☐ FRI ☐ SAT ■ SUN ■    BUSINESS TRIP ☐

[READ] [REGISTER] [RETURN]

408e6   408e7   408e8

BAGGAGE LIST SCREEN A 408f

09/15/2015 (TUE)   AM8:17
BAGGAGE LIST

| No | ID | ITEM NAME | USER |
|----|------|----------------|------|
| 1 | XXXX1 | TARO_Sphone | TARO |
| 2 | XXXX2 | TARO_WALLET | TARO |
| 3 | XXXX3 | TARO_BAG 1 | TARO |
| 4 | XXXX4 | TARO_PASS CASE | TARO |
| 5 | XXXX5 | TARO_UMBRELLA | TARO |
| 6 | XXXX6 | TARO_BAG 2 | TARO |

ADD   CORRECT   DELETE   RETURN

BAGGAGE MANAGEMENT INFORMATION 4050

| No | ID | USER NAME | ITEM NAME | CARRYING CONDITION SET ||||||| |
|---|---|---|---|---|---|---|---|---|---|---|---|
| | | | | MON | TUE | WED | THU | FRI | SAT | SUN | BUSINESS TRIP |
| 001 | XXX01 | TARO | TARO_Sphone | 1 | 1 | 1 | 1 | 1 | 1 | 1 | 1 |
| 002 | XXX02 | TARO | TARO_WALLET | 1 | 1 | 1 | 1 | 1 | 1 | 1 | 1 |
| 003 | XXX03 | TARO | TARO_BAG 1 | 1 | 1 | 1 | 1 | 1 | 0 | 0 | 1 |
| 004 | XXX04 | TARO | TARO_PASS CASE | 1 | 1 | 1 | 1 | 1 | 0 | 0 | 1 |
| 005 | XXX05 | TARO | TARO_UMBRELLA | 0 | 0 | 0 | 0 | 0 | 0 | 0 | 1 |
| 006 | XXX06 | TARO | TARO_BAG 2 | 0 | 0 | 0 | 0 | 0 | 1 | 1 | 0 |
| ... | ... | ... | ... | ... | ... | ... | ... | ... | ... | ... | ... |
| 021 | XXX11 | HANAKO | HANAKO_Sphone | 1 | 1 | 1 | 1 | 1 | 1 | 1 | 0 |
| 022 | XXX12 | HANAKO | HANAKO_WALLET | 1 | 1 | 1 | 1 | 1 | 1 | 1 | 0 |
| ... | ... | ... | ... | ... | ... | ... | ... | ... | ... | ... | ... |

FLAG 1: NECESSARY TO CARRY, 0: UNNECESSARY TO CARRY

FIG. 27

BAGGAGE LIST SCREEN C 408g

09/15/2015 (TUE)    AM8:17    TARO

BAGGAGE LIST

| No | ID | ITEM NAME |
|---|---|---|
| 1 | XXXX1 | TARO_Sphone |
| 2 | XXXX2 | TARO_WALLET |
| 3 | XXXX3 | TARO_BAG 1 |
| 4 | XXXX4 | TARO_PASS CASE |
| 5 | XXXX5 | TARO_UMBRELLA |

END

FIG. 28

BAGGAGE CHECKING LOG INFORMATION 4051

(a) CHECKING RESULT OF EACH USER

| TARO ||||| HANAKO |||||
|---|---|---|---|---|---|---|---|---|---|
| DATE | DAY OF WEEK | TIME | ID | BUSINESS TRIP | DATE | DAY OF WEEK | TIME | ID | BUSINESS TRIP |
| 201/09/07 | MON | 8:03 | XXX01 | 1 | 201/09/07 | MON | 9:05 | XXX11 | 0 |
| 201/09/07 | MON | 8:03 | XXX02 | 1 | 201/09/07 | MON | 9:05 | XXX12 | 0 |
| 201/09/07 | MON | 8:03 | XXX03 | 1 | 201/09/07 | MON | 9:05 | XXX13 | 0 |
| 201/09/07 | MON | 8:03 | XXX04 | 1 | 201/09/07 | MON | 9:05 | XXX14 | 0 |
| 201/09/07 | MON | 8:03 | XXX05 | 1 | 201/09/07 | MON | 9:05 | XXX15 | 0 |
| 201/09/08 | TUE | 6:35 | XXX01 | 0 | 201/09/08 | TUE | 9:02 | XXX11 | 0 |
| 201/09/08 | TUE | 6:35 | XXX02 | 0 | 201/09/08 | TUE | 9:02 | XXX12 | 0 |
| 201/09/08 | TUE | 6:35 | XXX03 | 0 | 201/09/08 | TUE | 9:02 | XXX13 | 0 |
| 201/09/08 | TUE | 6:35 | XXX04 | 0 | 201/09/08 | TUE | 9:02 | XXX14 | 0 |
| ... | ... | ... | ... | | ... | ... | ... | ... | |

(b) NUMBER OF CHECKINGS OF EACH DAY OF WEEK

NUMBER OF BAGGAGE CHECKINGS (TARO)

| MON | TUE | WED | THU | FRI | SAT | SUN | BUSINESS TRIP |
|---|---|---|---|---|---|---|---|
| 25 | 25 | 25 | 25 | 25 | 24 | 24 | 6 |

NUMBER OF BAGGAGE CHECKINGS (HANAKO)

| MON | TUE | WED | THU | FRI | SAT | SUN | BUSINESS TRIP |
|---|---|---|---|---|---|---|---|
| 25 | 25 | 25 | 25 | 25 | 24 | 24 | 0 |

(c) NUMBER OF CARRYINGS OF EACH DAY OF WEEK

| No | ID | NUMBER OF CARRYINGS |||||||  |
|---|---|---|---|---|---|---|---|---|
| | | MON | TUE | WED | THU | FRI | SAT | SUN | BUSINESS TRIP |
| 001 | XXX01 | 25 | 25 | 25 | 25 | 25 | 25 | 25 | 6 |
| 002 | XXX02 | 24 | 25 | 25 | 25 | 25 | 23 | 24 | 6 |
| 003 | XXX03 | 25 | 25 | 25 | 25 | 25 | 1 | 0 | 6 |
| 004 | XXX04 | 25 | 25 | 25 | 25 | 25 | 1 | 0 | 6 |
| 005 | XXX05 | 1 | 1 | 0 | 0 | 0 | 2 | 0 | 6 |
| 006 | XXX06 | 0 | 0 | 0 | 0 | 0 | 20 | 18 | 0 |
| ... | ... | ... | ... | ... | ... | ... | ... | ... | |
| 021 | XXX11 | 25 | 25 | 25 | 25 | 25 | 25 | 25 | 0 |
| 022 | XXX12 | 25 | 25 | 25 | 25 | 25 | 25 | 25 | 0 |
| ... | ... | ... | ... | ... | ... | ... | ... | ... | |

F I G. 3 4
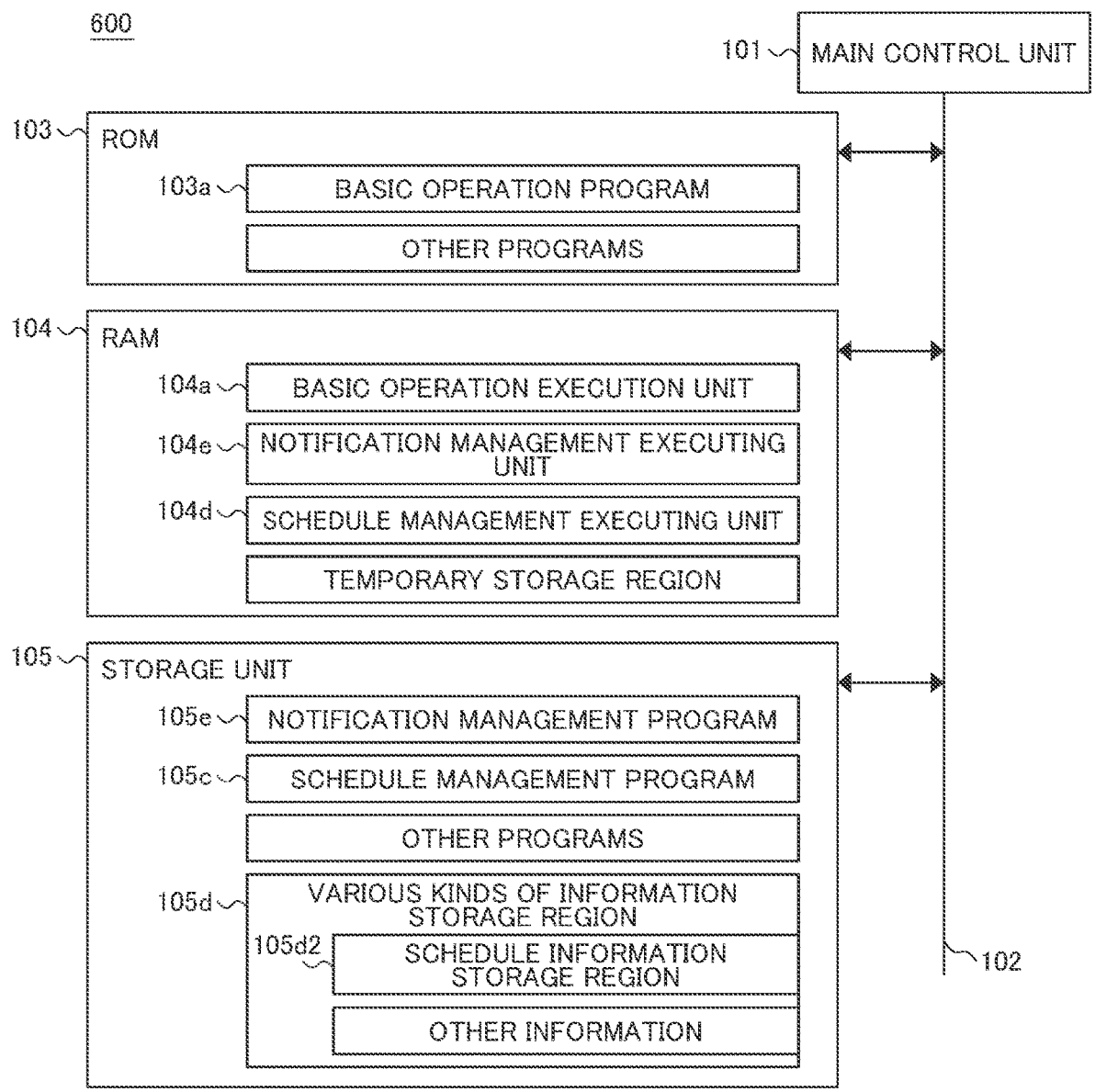

APPARATUS FOR MANAGING BAGGAGE, A METHOD FOR MANAGING BAGGAGE AND A BAGGAGE MANAGEMENT SYSTEM

TECHNICAL FIELD

The present invention relates to an apparatus for managing baggage, a method for managing baggage and a baggage management system.

BACKGROUND ART

In the past, a forgotten object detection system using a radio tag has been proposed to prevent forgotten objects such as teaching materials in a case in which children go to school.

As an example, a portable communication device including a reader that reads tag data of a radio tag installed in an object located within a readable range and a control unit that detects a forgotten object by extracting tag data of a radio tag installed in an object to carry on the basis of schedule data in which a schedule is associated with an object used for the schedule and comparing the extracted tag data with the tag data read through the reader is disclosed in JP 2014-44522 A (Patent Document 1).

CITATION LIST

Patent Document

Patent Document 1: JP 2014-44522 A

SUMMARY OF THE INVENTION

Problems to be Solved by the Invention

As in the technique disclosed in Patent Document 1, in a system that decides an object to carry on the basis of the schedule data, it is necessary to decide an object to carry in advance in accordance with a schedule. However, in non-routine schedules such as travels or business trips, objects to carry are not necessarily the same, and thus it is necessary to register objects to carry in advance each time, and there is a problem in that it is bothersome. Further, there is a problem in that detection of forgotten objects in places other than home such as travel destinations and business trip destinations are not supported.

The present invention was made in light of the foregoing, and it is an object of the present invention to provide an apparatus for managing baggage, a method for managing baggage, and a baggage management system, which are capable of implementing more suitable usability.

Solutions to Problems

In order to solve the above problems, as an example, the present invention provides an apparatus for managing baggage including a reader unit that reads tag information of a radio tag installed in a baggage, a storage unit that stores the tag information read by the reader unit, and a control unit that compares the tag information stored in the storage unit with tag information newly read by the reader unit and determines a forgotten baggage.

Effects of the Invention

According to the present invention, it is possible to provide an apparatus for managing baggage, a method for managing baggage, and a baggage management system which are capable of implementing more suitable usability.

BRIEF DESCRIPTION OF THE DRAWINGS

FIG. 1A is a block diagram illustrating a configuration example of an apparatus for managing baggage in a first embodiment.

FIG. 14 is a flowchart illustrating an example of a baggage checking process of an apparatus for managing baggage in a third embodiment.

FIG. 17B is a diagram illustrating a software configuration of the apparatus for managing baggage in the fifth embodiment.

FIG. 18 is a diagram illustrating an external appearance of the apparatus for managing baggage in the fifth embodiment and a display example of a home screen.

FIG. 21C is a view illustrating a display example of a baggage list screen B in the fifth embodiment.

FIG. 21D is a diagram illustrating a display example of the baggage registration screen B in the fifth embodiment.

FIG. 26 is a diagram illustrating an example of baggage management information in the fifth embodiment.

FIG. 27 is a diagram illustrating a display example of a baggage list screen C in the fifth embodiment.

FIG. 28 is a diagram illustrating an example of baggage checking log information in the fifth embodiment.

FIG. 34 is a diagram illustrating a software configuration of an information terminal device in the sixth embodiment.

MODE FOR CARRYING OUT THE INVENTION

Figure 1B:
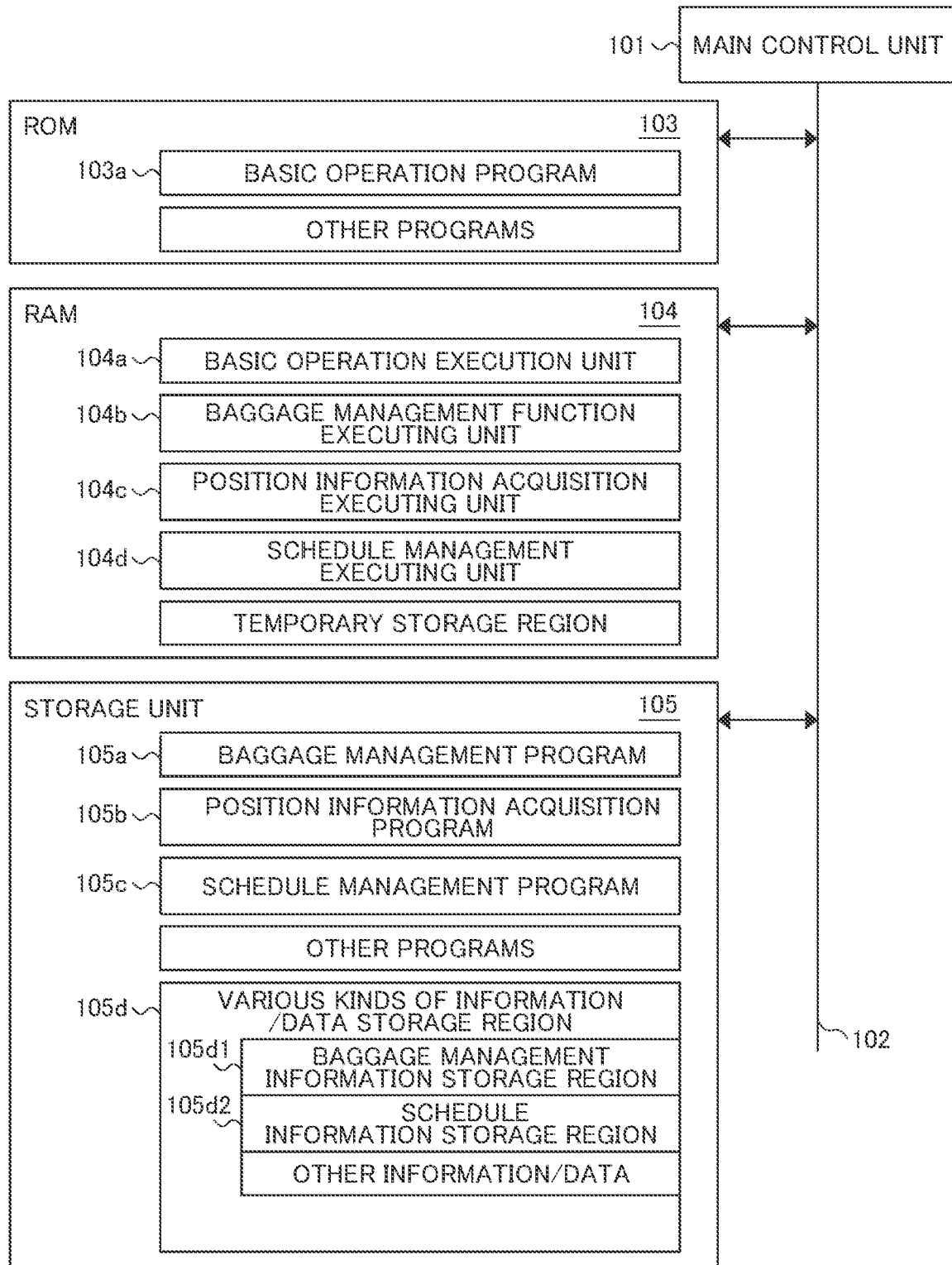
FIG. 1B is a diagram illustrating an example of a software configuration of the apparatus for managing baggage in the first embodiment.

Hereinafter, exemplary embodiments of the present invention will be described with reference to the appended drawings.

First Embodiment

FIG. 1A is a block diagram illustrating a configuration example of an apparatus for managing baggage of the present embodiment. Referring to FIG. 1A, an apparatus for managing baggage 100 includes a main control unit 101, a system bus 102, a read only memory (ROM) 103, a random access memory (RAM) 104, a storage unit 105, a operation unit 106, a tag reader unit 107, an expansion interface unit 108, a sensor unit 110, video processing unit 120, an audio processing unit 130, and a communication processing unit 140.

FIG. 1B is a diagram illustrating a software configuration example of the apparatus for managing baggage 100 of the present embodiment, and illustrates software configurations in the ROM 103, the RAM 104, and the storage unit 105. The details will be described later.

Figure 2:
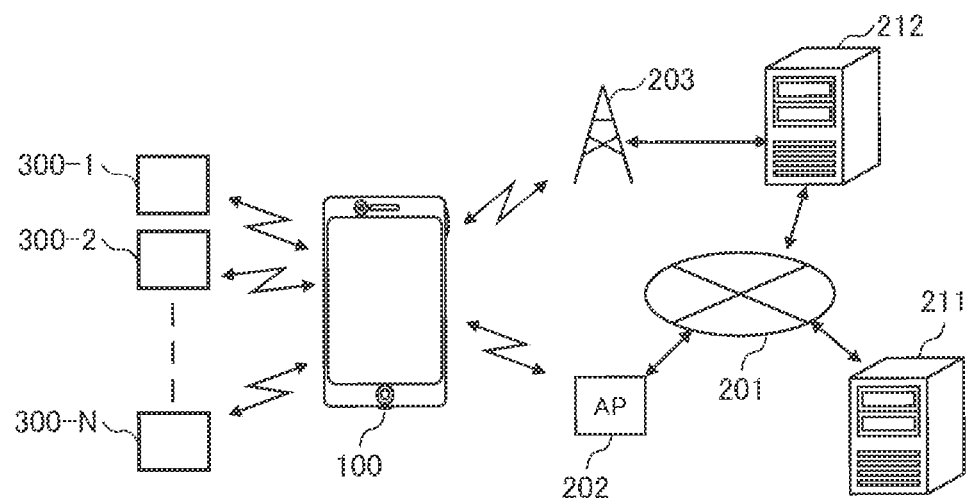
FIG. 2 is a diagram illustrating a configuration example of a baggage management system including an apparatus for managing baggage in the first embodiment.

FIG. 2 is a diagram illustrating a configuration example of the baggage managing system including the apparatus for managing baggage 100 of the present embodiment. Referring to FIG. 2, the baggage managing system includes the apparatus for managing baggage 100, a wide area public network 201 such as the Internet, a wireless communication access point 202, a base station 203 of a mobile telephone communication network, a map information data server 211, a mobile telephone communication server 212, and radio tags 300 (300-1 to 300-N).

The apparatus for managing baggage 100 may be any other portable digital device such as a personal digital assistant (PDA) or a tablet personal computer (PC) in addition to a mobile phone or a smart phone.

Referring to FIG. 1B, the main control unit 101 is a microprocessor unit that controls the entire baggage managing device 100 in accordance with a predetermined program. The system bus 102 is a data communication path for performing transmission and reception of data between the main control unit 101 and the respective units in the apparatus for managing baggage 100.

The ROM 103 is a memory in which a basic operation program such as an operating system and other application programs are stored, and a rewritable ROM such as an electrically erasable programmable ROM (EEPROM) or a flash ROM is used. It is possible to upgrade the versions of the basic operation program and other application programs and expand functions thereof by updating the programs stored in the ROM 103.

The RAM 104 serves as a work area when the basic operation program and other application programs are executed. Specifically, for example, a basic operation program 103a stored in the ROM 103 is developed onto the RAM 104, and the main control unit 101 further executes the expanded basic operation program to constitute a basic operation executing unit 104a. In the following description, for simplicity of description, the basic operation executing unit 104a is described as performing a process of controlling the respective units when the main control unit 101 develops the basic operation program 103a stored in the ROM 103 onto the RAM 104 and executes the basic operation program 103a. The same description applies to other application programs.

The ROM 103 and the RAM 104 may be integrated with the main control unit 101. Further, the ROM 103 may not be constituted as an independent component as illustrated in FIG. 1B, but a part of a storage region of the storage unit 105 may be used as the ROM 103. Further, the RAM 104 is assumed to include a temporary storage region that temporarily holds data as necessary when various kinds of application programs are executed.

The storage unit 105 stores a program for implementing various kinds of functions of the apparatus for managing baggage 100 and information such as operation setting values of the programs.

All or some of the functions of the ROM 103 may be substituted by a partial region of the storage unit 105. Further, it is necessary for the storage unit 105 to hold stored information even in a state in which electric power is not supplied to the apparatus for managing baggage 100. Therefore, for example, a device such as a flash ROM, a solid state drive (SSD), or a hard disc drive (HDD) is used.

In FIG. 1A, the operation unit 106 is an instruction input unit for inputting a operation instruction to the apparatus for managing baggage 100, and in the present embodiment, the operation unit 106 is assumed to be constituted by a touch panel 106t and a operation key 106k in which button switches such as a power key 106k1 and a home key 106k2 are arranged, which are disposed on a display unit described later in a superimposed manner. Further, the operation unit 106 may be constituted by either of the touch panel 106t and the operation key 106k.

The tag reader unit 107 reads tag information of the radio tag 300 such as radio frequency identification (RFID) installed for each of baggage.

The expansion interface unit 108 is an interface group for expanding the function of the apparatus for managing baggage 100, and in the present embodiment, the expansion interface unit 108 is assumed to be constituted by a universal serial bus (USB) interface, a memory interface, or the like. The USB interface performs a connection with a keyboard or other USB devices. A memory interface performs a connection with a memory card or other memory media and performs transmission and reception of data.

The sensor unit 110 is a group of sensors for detecting a state of the apparatus for managing baggage 100, and in the present embodiment, sensor unit 110 is constituted by a Global Positioning System (GPS) receiving unit 111, an acceleration sensor 112, a gyro sensor 113, a geomagnetic sensor 114, an illuminance sensor 115, and a proximity sensor 116. With these sensor groups, it is possible to detect a position, movement, an inclination, a direction, and ambient brightness of the apparatus for managing baggage 100, a proximity situation of an ambient object, and the like. Any other sensor may be further installed.

The video processing unit 120 includes a display unit 121, a video signal processing unit 122, a first video input unit 123, and a second video input unit 124. The display unit 121 is a display device such as a liquid crystal panel and provides the user of the apparatus for managing baggage 100 with video data processed by the video signal processing unit 122. The video signal processing unit 122 includes a video RAM (not illustrated), and the display unit 121 is driven on the basis of the video data input to the video RAM. Further, the video signal processing unit 122 is assumed to have a function of performing format conversion, a superimposition process of a menu or other on screen display (OSD) signals, or the like if necessary. Each of the first video input unit 123 and the second video input unit 124 is a camera unit that converts light input from a lens into an electric signal using an electronic device such as a charge coupled device (CCD) sensor or a complementary metal oxide semiconductor (CMOS) sensor and receives video data of a surrounding area or a target object.

The audio processing unit 130 is constituted by an audio output unit 131, an audio signal processing unit 132, and a voice input unit 133. The audio output unit 131 is a speaker and provides the user of the apparatus for managing baggage 100 with an audio signal processed by the audio signal processing unit 132. The voice input unit 133 is a microphone, and converts the user's voice or the like into audio data and receives the audio data. The communication processing unit 140 includes a local area network (LAN) communication unit 141, a mobile telephone network communication unit 142, and a BlueTooth (registered trademark) communication unit 143. The LAN communication unit 141 communicates with the wireless communication access point 202 of the wide area public network 201 by means of wireless communication and performs transmission and reception of data. The mobile telephone network communication unit 142 performs telephone communication (call) and transmission and reception of data by means of wireless communication with the base station 203 of the mobile telephone communication network. The BlueTooth communication unit 143 performs wireless communication with corresponding devices. Each of the LAN communication unit 141, the mobile telephone network communication unit 142, and the BlueTooth communication unit 143 is assumed to include an encoding circuit, a decoding circuit, an antenna, and the like. Further, an infrared communication unit or the like may be installed.

Next, an operation of the apparatus for managing baggage 100 of the present embodiment will be described. As illustrated in FIG. 1B, the operation of the apparatus for managing baggage 100 of the present embodiment is assumed to be controlled by the basic operation executing unit 104a, a baggage management function executing unit 104b, a position information acquisition executing unit 104c, and a schedule management executing unit 104d which are constituted such that the basic operation program 103a stored in the ROM 103 and a baggage management program 105a, a position information acquisition program 105b, and a schedule management program 105c stored in the storage unit 105 are developed onto the RAM 104 and executed by the main control unit 101. Further, the storage unit 105 includes a baggage management information storage region 105d1 for storing position information of a place for managing baggage and tag information such as a unique ID read from the radio tag installed for each of baggage and a schedule information storage region 105d2 for storing information such as a business trip date and time or a lodging place.

Figure 3:
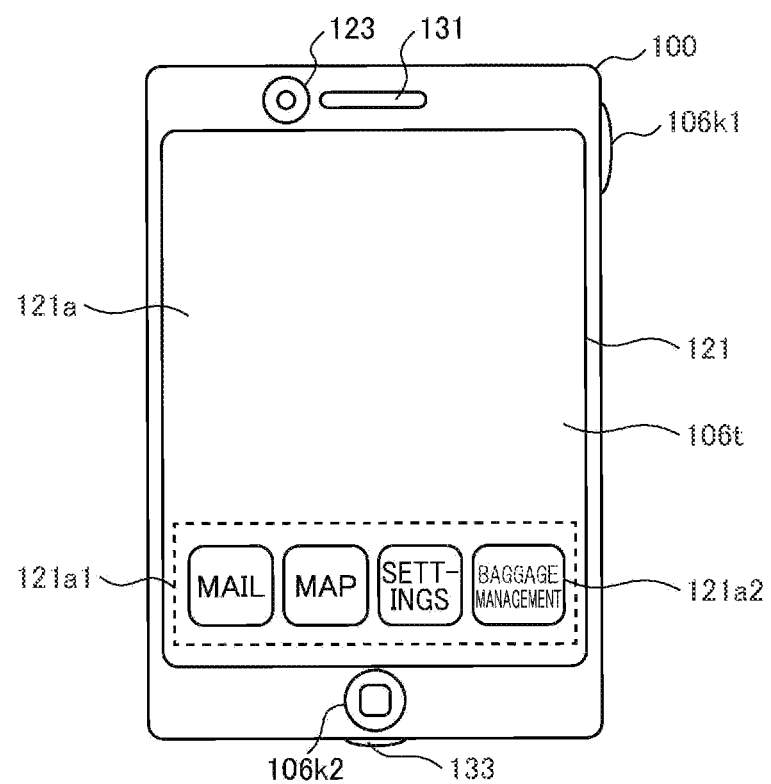
FIG. 3 is a diagram illustrating an external appearance example of the apparatus for managing baggage in the first embodiment and a display example of a basic screen.

FIG. 3 illustrates an external appearance example of the apparatus for managing baggage 100 of the present embodiment. FIG. 3 illustrates an example in which the apparatus for managing baggage 100 is an information terminal device such as a smart phone.

Referring to FIG. 3, a basic screen 121a is displayed on the display unit 121 when the apparatus for managing baggage 100 is powered on by pushing a power key 106k1 or when a home key 106k2 is pushed while an arbitrary application program is being executed. An icon group 121a1 associated with application programs executable in the apparatus for managing baggage 100 is displayed in the basic screen 121a, and when any one of icons is selected, a predetermined application program associated with the selected icon is executed.

For example, the icon may be selected by a operation of tapping a predetermined region on the touch panel 106t corresponding to a position on the display unit 121 at which an icon of interest is displayed. Alternatively, the icon may be selected by operating a operation key such as a cross cursor key or a decision key (not illustrated).

An icon 121a2 displayed in the basic screen 121a is an icon associated with the baggage management program 105a which is one of features of the apparatus for managing baggage 100 of the present embodiment. For example, when the icon 121a2 is selected by the tap operation or the like, the baggage management function executing unit 104b is activated.

Hereinafter, an operation example of a baggage management function which is one of features of the apparatus for managing baggage 100 of the present embodiment will be described with reference to the flowchart illustrated in FIG. 4. In the apparatus for managing baggage 100 operating under the control of the basic operation executing unit 104a, if the icon 121a2 on the basic screen 121a is selected by the tap operation or the like, the basic operation executing unit 104a activates the baggage management function executing unit 104b and transfers a control entity as the baggage management function executing unit 104b.

Figure 4:
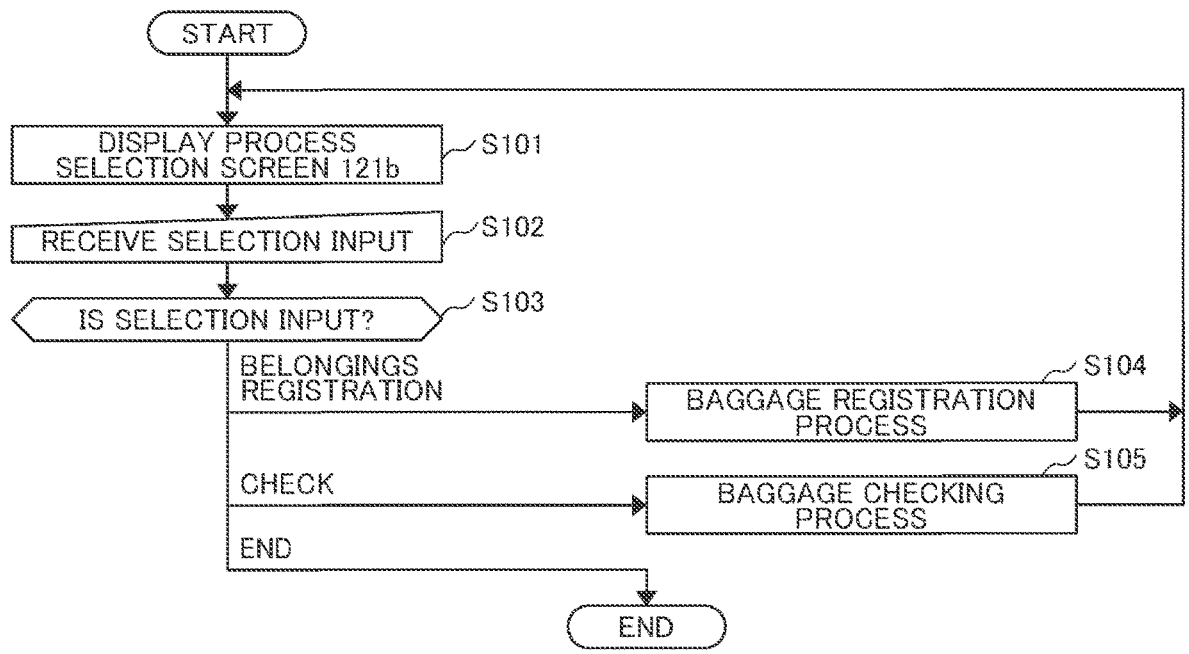
FIG. 4 is a flowchart illustrating an operation example of a baggage management function executing unit of the apparatus for managing baggage in the first embodiment.
Figure 5:
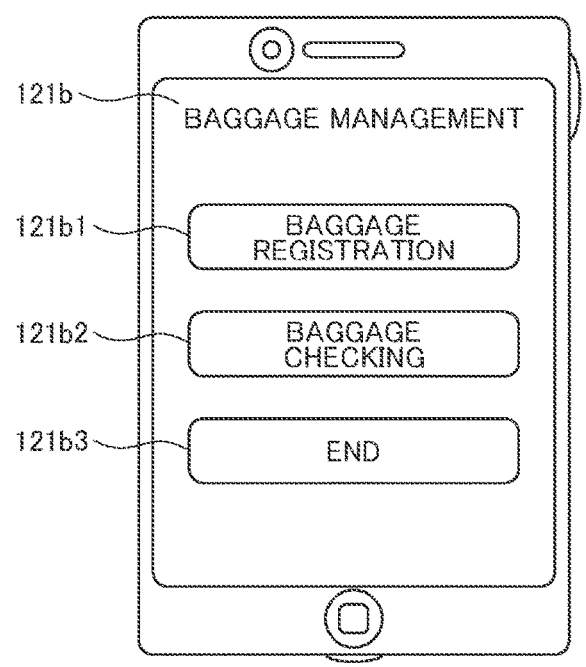
FIG. 5 is a diagram illustrating a display example of a baggage management process selection screen of apparatus for managing baggage in the first embodiment.

In FIG. 4, in the baggage management function executing unit 104b, a baggage management process selection screen 121b is first displayed (S101). FIG. 5 illustrates a display example of the baggage management process selection screen 121b. The baggage management process selection screen 121b includes a baggage registration icon 121b1, a baggage check icon 121b2, and an end icon 121b3.

Then, the baggage management function executing unit 104b receives a selection input for the icons constituting the baggage management process selection screen 121b by the tap operation or the like of the user (S102) and executes a bifurcation process S103 in accordance with the selected icon.

In a case in which the selection input for the baggage registration icon 121b1 is received in S102, the process is bifurcated to a baggage registration process S104 in a bifurcation process S103.

In a case in which the selection input for the baggage check icon 121b2 is received in S102, the process is bifurcated to a baggage checking process S105 in the bifurcation process S103.

In a case in which an selection input for the end icon 121b3 is received in S102, in the bifurcation process S103, the baggage management function executing unit 104b returns the control entity to the basic operation executing unit 104a, and the basic operation executing unit 104a further displays the basic screen 121a, and the operation of the baggage management function executing unit 104b ends.

After the processes of the baggage registration process S104 and the baggage checking process S105 are executed, the process returns to S101, and the baggage management process selection screen 121b is displayed.

Figure 6:
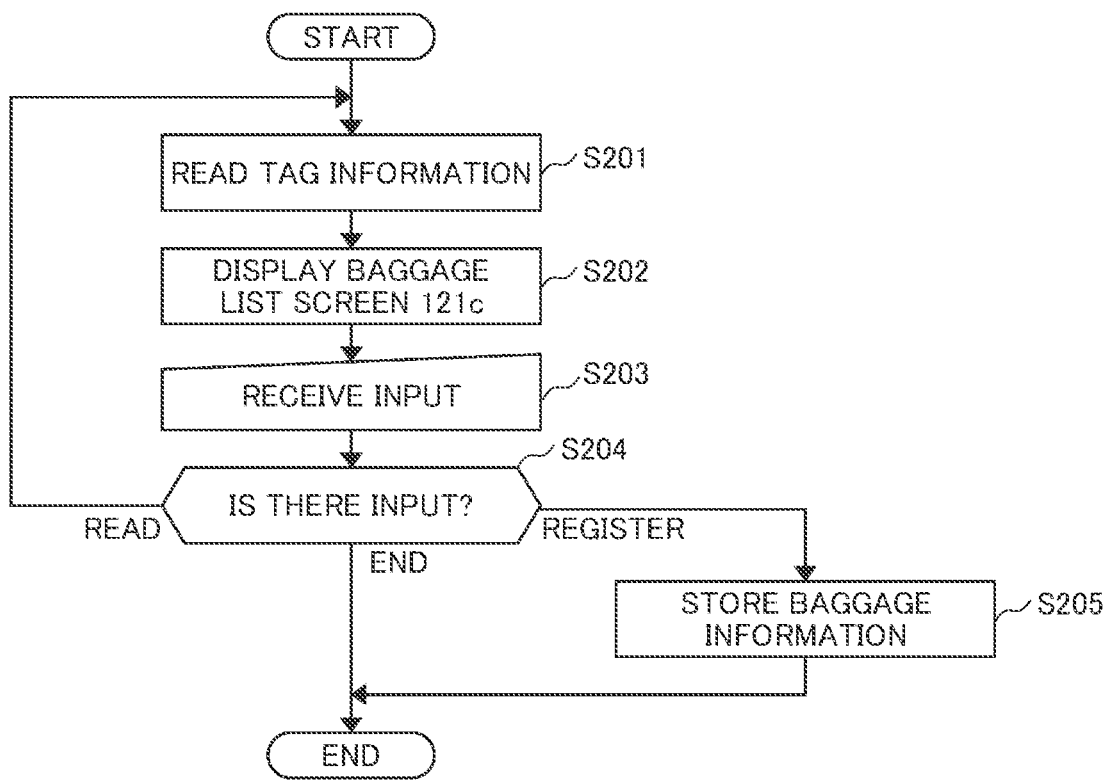
FIG. 6 is a flowchart illustrating an example of a baggage registration process of the apparatus for managing baggage in the first embodiment.

Then, the baggage registration process S104 will be described with reference to a flowchart of FIG. 6. In FIG. 6, the tag information of the radio tag 300 located near the apparatus for managing baggage 100 is read by the tag reader unit 107 (S201). Here, the radio tag 300 is installed for each of baggage to be managed, and in a case in which a plurality of baggage are carried, tag information of a plurality of radio tags is read.

A baggage list screen 121c is displayed on the display unit 121 on the basis of the read tag information of the radio tag (S202). A display example of the baggage list screen 121c is illustrated in FIG. 8(a). The baggage list screen 121c includes a list 121c1 of baggage corresponding to the read tag information of the radio tag, a read icon 121c2, a register icon 121c3, and an end icon 121c4. Unique ID information and the like included in the read tag information are displayed in the list 121c1. Further, in a case in which an item name of a baggage corresponding to the ID of the radio tag is stored in the baggage management information storage region 105d1 in advance as baggage registration information or in a case in which information related to an item name is included in the tag information, the item name is displayed.

Then, the baggage management function executing unit 104b receives the selection input for the icon constituting the baggage list screen 121c by the tap operation or the like of the user (S203), and executes a bifurcation process S204 in accordance with the selected icon.

In a case in which the selection input for the end icon 121c4 is received in S203, the baggage management function executing unit 104b ends the baggage registration process S104 in the bifurcation process S204, returns to S101 of FIG. 4, and displays the baggage management process selection screen 121b.

In a case in which the selection input for the read icon 121c2 is received in S203, the process returns to S201 in the bifurcation process S204 and reads the tag information of the radio tag 300 of the baggage located near the apparatus for managing baggage 100 again.

In a case in which the selection input for the register icon 121c3 is received in S203, the tag information of the radio tag of baggage read in S201 as the baggage registration information is stored in the baggage management information storage region 105d1 (S205), then the baggage registration process S104 ends, the process returns to S101 of FIG. 4, and the baggage management process selection screen 121b is displayed.

In FIG. 6, after reading the tag information in S201, the baggage list screen display of S202 for checking may be omitted, and the storage process to the baggage management information storage region of S205 may be performed without performing the reception of the selection input for S203 or the bifurcation process of S204.

Figure 7:
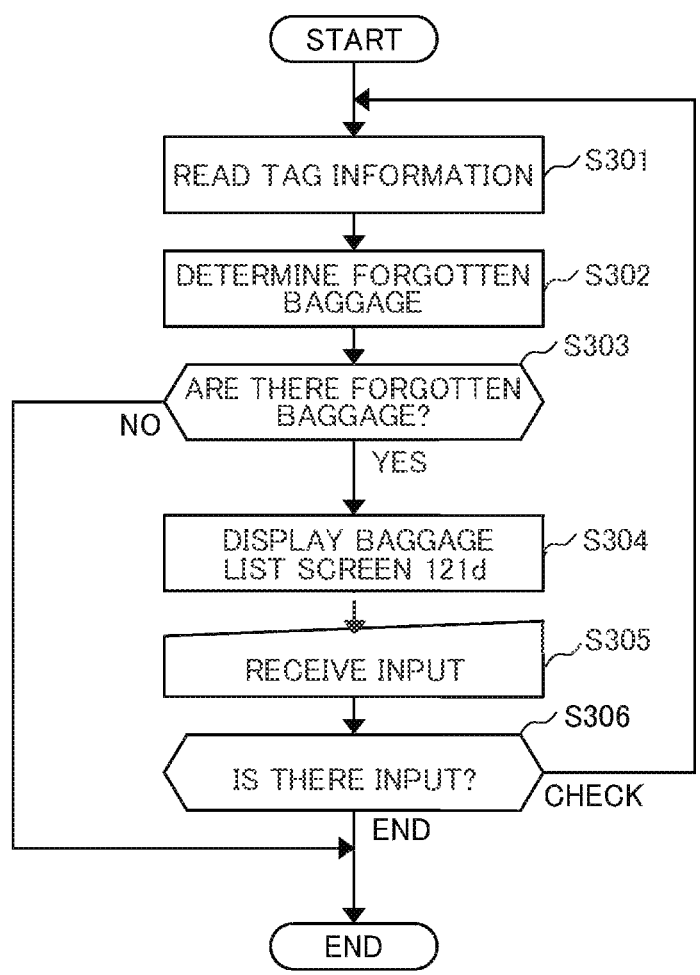
FIG. 7 is a flowchart illustrating an example of a baggage checking process of the apparatus for managing baggage in the first embodiment.

Next, the baggage checking process S105 will be described with reference to a flowchart of FIG. 7. In FIG. 7, in the baggage checking process, the tag information of the radio tag 300 of the baggage located near the apparatus for managing baggage 100 is read by the tag reader unit 107 (S301). Then, in the baggage registration process S104, the radio tag information of the baggage stored in the baggage management information storage region 105d1 as the baggage registration information is compared with the radio tag information of the baggage read in S301, and for the radio tag of the baggage to red as the baggage registration information, a baggage which is not included in the radio tag of the baggage read in S301 is determined as a forgotten baggage (S302). Then, a bifurcation process is performed in accordance with the presence/absence of the forgotten baggage (S303), and in a case in which there is no forgotten baggage (No), the baggage checking process S105 ends, the process returns to S101 of FIG. 4, and the baggage management process selection screen 121b is displayed.

In a case in which there is a forgotten baggage (Yes), a baggage list screen 121d is displayed on the display unit 121

Figure 8:
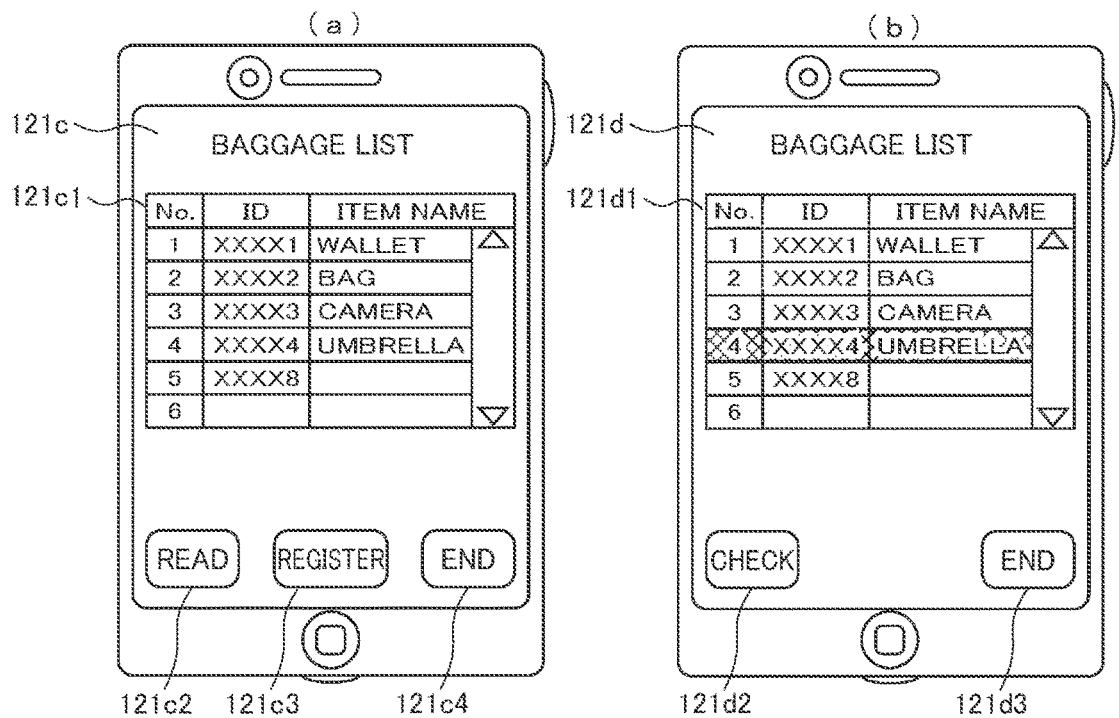
FIG. 8 is a diagram illustrating a display example of a baggage list screen of the apparatus for managing baggage in the first embodiment.

(S304). A display example of the baggage list screen 121*d* is illustrated in FIG. 8(*b*). The baggage list screen 121*d* includes a baggage list 121*d*1, a check icon 121*d*2, and an end icon 121*d*3. Unique ID information, a product name, and the like included in the read radio tag information are displayed in the list 121*d*1. Further, display indicating that a baggage determined as the forgotten baggage in S302 is determined as the forgotten baggage, for example, by inverting a display color (here, an example in which a baggage of ID=xxxx4 and a product name=umbrella is determined as the forgotten baggage is illustrated).

Then, the baggage management function executing unit 104*b* receives a selection input for the icons constituting the baggage list screen 121*d* by the tap operation or the like of the user (S305) and executes a bifurcation process S306 in accordance with the selected icon.

In a case in which the selection input for the check icon 121*d*2 is received in S305, the process returns to S301 in the bifurcation process S306, and the tag information of the radio tag 300 located near the apparatus for managing baggage 100 is read again.

In a case in which the selection input for the end icon 121*d*3 is received in S305, the baggage checking process S105 ends in the bifurcation process S306, the process returns to S101 of FIG. 4, and the baggage management process selection screen 121*b* is displayed.

In a case in which there is no forgotten baggage in S303, the baggage checking process ends, but a baggage list and information indicating that there is no forgotten baggage may be displayed even in a case in which there is no forgotten baggage.

Thus, in the present embodiment, for example, when the user leaves home or when the user arrives at a lodging place of a business trip destination or a travel destination, the tag information of the radio tags of baggage is read, and the baggage corresponding to the read radio tags are registered as the baggage, and when the user leaves the lodging place, the baggage are checked, and thus it is possible to check the baggage when the user leaves the lodging place for the baggage when the user leaves home or when the user arrives at a lodging place of a business trip destination or a travel destination.

As described above, the present embodiment provides an apparatus for managing baggage including a reader unit that reads tag information of a radio tag installed in a baggage, a storage unit that stores the tag information read by the reader unit, and a control unit that compares the tag information stored in the storage unit with tag information newly read by the reader unit and determines a forgotten baggage.

Further, provided is a method for managing baggage including a first tag information reading process of reading tag information of a radio tag installed in a baggage, a process of storing the tag information read by the first tag information reading process, a second tag information reading process of reading the tag information of the radio tag installed in the baggage, and a process of comparing the read tag information with the tag information read in the second tag information reading process and determining a forgotten baggage.

Accordingly, it is possible to provide the apparatus for managing baggage and the baggage managing method which are capable of implementing more suitable usability.

Second Embodiment

An operation of a baggage management function in the present embodiment will be described with reference to the flowchart of FIG. 9.

In the apparatus for managing baggage 100 operating under the control of the basic operation executing unit 104*a*, if the icon 121*a*2 on the basic screen 121*a* is selected by the tap operation or the like, the basic operation executing unit 104*a* activates the baggage management function executing unit 104*b* and transfers the control entity to the baggage management function executing unit 104*b*.

Figure 9:
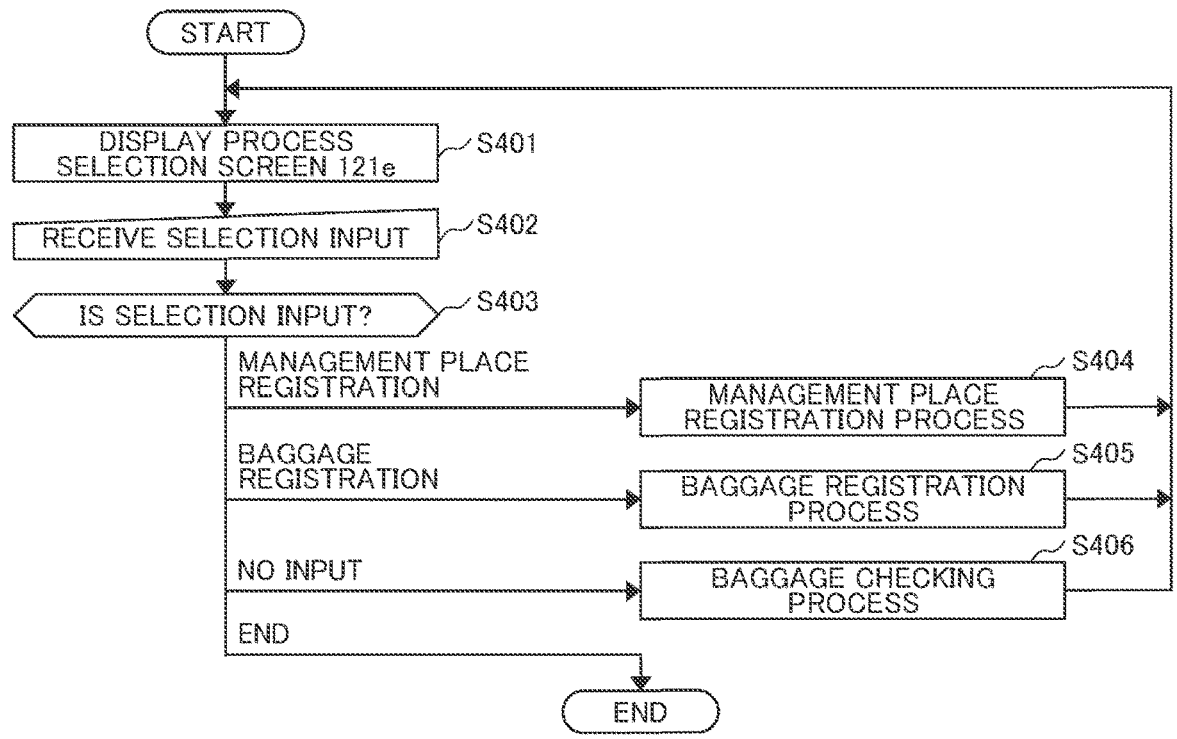
FIG. 9 is a flowchart illustrating an operation example of a baggage management function executing unit of an apparatus for managing baggage in a second embodiment.
Figure 10:
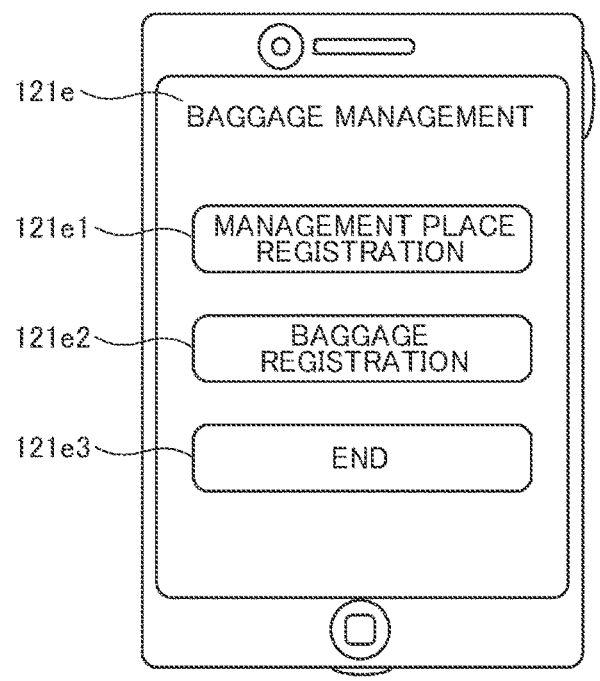
FIG. 10 is a view illustrating a display example of a baggage management process selection screen of the apparatus for managing baggage in the second embodiment.

In FIG. 9, in the baggage management function executing unit 104*b*, a baggage management process selection screen 121*e* is first displayed (S401). FIG. 10 illustrates a display example of the baggage management process selection screen 121*e*. As illustrated in FIG. 10, the baggage management process selection screen 121*e* includes a baggage management place registration icon 121*e*1, a baggage registration icon 121*e*2, and an end icon 121*e*3.

Returning to FIG. 9, then, the baggage management function executing unit 104*b* receives a selection input for the icons constituting the baggage management process selection screen 121*e* by the tap operation or the like of the user (S402), and executes a bifurcation process S403 in accordance with the selected icon.

In a case in which the selection input for the baggage management place registration icon 121*e*1 is received in S402, the process is bifurcated to a baggage management place registration process S404 in the bifurcation process S403.

In a case in which the selection input for baggage registration icon 121*e*2 is received in S402, the process is bifurcated to the baggage registration process S405 in the bifurcation process S403.

In a case in which there is no selection input in S402, the process is bifurcated to the baggage checking process S406 in the bifurcation process S403.

In a case in which the selection input for the end icon 121*e*3 is received in S402, the baggage management function executing unit 104*b* returns the control entity to the basic operation executing unit 104*a* in the bifurcation process S403, and the basic operation executing unit 104*a* further displays the basic screen 121*a*, ends the operation of the baggage management function executing unit 104*b*.

After the respective processes of the baggage management place registration process S404, the baggage registration process S405, and the baggage checking process S406, the process returns to S401.

Figure 11:
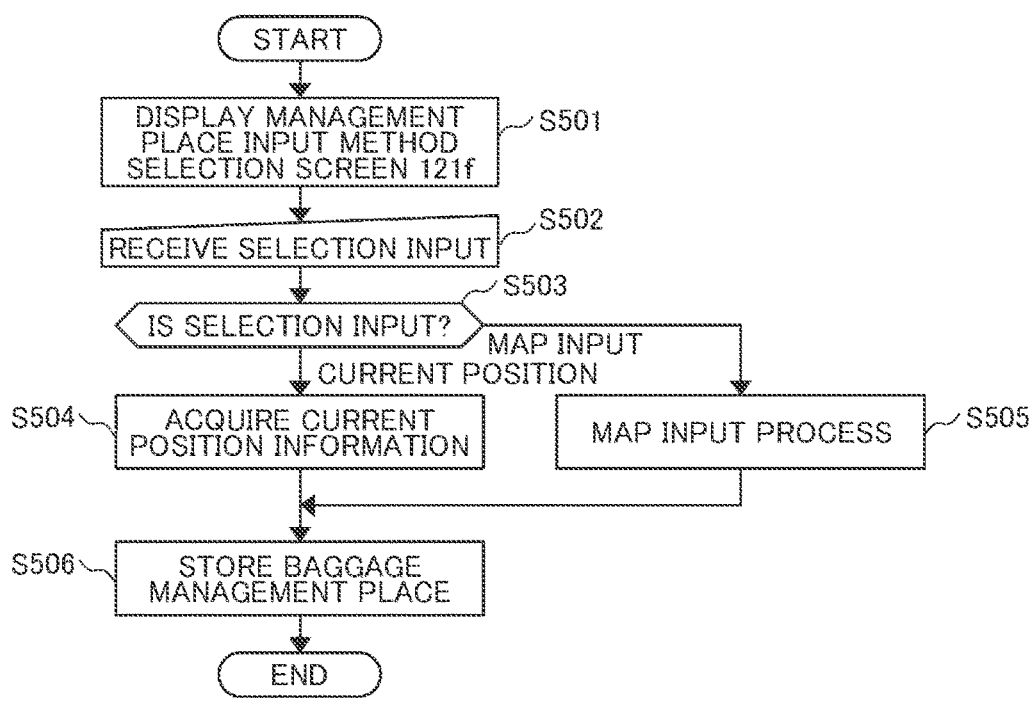
FIG. 11 is a flowchart illustrating an example of a baggage management place registration process of the apparatus for managing baggage in the second embodiment.

The baggage management place registration process S404 will be described with reference to a flowchart of FIG. 11. In FIG. 11, as the baggage management place registration process, a management place input method selection screen 121*f* illustrated in FIG. 12(*a*) is first displayed (S501). The management place input method selection screen 121*f* includes a current position input icon 121*f*1 and a map input icon 121*f*2.

Then, a selection input for icons constituting a management place input method selection screen 121*f* by the tap operation or the like of the user is received (S502), and the bifurcation process S503 is executed in accordance with the selected icon.

In a case in which the selection input for the current position input icon 121*f*1 is received in S502, the process is bifurcated to S504 in the bifurcation process S503, and the position information acquisition executing unit 104*c* acquires position information on the basis of signals received by the GPS receiving unit 111. The acquired position information is stored as baggage management place registration information in the baggage management information storage region 105*d*1 of the storage unit 105 (S506), and the process ends.

In a case in which the selection input for the map input icon 121*f*2 is received in S502, the process is bifurcated to S505 in the bifurcation process S503, and a map input process is executed.

Figure 12:
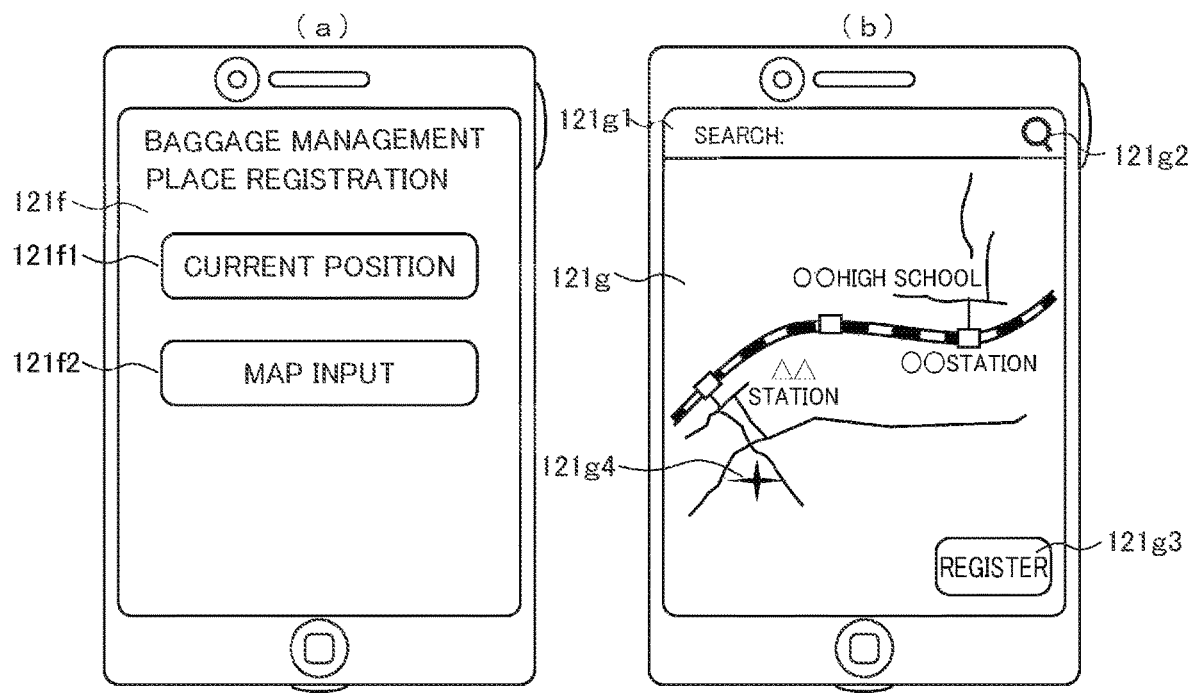
FIG. 12 is a diagram illustrating an example of a screen display in a baggage management place registration process of the apparatus for managing baggage in the second embodiment.

In the map input process S505, a map input screen 121*g* illustrated in FIG. 12(*b*) is displayed on the display unit 121. The map input screen 121*g* includes a search box 121*g*1, a search icon 121*g*2, a register icon 121*g*3, and an icon 121*g*4 indicating a position of a baggage management place to be registered in conjunction with a map near the retrieved place. A search is performed by inputting information of a place to be registered as the baggage management place in the search box 121*g*1 and tapping the search icon 121*g*2, and the icon 121*g*4 is displayed at a position of a searched place in a map near the position of the searched place. Alternatively, a position of the icon 121*g*4 is moved by moving a position on the map at which the icon 121*g*4 is displayed in a state touched by a finger and lifting the finger at a position desired to be registered. When the register icon 121*g*3 is tapped, the position on the map at which the icon 121*g*4 is displayed is acquired as position information of the baggage management place. The acquired position information is stored in the baggage management information storage region 105*d*1 of the storage unit 105 as the baggage management place registration information (S506), and the process ends.

Figure 13:
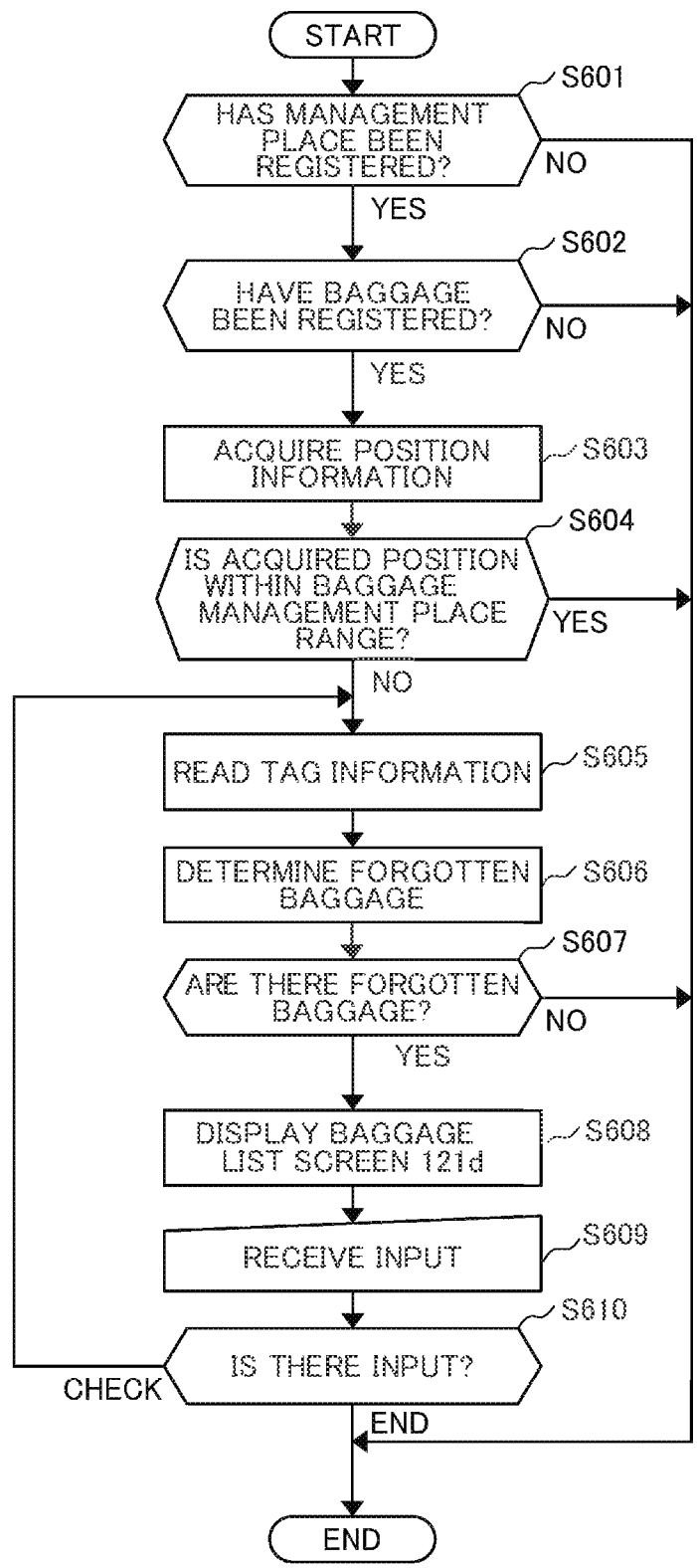
FIG. 13 is a flowchart illustrating an example of a baggage checking process of the apparatus for managing baggage in the second embodiment.

Next, the baggage checking process S406 will be described with reference to a flowchart of FIG. 13. In FIG. 13, in the baggage checking process, a bifurcation process based on whether or not the baggage management place is registered is performed (S601). In a case in which the baggage management place is not registered (No), the baggage checking process S406 ends, the process returns to S401 of FIG. 9, and the baggage management process selection screen 121*e* is displayed. In a case in which the baggage management place is registered (Yes), the flow advances to S602, and a bifurcation process based on whether or not the baggage are registered. In a case in which the baggage are not registered (No), the baggage checking process S406 ends, the process returns to S401 of FIG. 9, and the baggage management process selection screen 121*e* is displayed. In a case in which the baggage are registered (Yes), the position information is acquired on the basis of signals received by the GPS receiving unit 111 by the position information acquisition executing unit 104*c* (S603).

Then, a bifurcation process is performed depending on whether or not the acquired position is within a predetermined distance (for example, within 20 m) from a position stored in the baggage management information storage region 105*d*1 as the baggage management place registration information (S604). In a case in which the acquired position is within the predetermined distance range (Yes), it is determined that the user did not leave the predetermined place, and the baggage checking process S406 ends. In a case in which the acquired position is out of a range of the predetermined distance (No), it is determined that the user left the predetermined place, and the tag information of the radio tag 300 of the baggage located near the apparatus for managing baggage 100 is read by the tag reader unit 107 (S605). Then, in the baggage registration process S405, the radio tag information of the baggage stored in the baggage management information storage region 105*d*1 as the baggage registration information is compared with the radio tag information of the baggage read in S605, and for the radio tag of the baggage stored as the baggage registration information, a baggage which is not included in the radio tag of the baggage read in S605 is determined as the forgotten baggage (S606). Then, a bifurcation process is performed in accordance with the presence/absence of the forgotten baggage (S607), and in a case in which there is no forgotten baggage (No), the baggage checking process S406 ends, the process returns to S401 of FIG. 9, and the baggage management process selection screen 121*e*. In a case in which there is no forgotten baggage, display indicating that there is no forgotten baggage may be performed.

In a case in which there is a forgotten baggage (Yes), the baggage list screen 121*d* illustrated in FIG. 8(*b*) is displayed on the display unit 121 (S608). The baggage list screen 121*d* includes the baggage list 121*d*1, the check icon 121*d*2, and the end icon 121*d*3.

Then, the baggage management function executing unit 104*b* receives the selection input for the icons constituting the baggage list screen 121*d* by the tap operation or the like of the user (S609), and executes the bifurcation process S610 in accordance with the selected icon.

In a case in which the selection input for the check icon 121*d*2 is received in S609, the process returns to S605 in the bifurcation process S610, and the tag information of the radio tag 300 located near the apparatus for managing baggage 100 is read again.

In a case in which the selection input for the end icon 121*d*3 is received in S609, the baggage checking process S406 ends in the bifurcation process S610, the process returns to S401 in FIG. 9, and the baggage management process selection screen 121*e* is displayed.

The baggage registration process S405 is the same as the baggage registration process S104 of FIG. 4, and description thereof is omitted.

Thus, in the present embodiment, for example, when the user leaves home, the tag information of the radio tags of baggage is read, and the baggage registration information is stored, or when the user arrives at a lodging place of a business trip destination or a travel destination, the tag information of the radio tags of baggage is read, and the baggage registration information is stored. Further, the lodging place of the business trip destination or the travel destination is stored as the baggage management place through the map input in advance, or when the user arrives at a lodging place of a business trip destination or a travel destination, the position information of the current position is acquired and stored as the baggage management place. Then, when the user leaves the baggage management place, the tag information of the baggage is automatically read, and the baggage are checked. Accordingly, since a baggage which is not included in the baggage when the user leaves the lodging place serving as the baggage management place among the baggage when the user leaves home or when the user arrives at the lodging place is automatically displayed as the forgotten baggage, it is possible to prevent the baggage from being forgotten at the business trip destination or the travel destination.

As described above, the present embodiment provides an apparatus for managing baggage which includes a reader unit that reads tag information of a radio tag installed in a baggage, a storage unit that stores the tag information read by the reader unit, and a control unit that compares the tag information stored in the storage unit with tag information newly read by the reader unit and determines a forgotten baggage and further includes a signal receiving unit that acquires a position calculation signal and a position information acquiring unit that acquires position information from the position calculation signal received by the signal receiving unit, wherein the storage unit stores the tag information read by the reader unit and the position information acquired by the position information acquiring unit, and when movement from a position of the position information stored in the storage unit to an outside of a predetermined range is performed, the control unit newly reads the tag information by the reader unit, compares the newly read tag information with the tag information stored in the storage unit, and determines the forgotten baggage.

Further, provided is a method for managing baggage including a first tag information reading process of reading tag information of a radio tag installed in a baggage, a process of storing the tag information read by the first tag information reading process, a second tag information reading process of reading the tag information of the radio tag installed in the baggage, and a process of comparing the read tag information with the tag information read in the second tag information reading process and determining a forgotten baggage and further including a position information acquisition process of acquiring position information, a process of storing the position information acquired in the position information acquisition process, and a moving detection process of detecting movement from a position of the stored position information to an outside of a predetermined range, wherein the second tag information reading process includes reading the tag information of the radio tag installed in the baggage when the movement is detected in the moving detection process.

Third Embodiment

In the present embodiment, acquisition of the position information of the baggage management place and storage of the baggage management place registration information are performed on the basis of schedule information.

An operation of the baggage checking process S406 in the present embodiment will be described with reference to a flowchart of FIG. 14. In FIG. 14, the same processes as those in FIG. 13 are denoted by the same reference numerals, and description thereof is omitted.

In the baggage checking process illustrated in FIG. 14, first, a bifurcation process is performed depending on whether or not the baggage management place is registered (S601). In a case in which the baggage management place is registered (Yes), the process proceeds to S602, and the bifurcation process based on whether or not baggage are registered is performed. Thereafter, the same processes as in the baggage checking process illustrated in FIG. 13 are performed.

In a case in which the baggage management place is not registered (No), the schedule information is read from the schedule information storage region 105d2 (S620), and a bifurcation process based on whether or not the information of a moving destination after the current time is described in the schedule information is performed (S621). In a case in which the information of the moving destination is not described (No), the baggage checking process S406 ends, the process returns to S401 of FIG. 9, and the baggage management process selection screen 121e is displayed. In a case in which the information of the moving destination is described (Yes), the position information of the moving destination is acquired from the map information data server 211 connected to the wide area public network 201 (S622). The acquired position information is stored in the baggage management information storage region 105d1 as the baggage management place registration information (S623), the process proceeds to S602, and a bifurcation process based on whether or not the baggage are registered is performed.

Thereafter, a process similar to the baggage checking process illustrated in FIG. 13 is performed.

In the present embodiment, in a case in which the information of the lodging place of the business trip destination or the travel destination is stored in the schedule stored in the schedule information storage region, the baggage management place is not registered when the user arrives at the lodging place, and thus it is possible to prevent the baggage from being forgotten at the business trip destination or the travel destination.

In the above embodiment, in a case in which the information of the lodging place of the business trip destination or the travel destination is stored in the schedule stored in the schedule storage region, the position of the lodging place may be stored as the registration information of the baggage management place in advance, and when the user moves into a range of a predetermined distance from the stored position, the tag information of the radio tags of the baggage may be read and stored as the baggage registration information. In this case, since a baggage which is not included in the baggage when the user leaves the lodging place among the baggage when the user arrives at the lodging place is displayed as the forgotten baggage, it is possible to prevent the baggage from being forgotten at the business trip destination or the travel destination.

As described above, the present embodiment provides an apparatus for managing baggage which includes a reader unit that reads tag information of a radio tag installed in a baggage, a storage unit that stores the tag information read by the reader unit, and a control unit that compares the tag information stored in the storage unit with tag information newly read by the reader unit and determines a forgotten baggage and further includes a schedule information acquiring unit that acquires schedule information and a moving destination position information acquiring unit that acquires moving destination position information from the schedule information acquired by the schedule information acquiring unit, wherein the storage unit stores the tag information read by the reader unit and the moving destination position information acquired by the moving destination position information acquiring unit, and when movement from a position of the moving destination position information stored in the storage unit to an outside of a predetermined range is performed, the control unit newly reads the tag information by the reader unit, compares the newly read tag information with the tag information stored in the storage unit, and determines the forgotten baggage.

Further, provided is a method for managing baggage including a first tag information reading process of reading tag information of a radio tag installed in a baggage, a process of storing the tag information read by the first tag information reading process, a second tag information reading process of reading the tag information of the radio tag installed in the baggage, and a process of comparing the read tag information with the tag information read in the second tag information reading process and determining a forgotten baggage and further including a schedule information acquisition process of acquiring schedule information, a moving destination position information acquisition process of acquiring moving destination position information from the schedule information acquired in the schedule information acquisition process, a process of storing the moving destination position information, and a moving detection process of detecting movement from a position of the stored moving destination position information to an outside of a predetermined range, wherein the second tag information reading process includes reading the tag information of the radio tag installed in the baggage when the movement is detected in the moving detection process.

Fourth Embodiment

In the present embodiment, acquisition of the position information of the baggage management place, storage of the baggage management place registration information, reading of the tag information of the radio tags of the baggage, and storage of the baggage registration information are performed consecutively.

Figure 15:
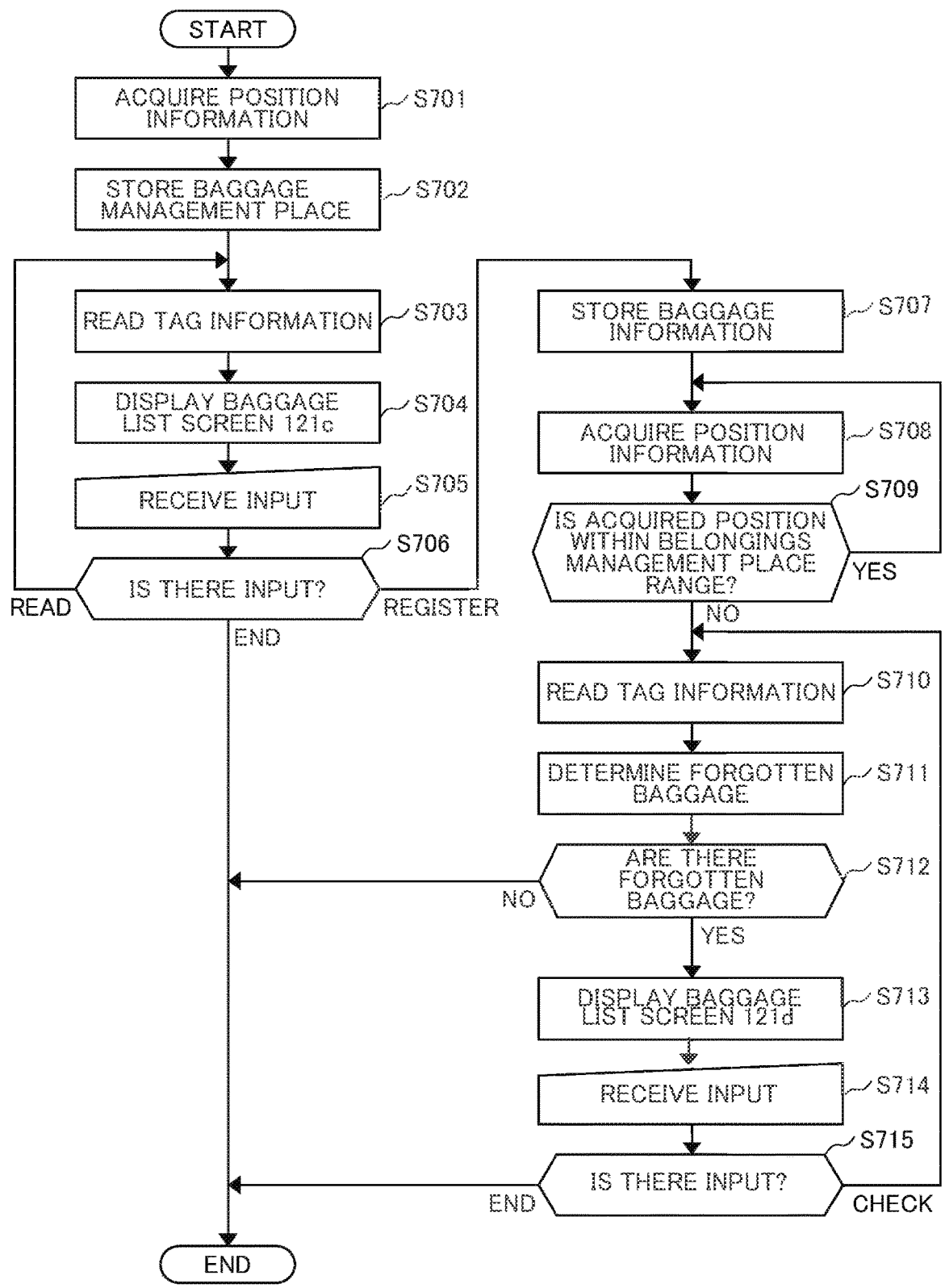
FIG. 15 is a flowchart illustrating an operation example of a baggage management function executing unit of an apparatus for managing baggage in a fourth embodiment.

An operation example of the baggage management function of baggage managing device 100 in the present embodiment will be described with reference to a flowchart illustrated of FIG. 15.

In the apparatus for managing baggage 100 operating under the control of the basic operation executing unit 104a, if the icon 121a2 on the basic screen 121a is selected by the tap operation or the like, the basic operation executing unit 104a activates the baggage management function executing unit 104b and transfers a control entity as the baggage management function executing unit 104b.

In the baggage management function executing unit 104b, the position information is acquired on the basis of the signals received by the GPS receiving unit 111 by the position information acquisition executing unit 104c (S701), and the acquired position information is registered in the baggage management information storage region 105d1 of the storage unit 105 as the baggage management place registration information (S702).

Then, the tag information of the radio tag 300 located near the apparatus for managing baggage 100 is read by the tag reader unit 107 (S703).

The baggage list screen 121c illustrated in FIG. 8(a) is displayed on the display unit 121 on the basis of the read tag information of the radio tag (S704). The baggage list screen 121c includes a list 121c1 of baggage corresponding to the read tag information of the radio tag, a read icon 121c2, a register icon 121c3, and an end icon 121c4.

Then, the baggage management function executing unit 104b receives the selection input for the icon constituting the baggage list screen 121c by the tap operation or the like of the user (S705), and executes a bifurcation process S706 in accordance with the selected icon.

In a case in which the selection input for the end icon 121c4 is received in S705, the baggage management function executing unit 104b returns the control entity to the basic operation executing unit 104a in the bifurcation process S706, and the basic operation executing unit 104a displays the basic screen 121a, and the operation of the baggage management function executing unit 104b ends.

In a case in which the selection input for the read icon 121c2 is received in S705, the process returns to S703 in the bifurcation process S706, and the tag information of the radio tag 300 of the baggage located near the apparatus for managing baggage 100 is read again.

In a case in which the selection input for the register icon 121c3 is received in S705, the tag information of the radio tag of baggage read in S703 is stored in the baggage management information storage region 105d1 as the baggage registration information (S707).

Then, the position information is acquired by the position information acquisition executing unit 104c (S708), the bifurcation process is executed depending on whether or not the acquired position is within a predetermined distance from the position stored in the baggage management information storage region 105d1 as the baggage management place registration information (S709). In a case in which the position acquired in S708 is within the range of the predetermined distance (Yes), the process returns to S708. In a case in which the position acquired in S708 is out of the range of the predetermined distance (No), the tag reader unit 107 reads the tag information of the radio tag 300 of the baggage located near the apparatus for managing baggage 100 (S710). Then, in S707, the radio tag information stored in the baggage management information storage region 105d1 as the baggage registration information is compared with the radio tag information of the baggage read in S710, and for the radio tag stored as the baggage registration information, a baggage which is not included in the radio tags of the baggage read in S710 is determined as the forgotten baggage (S711). Then, the bifurcation process is performed in accordance with the presence/absence of the forgotten baggage (S712), and in a case in which there is no forgotten baggage (No), the baggage management function executing unit 104b returns the control entity to the basic operation executing unit 104a, the basic operation executing unit 104a further displays the basic screen 121a, and the operation of the baggage management function executing unit 104b ends.

In a case in which there is a forgotten baggage (Yes), the baggage list screen 121d illustrated in FIG. 8(b) is displayed on the display unit 121 (S713). The baggage list screen 121d includes the baggage list 121d1, the check icon 121d2, and the end icon 121d3.

Then, the baggage management function executing unit 104b receives the selection input for the icons constituting the baggage list screen 121d by the tap operation or the like of the user (S714), and executes the bifurcation process S715 in accordance with the selected icon.

In a case in which the selection input for the check icon 121d2 is received in S714, the process returns to S710 in the bifurcation process S715, and the tag information of the radio tag 300 located near the apparatus for managing baggage 100 is read again.

In a case in which the selection input for the end icon 121d3 is received in S714, the baggage management function executing unit 104b returns the control entity to the basic operation executing unit 104a in the bifurcation process S715, and the basic operation executing unit 104a further displays the basic screen 121a, and the operation of the baggage management function executing unit 104b ends.

After the tag information is read in S703, the display of the baggage list screen in S704 for checking may be omitted, and the storage process to the baggage management information storage region of S707 may be performed without performing the reception of the selection input of S705 or the bifurcation process of S706.

In the above embodiments, for example, the baggage management function executing unit 104b is executed when the user arrives at the lodging place of the business trip destination or the travel destination, and a baggage which is not included in the baggage when the user leaves the lodging place among the baggage when the user arrives at the lodging place is displayed as the forgotten baggage, and thus it is possible to prevent the baggage from being forgotten at the business trip destinations or the travel destinations.

In the first to fourth embodiments, for example, when the user leaves home or when the user arrives at the lodging place of the business trip destination or the travel destination, the tag information of the radio tags of the baggage is read, and the baggage corresponding to the read radio tags are registered as the baggage, and thus there is no need to generate and register a list of baggage in advance.

Further, in the first to third embodiments, in a case in which the reading of the tag information of the radio tags of the baggage and the storage of the baggage registration information are performed when the user leaves home, it is possible to check the baggage to be brought to the business trip destination and the travel destination by viewing the baggage list screen 121c.

Further, in the second to fourth embodiments, forgotten baggage checking is automatically performed when the user leaves the registered position such as the lodging place of the business trip destination or the travel destination, and a notification can be performed by display or the like in a case in which there is a forgotten item.

In the above description of the embodiments, the position information acquisition executing unit 104c acquires the position information on the basis of the signals received by the GPS receiving unit 111, but the present invention is not limited thereto, and the position information may be acquired through the LAN communication unit 141, or the position information may be acquired using information such as a service set identifier (SSID) of the wireless communication access point 202 installed in the business trip destination, the lodging place, or the like.

Further, it may be determined whether or not the user is located within a range of a predetermined distance from the baggage management place depending on whether or not it is possible to detect the SSID of the wireless communication access point 202 installed in the business trip destination, the lodging place, or the like. Alternatively, the position information may be acquired using unique information of the base station 203 of the mobile communication network. Alternatively, the position information may be acquired through a beacon or the like using BlueTooth communication installed in the business trip destination, the lodging place, or the like. Further, the position information may be acquired using strength of a radio wave received from the wireless communication access point 202 or the base station 203 of the mobile communication network.

In the above embodiments, the baggage list screen 121d is displayed when there is a forgotten baggage, but a notification of the forgotten baggage may be given through a sound or/and vibration in addition to the display. Further, a notification may be given to an information terminal such as a wristwatch type terminal which cooperates with the apparatus for managing baggage 100 by means of BlueTooth communication or the like.

In the above embodiments, the functions of the present invention and the like have been described as being implemented by executing three programs, that is, the baggage management program 105a, the position information acquisition program 105b, and the schedule management program 105c mainly, but the functions of the present invention may be implemented by executing only one program having the same functions as the respective functions of the three programs.

In the apparatus for managing baggage 100 of the above embodiments, a configuration example in which the tag reader unit 107 is internally installed has been described, but a device that reads the tag information of the radio tag 300 may be separately installed, and information read through the expansion interface unit 108 may be acquired.

Fifth Embodiment

Figure 16:
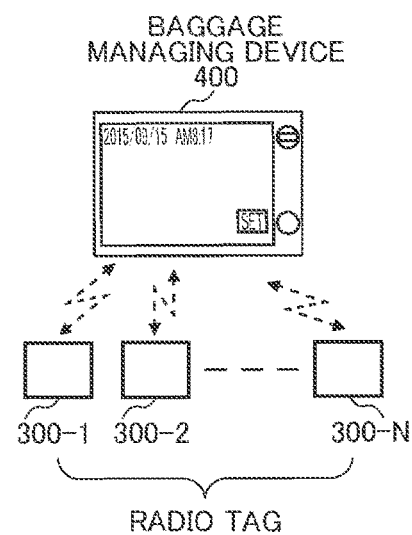
FIG. 16 is a diagram illustrating a use state of an apparatus for managing baggage in a fifth embodiment.

FIG. 16 is a diagram illustrating a use state of an apparatus for managing baggage 400 in the present embodiment. For example, the apparatus for managing baggage 400 is installed at a front door, and reads radio tags 300 (300-1 to 300-N) installed in baggage of the user leaving home and manages the baggage. The radio tag 300 is not limited to that installed in in a baggage in advance and may be attached to a baggage like a seal.

Figure 17A:
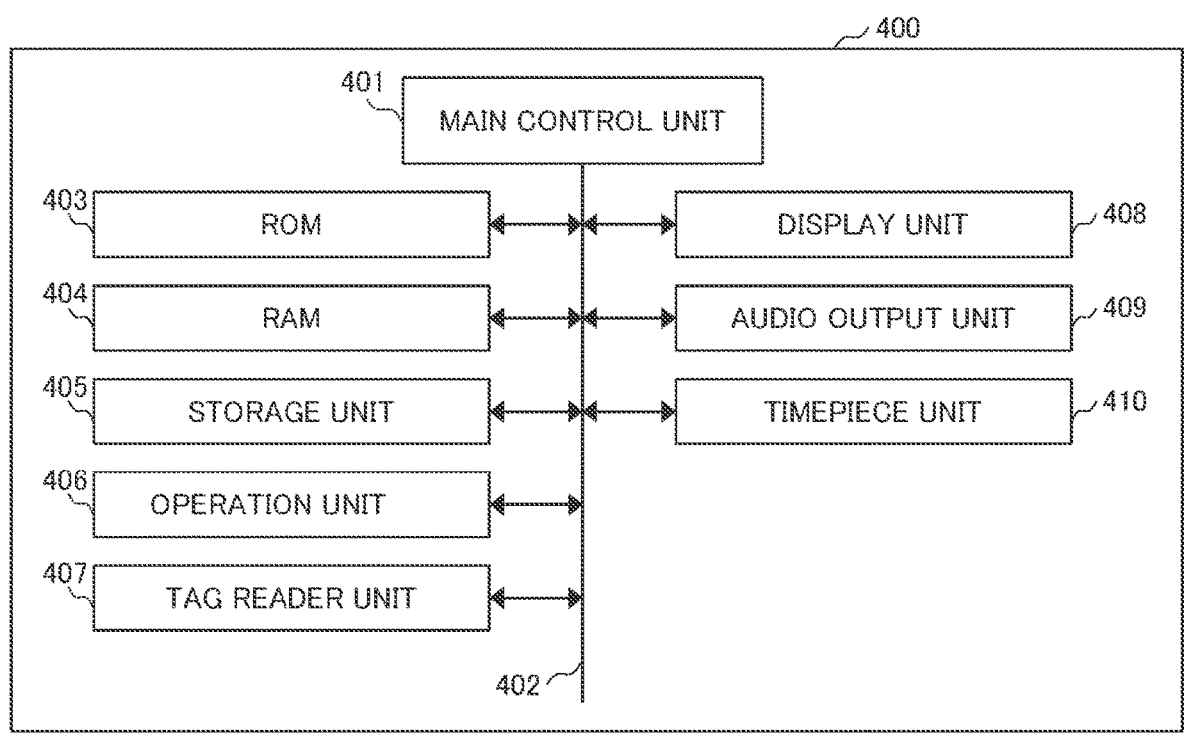
FIG. 17A is a diagram illustrating a hardware configuration of the apparatus for managing baggage in the fifth embodiment.

FIG. 17A is a diagram illustrating a hardware configuration of the apparatus for managing baggage 400. In FIG. 17A, the apparatus for managing baggage 400 includes a main control unit 401, a system bus 402, a ROM 403, a RAM 404, a storage unit 405, a operation unit 406, a tag reader unit (tag information reading unit)407, a display unit 408, and an audio output unit 409 corresponding to the main control unit 101, the system bus 102, the ROM 103, the RAM 104, the storage unit 105, the operation unit 106, the tag reader unit 107, the display unit 121, and the audio output unit 131 in FIG. 1A of the first embodiment, and since functions thereof are similar, description thereof is omitted.

The apparatus for managing baggage 400 further includes a timepiece unit 410. The timepiece unit 410 measures an elapsed time from a date and time set by the user, for example, using a real time clock (RTC) circuit, and outputs information of a date, a time, and a day of the week. The main control unit 401 reads information output from the timepiece unit 410 and performs a process on the basis of the date, the time, and the day of the week.

In the tag reader unit (tag information reading unit) 407, it is appropriate to set a read distance for the radio tag 300 to, for example, about 1 m. Alternatively, the tag reader unit 407 may not be internally installed, and the tag information may be acquired by reading the information through a tag reader device connected to the outside.

The audio output unit 409 is a speaker and gives a notification of a warning sound or the like to the user of the apparatus for managing baggage 400.

FIG. 17B is a diagram illustrating a software configuration of the apparatus for managing baggage 400 and illustrates functions of the ROM 403, the RAM 404, and the storage unit 405 in FIG. 17A.

The main control unit 401 constitutes the baggage management executing unit 403a by executing a program stored in the ROM 403 and controls the blocks constituting the apparatus for managing baggage 400. The RAM 404 constitutes a temporary storage region (temporary storage unit) 404a which temporarily holds data necessary for executing the program stored in the ROM 403. The storage unit 405 constitutes a management information storage region (management information storage unit) 405a which stores information used for baggage management by the baggage management executing unit 403a.

FIG. 18 is a diagram illustrating an external appearance of the apparatus for managing baggage 400 and a display example of a home screen 408a. When a power key 406k of the apparatus for managing baggage 400 is pushed, the device is powered on, and the home screen 408a is displayed on the display unit 408. In the home screen 408a, user registration icon 408a1, a baggage registration A icon 408a2, a baggage check icon 408a3, and the like are displayed as icons associated with processes executed by the baggage management. When the user selects any one of the icons, the process associated with the selected icon is executed.

The icon selection can be detected by a touch panel if a position on the display unit 408 at which an icon of interest is displayed is tapped with a finger. Alternatively, the icon may be selected by a operation key such as a cross cursor key or a decision key (not illustrated).

Figure 19:
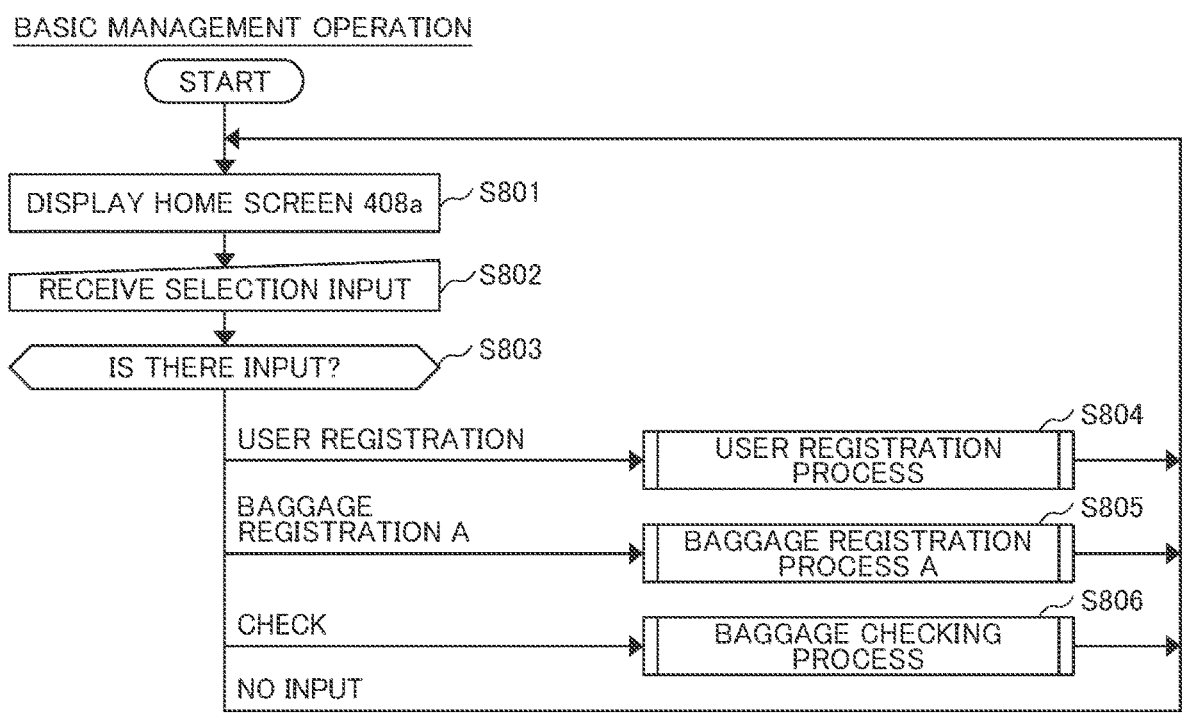
FIG. 19 is a flowchart illustrating a basic process performed by a baggage management executing unit in the fifth embodiment.

FIG. 19 is a flowchart illustrating a basic process performed by the baggage management executing unit 403a of the apparatus for managing baggage 400.

In the baggage management executing unit 403a, first, the home screen 408a is displayed (S801). A selection input for an icon displayed on the home screen 408a by the tap operation or the like of the user is received (S802), and a bifurcation process is performed in accordance with the selected icon (S803).

In a case in which a selection input for the user registration icon 408a1 is received, the process is bifurcated to a user registration process S804, and in a case in which a selection input for the baggage registration A icon 408a2 is received, the process is bifurcated to a baggage registration process A S805, and in a case in which a selection input for the baggage check icon 408a3 is received, the process is bifurcated to a baggage checking process S806. In a case in which there is no selection input, and after the respective processes of the user registration process S804, baggage registration process A S805, and the baggage checking process S806 are executed, the process returns to S801, and the home screen 408a is displayed again.

The respective processes of the user registration process S804, the baggage registration process A S805, and the baggage checking process S806 will be described below.

Figure 20:
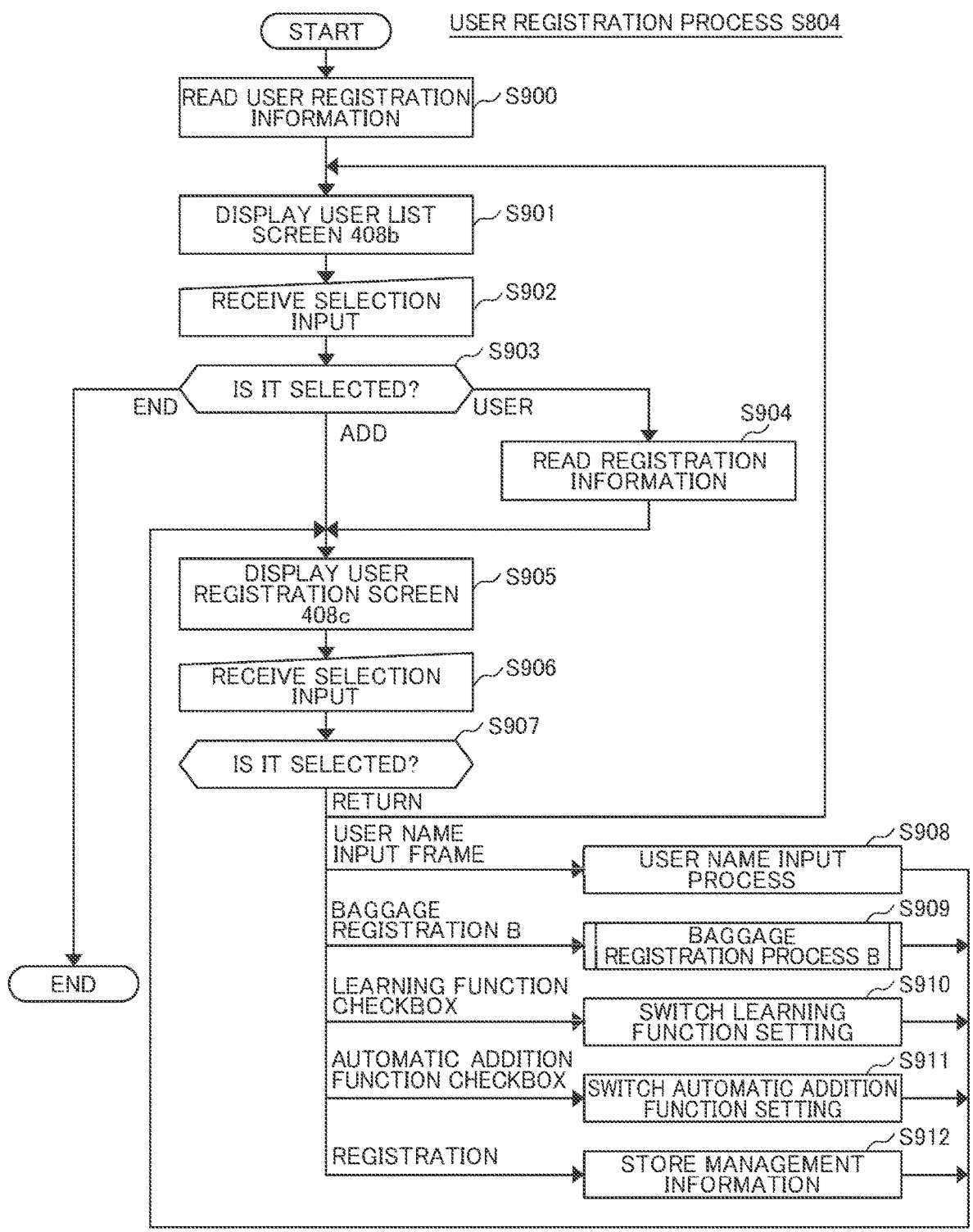
FIG. 20 is a flowchart illustrating an example of a user registration process in the fifth embodiment.
Figure 21A:
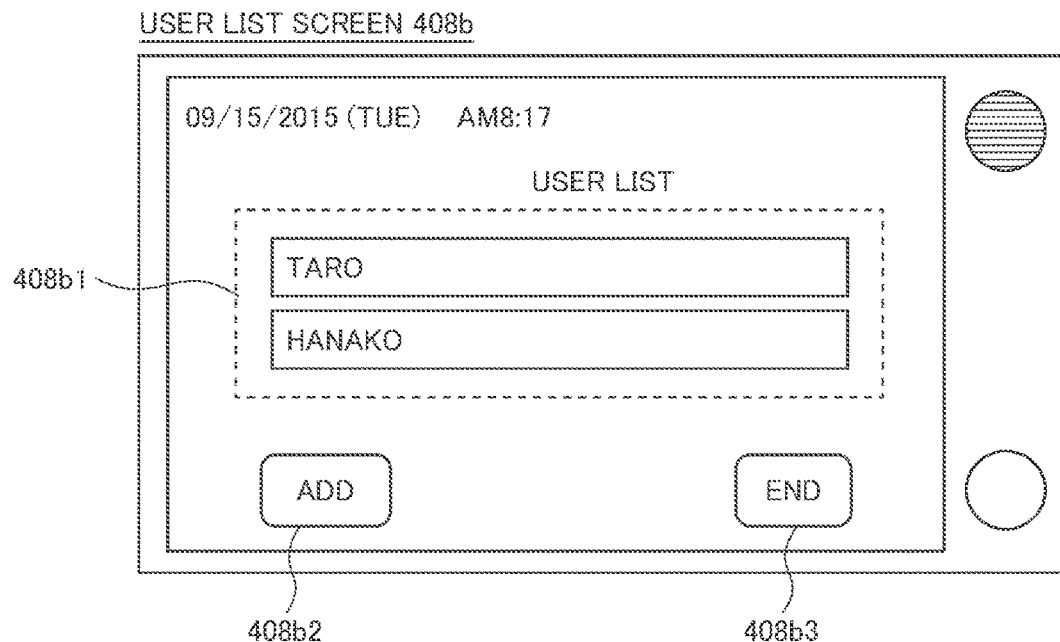
FIG. 21A is a diagram illustrating a display example of a user list screen in the fifth embodiment.
Figure 21B:
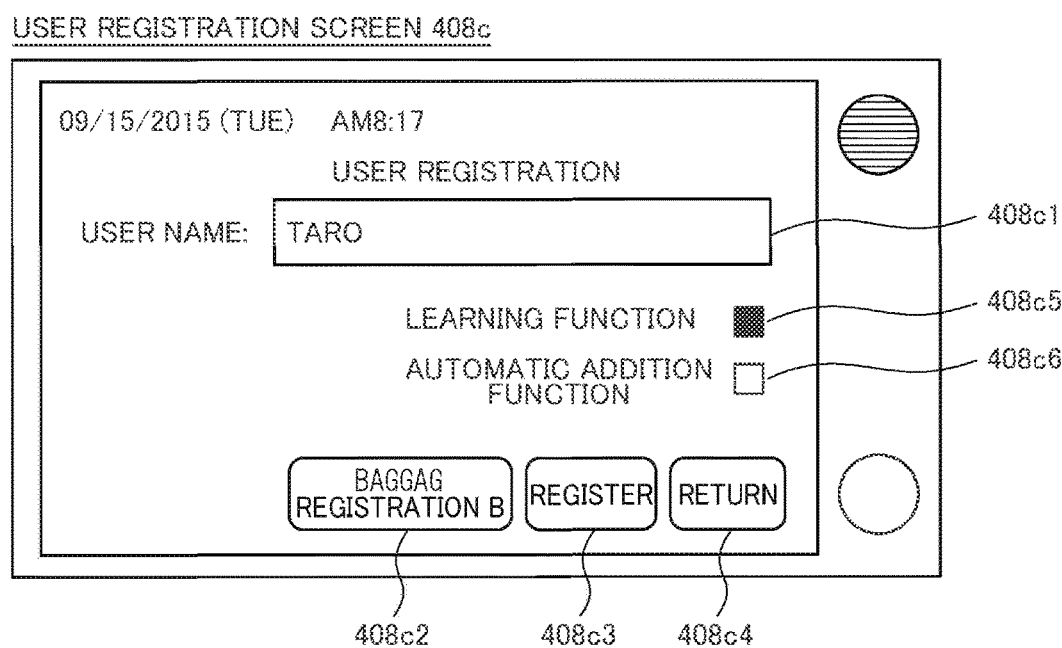
FIG. 21B is a diagram illustrating a display example of the user registration screen in the fifth embodiment.

FIG. 20 is a flowchart illustrating an example of the user registration process S804. Further, a display screen being processed is illustrated in FIGS. 21A and 21B.

In the user registration process S804, first, the registration information (baggage management information) of the user stored in the management information storage region 405a of the storage unit 405 is read (S900), and a user list screen 408b is displayed (S901). FIG. 21A illustrates a display example of the user list screen 408b. The user list screen 408b of the present display example includes a user list 408b1 in which registered user names are described, an add icon 408b2, and an end icon 408b3.

Then, the baggage management executing unit 403a receives a selection input for the user list 408b1 or the icon 408b2 or 408b3 constituting the user list screen 408b by the tap operation or the like of the user (S902), and a bifurcation process S903 is executed in accordance with a user name or an icon which is selected and input. In a case in which the selection input for the end icon 408b3 is received in step S902, the user registration process ends.

In a case in which the selection input for the user name displayed in the user list 408b1 is received in S902, the registration information stored in the management information storage region 405a of the storage unit is read corresponding to the selected user name (S904), and the process proceeds to S905. In a case in which the selection input for the add icon 408b2 is received in S902, the process proceeds to S905.

In step S905, a user registration screen 408c is displayed. FIG. 21B illustrates a display example of the user registration screen 408c. The user registration screen 408c of the present display example includes a user name input frame 408c1, a baggage registration B icon 408c2, a register icon 408c3, return icon 408c4, a baggage learning function checkbox 408c5, and an automatic baggage addition function checkbox 408c6. In a case in which the selection input for the user name displayed in the user list is received in S902, the user name input frame 408c1, the baggage learning function checkbox 408c5, and the automatic baggage addition function checkbox 408c6 are displayed on the basis of the user name or the registration information of a baggage learning function ON/OFF setting and an automatic baggage addition function ON/OFF setting read in S904.

Then, a selection input for an icon, an input box, and a checkbox displayed on the user registration screen 408c is received by the tap operation or the like of the user (S906), and a bifurcation process is executed in accordance with the icon, the input box, and the checkbox which are selected (S907). In a case in which the selection input for the return icon 408c4 is received in S906, the process returns to S901, and the user list screen 408b is displayed.

In a case in which the user name input frame 408c1 is selected by the tap operation in S906, a user name input process is performed (S908). In the user name input process S908, for example, a soft keyboard is displayed (not illustrated in FIG. 21B), and it is possible to newly register the user name or change or correct the registered user name.

In a case in which the selection input for the baggage registration B icon 408c2 is received in S906, the baggage registration process B for the user name input in S908 is executed (S909). The baggage registration process B will be described later with reference to FIG. 22.

If the baggage learning function checkbox 408c5 is selected by the tap operation in S906, in, switching of the ON/OFF setting of the baggage learning function is performed (S910). In the baggage learning function checkbox 408c5, the on/off setting of the baggage learning function is switched each time the tap operation is performed. In the display example of FIG. 21B, a black square indicates an ON state, and a white square indicates an OFF state.

In a case in which the automatic baggage addition function checkbox 408c6 is selected by the tap operation in S906, switching of the ON/OFF setting of the automatic baggage addition function is performed (S911). In the automatic baggage addition function checkbox 408c6, the on/off setting of the automatic baggage addition function is switched each time the tap operation is performed. In the display example of FIG. 21B, a black square indicates an ON state, and a white square indicates an OFF state.

In a case in which the selection input for the register icon 408c3 is received in S906, information such as the baggage registered in the baggage registration B process in S909, the baggage learning function ON/OFF setting of S910, and the automatic baggage addition function ON/OFF setting of S911 is stored in the management information storage region 405a of the storage unit 405 as the baggage management information in association with the user name input in the user name input process of S908 (S912).

After the process of S908 to S912 is executed, the process returns to S905, and the user registration screen 408c is displayed again.

Figure 22:
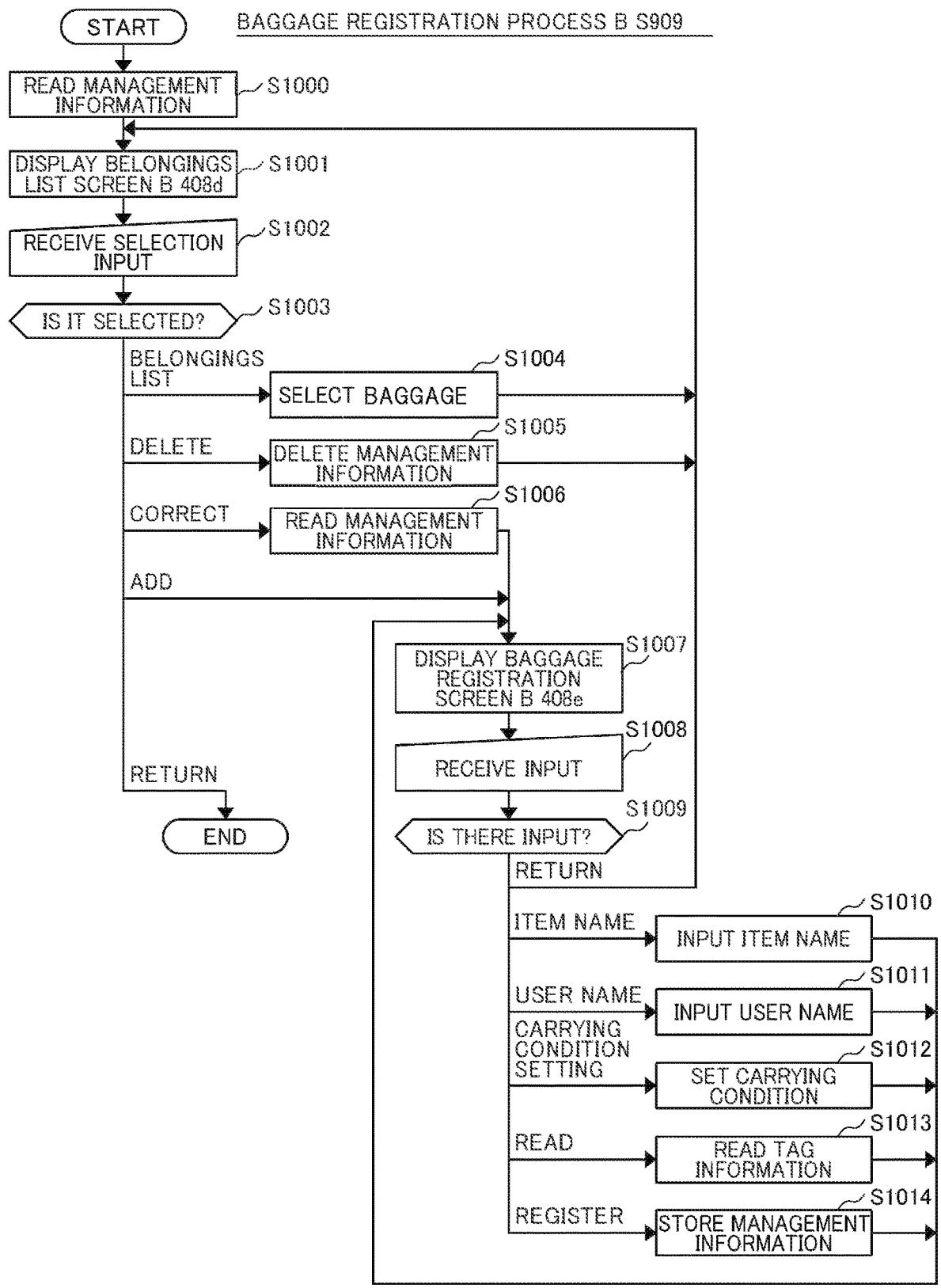
FIG. 22 is a flowchart illustrating an example of a baggage registration process B in the fifth embodiment.

FIG. 22 is a flowchart illustrating an example of the baggage registration process B (S909 in FIG. 20). Further, a display screen being processed is illustrated in FIGS. 21C and 21D.

In the baggage registration process B (S909), first, the baggage management information corresponding to the user name displayed in the user name input frame 408c1 of the user registration screen 408c is read from the management information storage region 405a of the storage unit (S1000), and a baggage list screen B (408d) is displayed (S1001).

FIG. 21C illustrates a display example of the baggage list screen B (408 d). The baggage list screen B of the present display example includes a user name 408d1, a baggage list 408d2 registered in association with a user name, a return icon 408d3, delete icon 408d4, correct icon 408d5, and an add icon 408d6. A user name input in the user name input frame 408c1 of the user registration screen 408c displayed in the user name 408*d*1. The baggage list 408*d*2 includes a management number, radio tag ID information, and an item name of a baggage.

Then, the baggage management executing unit 403*a* receives a selection input for the baggage list 408*d*2 or each icon constituting the baggage list screen 408*d* by the tap operation or the like of the user (S1002), and a bifurcation process S1003 is executed in accordance with the baggage list or the icon which is selected and input. In a case in which the selection input for the return icon 408*d*3 is received in S1002, the baggage registration B process S909 ends.

In a case in which a selection input for the baggage displayed in the baggage list 408*d*2 is received in S1002, the baggage which are selected and received are selected as a target to be deleted or corrected, and display indicating that the baggage are selected, for example, by inverting a display color (S1004). Here, an example in which a baggage in which "radio tag ID information" is "xxxx9" is selected as a target to be deleted or corrected is illustrated. Thereafter, the process returns to S1001.

In a case in which a selection input for the delete icon 408*d*4 is received in S1002, information is deleted from the management information storage region 405*a* of the storage unit for the baggage selected in S1004 (S1005). Thereafter, the process returns to S1001.

In a case in which a selection input for the correct icon 408*d*5 is received in S1002, the baggage management information is read from the management information storage region 405*a* of the storage unit for the baggage selected in S1004 (S1006), and the process proceeds to S1007. In a case in which a selection input for the add icon 408*d*6 is received in S1002, the process proceeds to S1007.

In S1007, a baggage registration screen B 408*e* is displayed. FIG. 21D illustrates a display example of the baggage registration screen B (408*e*). The baggage registration screen B of the present display example includes a management number 408*e*1, radio tag ID information 408*e*2, a baggage name input frame 408*e*3, a user name input frame 408*e*4, a carrying condition setting checkbox 408*e*5, a tag information read icon 408*e*6, a register icon 408*e*7, and a return icon 408*e*8. The user name displayed in the user name 408*d*1 of the baggage list screen B (408 *d*) is displayed in the user name input frame 408*e*4. It is possible to perform a setting for each day of the week for each event (here, for each business trip) through the carrying condition setting checkbox 408*e*5. In a case in which a selection input for the correct icon 408*d*5 is received in S1002, the registration information of the management number 408*e*1, the radio tag ID information 408*e*2, the baggage name input frame 408*e*3, the user name input frame 408*e*3, the user name input frame 408*e*4, and the carrying condition setting checkbox 408*e*5 is displayed on the basis of the baggage registration information read in S1006.

Then, the selection input for the icon, the input box, and the checkbox displayed in the baggage registration screen B by the tap operation or the like of the user is received (S1008), and the bifurcation process is performed in accordance with the icon, the input box, and the checkbox which is selected (S1009). In the selection input and the bifurcation processes S1008 and S1009, it is possible to perform a process in which the selection inputs for the icon, the input box, and the checkbox are combined. In a case in which the selection input for the return icon 408*e*8 is received in S1008, the process returns to S1001, and the baggage list screen 408*d* is displayed.

If the baggage name input frame 408*e*3 is selected by the tap operation in S1008, a baggage name input process is performed (S1010). In the baggage name input process S1010, for example, a soft keyboard is displayed (not illustrated in FIG. 21D), and it is possible to input and correct the item name.

If the user name input frame 408*e*4 is selected by the tap operation in S1008, the user name input process is performed (S1011). In the user name input process S1011, for example, a soft keyboard is displayed, and it is possible to input and correct the user name.

If the carrying condition setting checkbox 408*e*5 is selected by the tap operation in S1008, it is designated whether or not the baggage are carried on the day of the week and the business trip on which the baggage are carried as the carrying condition (S1012). Further, in order to cope with a case in which baggage differ depending on a time zone in which the user goes out such as a case in which baggage for school are different from baggage for an academy, any other carrying condition such as a time zone may be set as the carrying condition in addition to the day of the week on which the baggage are carried.

In a case in which the tag information read icon 408*e*6 is selected by the tap operation in S1008, the tag reader unit 407 reads the tag information of the radio tag 300 of the baggage located near baggage managing device 400 (S1013).

In a case in which a selection input for the register icon 408*e*7 is received in S1008, the information of the management number 408*e*1, the radio tag ID information 408*e*2, the baggage name input frame 408*e*3, the user name input frame 408*e*4, and the carrying name setting checkbox 408*e*5 displayed in the baggage registration screen B is stored in the management information storage region 405*a* of the storage unit 405 as the baggage management information (S1014).

After the process of S1010 to S1014 is executed, the process returns to S1007, and the baggage registration screen B (408*e*) is displayed again. The baggage name, the user name, and the carrying condition which are input in S1010 to S1012 and the tag information read in S1013 are displayed in the baggage registration screen B. Through the above process, the process of adding, correcting, or deleting the baggage of the selected user is performed.

Figures 23, 24:
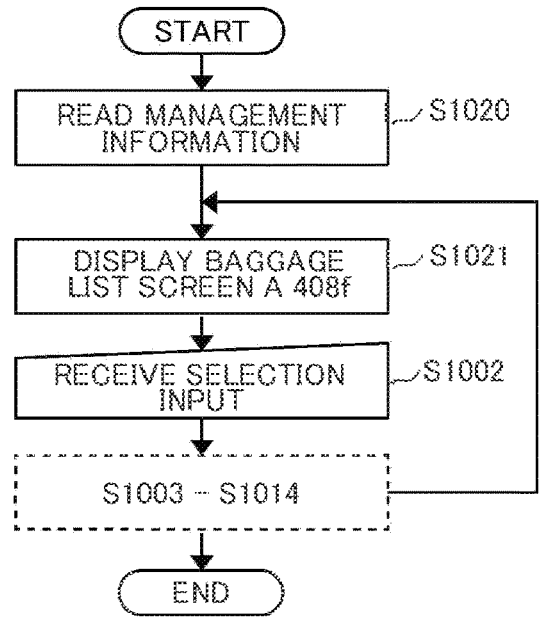
FIG. 23 is a flowchart illustrating an example of a baggage registration process A in the fifth embodiment.
FIG. 24 is a diagram illustrating a display example of a baggage list screen A in the fifth embodiment.

FIG. 23 is a flowchart illustrating an example of the baggage registration process A (S805) of FIG. 19. The baggage registration process A is similar to the baggage registration process B (S909) of FIG. 22, but the baggage registration is performed for all the registered users independently of the user registration process. The same processes as those in FIG. 22 are denoted by the same reference numerals, and description of common processes is omitted.

In the baggage registration process A (S805), the baggage management information of the baggage of all the registered users is read from the management information storage region 405*a* of the storage unit (S1020), and a baggage list screen A (408*f*) is displayed (S1021).

FIG. 24 illustrates a display example of the baggage list screen A (408*f*). Display items of the baggage list screen A correspond to the display items of the baggage list screen B (408*d*) of FIG. 21C and includes a registered baggage list 408*f*1, a return icon 408*f*2, a delete icon 408*f*3, a correct icon 408*f*4, add an icon 408*f*5. In the baggage list 408*f*1, in addition to the management number, the radio tag ID information, and the baggage name, the user name is added.

Then, the baggage management executing unit 403*a* receives the selection input for the baggage list or the icon constituting the baggage list screen 408*f* by the tap operation or the like of the user (S1002), and performs a process similar to the process of S1003 to S1014 of the baggage registration process B of FIG. 22 in accordance with the baggage list or the icon which is selected and input. In other words, the user performs the selection input for the baggage registration screen B (408e) of FIG. 21D.

With the above process, a process of adding, correcting, and deleting the baggage is performed for all the users.

Figure 25:
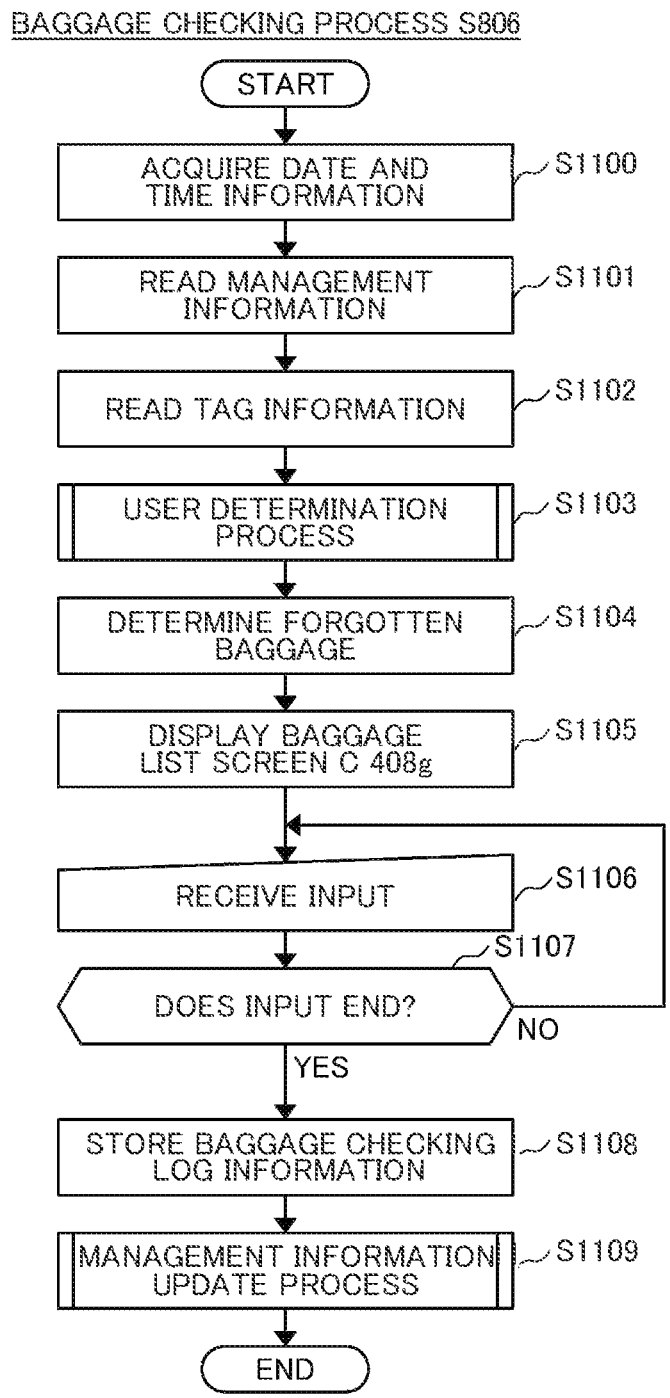
FIG. 25 is a flowchart illustrating an example of a baggage checking process in the fifth embodiment.

FIG. 25 is a flowchart illustrating an example of the baggage checking process S806 of FIG. 19. In the baggage checking process, determination and notification of the forgotten baggage and automatic addition registration of necessary items to be carried are performed.

First, date and time information is acquired from the timepiece unit 410 (S1100), and the baggage management information is read from the management information storage region 405a of the storage unit (S1101).

FIG. 26 illustrates an example of baggage management information 4050. A management number 11a, a radio tag ID 1ib, a user name 11c, a baggage name 11d, and a carrying condition setting 11e are stored as the baggage management information 4050. In the carrying condition setting 11e, it is distinguished whether or not it is necessary to carry the baggage on each day of the week or the business trip. In other words, when a setting flag is set to "1," it means that it is necessary to carry the baggage on a corresponding day of the week or the business trip, and when the setting flag is set to "0," it means that it is not necessary to carry the baggage on a corresponding day of the week or the business trip. The following description will proceed with an example of determining whether or not it is necessary to carry the baggage on each day of the week, but the same applies to a case in which it is determined whether or not it is necessary to carry the baggage for each event (on a business trip or the like).

Then, the tag reader unit 407 reads the tag information of the radio tag 300 for all the baggage being carried by the user (S1102), and performs a user identification process on the basis of information of the read radio tags and the baggage management information 4050 (S1103). The user identification process is to identify the user from the baggage, but it also corresponds to a case in which the baggage are shared by a plurality of users. The user identification process will be described later in detail with reference to FIG. 29.

If the user is identified, the baggage in which the carrying condition setting of the day of the week of the date and time information acquired in S1100 is set to a flag "1" (it is necessary to carry) are compared with the baggage of the radio tags read in S1102 with reference to the baggage management information 4050 of the user. Then, a baggage which is not included in the baggage of the read radio tags among the baggage of the flag "1" is determined as the forgotten baggage (S1104). A baggage list screen C (408g) is displayed to give a notification indicating the presence or absence of the forgotten baggage to the user (S1105).

FIG. 27 illustrates a display example of the baggage list screen C (408g). The baggage list screen C includes an identified user name 408g1, a list 408g2 of baggage which it is determined to be necessary for the user to carry on the day of the week of the date and time information acquired in S1100, and an end icon 408g3. The baggage list 408g2 includes a management number, radio tag ID information, and a baggage name. Then, the forgotten baggage are displayed to be distinguished from other baggage, for example, by reversing a display color of the baggage determined as the forgotten baggage in S1104. Here, a baggage in which a ID is "xxxx4," and a product name is "TARO-_pass case" is displayed as the forgotten baggage.

For the determination and the display of the forgotten baggage on the business trip, it is desirable that an icon of "business trip" be added to the baggage list screen C (408g) of FIG. 27, and when the user selects the icon, switching to the determination of the forgotten baggage on the business trip be performed. Further, in the present display example, baggage other than the forgotten baggage are also displayed, but only forgotten baggage may be displayed, or the number of forgotten baggage may be displayed.

Then, the baggage management executing unit 403a receives an input by the tap operation or the like of the user (S1106) and executes a bifurcation process S1107 depending on whether or not a selection input for the end icon 408g3 is received. In a case in which the selection input for the end icon 408g3 is not received (No), the process returns to S1106, and the input is received again. In a case in which the selection input for the end icon 408g3 is received (Yes), the process proceeds to S1108.

In S1108, baggage checking log information is generated on the basis of an identification result of the user and a checking result of the baggage and stored in the management information storage region 405a of the storage unit. In the management information storage region 405a, log information is generated each time a checking operation is performed, and the log information is accumulated for each date for each user.

FIG. 28 illustrates an example of baggage checking log information 4051. (a) illustrates a checking result for each user, and a checking date, a day of the week, a checking time, a radio tag ID read in S1102, and information indicating whether or not the user is on a business trip (business trip=1) are recorded. (b) illustrates a record of the number of baggage checking processes which are performed on each day of the week and a business trip day for each user (the number of checking operations which are performed by the apparatus for managing baggage 400). (c) illustrates a record of the number of baggage carryings for each day of week and a business trip (the number of detections of the radio tag ID attached to the baggage).

In step S1109, a management information update process is executed. In the management information update process, baggage determined to be unregistered are automatically registered, and baggage which it is necessary to carry are set automatically by the learning function. The management information update process will be described later with reference to FIG. 31. Thus, the baggage checking process S806 ends, the process returns to S801 of FIG. 19, and the home screen 408a is displayed.

As described above, according to the baggage checking process of the present embodiment, in a case in which the user does not carry the baggage set to be carried, it is possible to determine the baggage as the forgotten baggage and give a notification to the user. Since the carrying condition is set in association with each day of the week and the business trip, it is also possible to cope with a change in baggage depending on a condition such as the day of the week or the business trips, and thus usability is improved.

Figure 29:
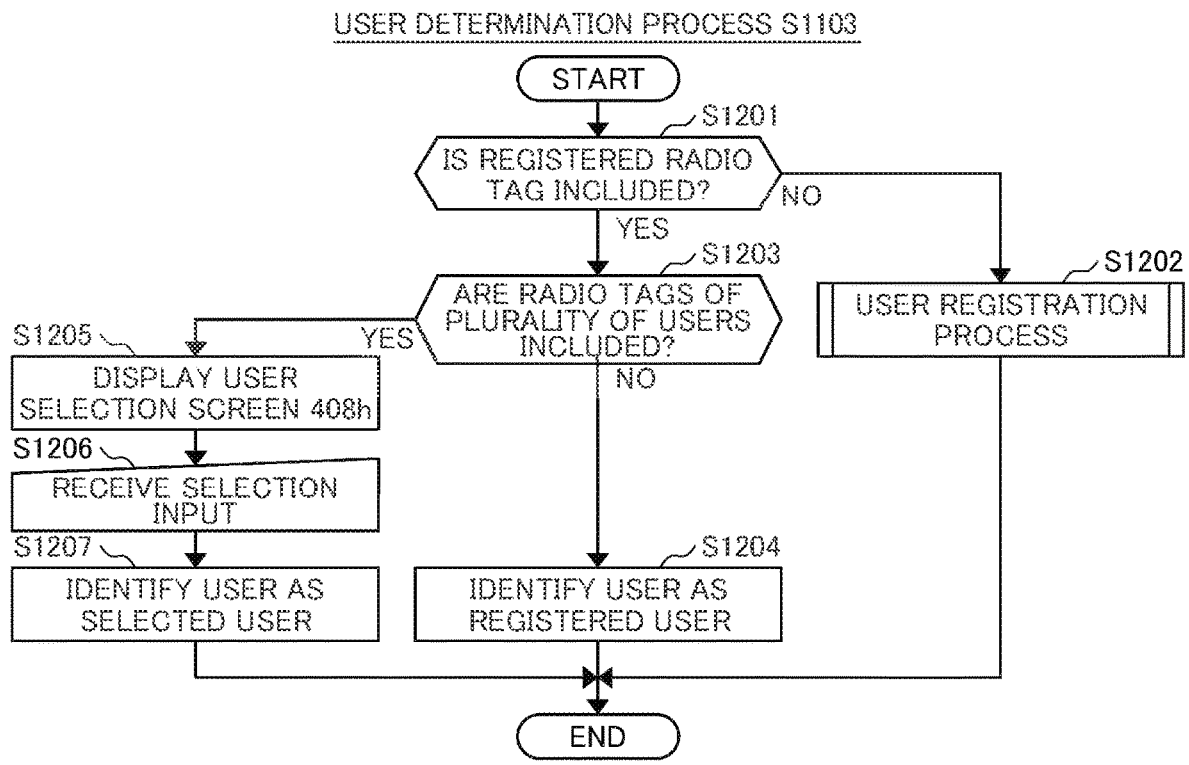
FIG. 29 is a flowchart illustrating an example of a user identification process in the fifth embodiment.

FIG. 29 is a flowchart illustrating an example of the user identification process S1103. In this case, the user performing the baggage checking is identified, and in the case of an unregistered user, the user registration is performed.

First, a bifurcation process is performed on the basis of whether or not the registered radio tag is included in the read radio tags (S1201). In a case in which the registered radio tag is included in the read radio tags (Yes), a bifurcation process is performed depending on whether or not radio tags of a plurality of users are included in the red radio tags (S1203).

In a case in which only the radio tag of one user is included in the read radio tag (No), it is determined that the user performing the baggage checking through the apparatus for managing baggage 400 is determined to be the user in which the read radio tag is registered (S1204). In a case in which only the radio tag of one user is included, a user checking screen for identity verification (a screen conforming to FIG. 30 to be described later) may be displayed, and it may be approved.

In a case in which the radio tags of a plurality of users are included in the red radio tags (Yes), a user selection screen 408h is displayed (S1205) to identify the user performing the baggage checking.

Figure 30:
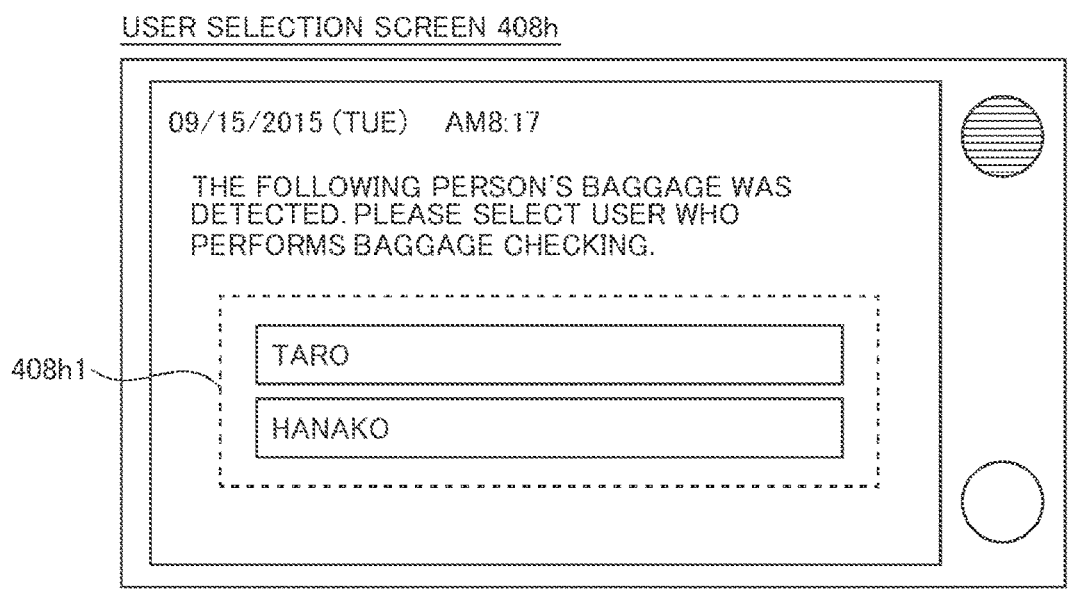
FIG. 30 illustrates a display example of a user selection screen in the fifth embodiment.

FIG. 30 illustrates a display example of the user selection screen 408h. A list 408h1 of a plurality of user names registered in association with the read radio tag is displayed in the user selection screen 408h. On the other hand, a selection input for the user list displayed by the tap operation or the like is received from the user performing the baggage checking (S1206), and the user of the selected user name is determined to perform the baggage checking through the apparatus for managing baggage 400 (S1207).

In a case in which the registered radio tag is not included in the read radio tags S1201 (No), the user registration process is performed (S1202). In the user registration process S1202, the same processing as the user registration process S804 illustrated in FIG. 20 is assumed to be performed. Accordingly, the user list screen 408b illustrated in FIG. 21A is displayed, and when the user is registered, the user name displayed in the list is selected, the baggage registration B icon 408c2 is selected in the user registration screen 408c of FIG. 21B, and the baggage are registered. If the user is not registered, the add icon 408b2 is selected in the user list screen 408b of FIG. 21A, and the user name or the like is input in the user registration screen 408c of FIG. 21B, the baggage registration B icon 408c2 is selected, and the baggage are registered. With the above processing, it is possible to identify the user performing baggage checking.

In the above embodiments, the user is selected in a case in which the radio tags corresponding to the baggage of a plurality of the users are read, but the forgotten baggage determination processing S1104 may be performed for a plurality of users corresponding to the read radio tags, and the baggage list screen may be displayed for each user. Further, in a case in which the radio tags corresponding to the baggage of a plurality of users are read, a user for whom a time at which the radio tag is read is close to a baggage checking time stored as the baggage checking log information may be selected.

Figure 31:
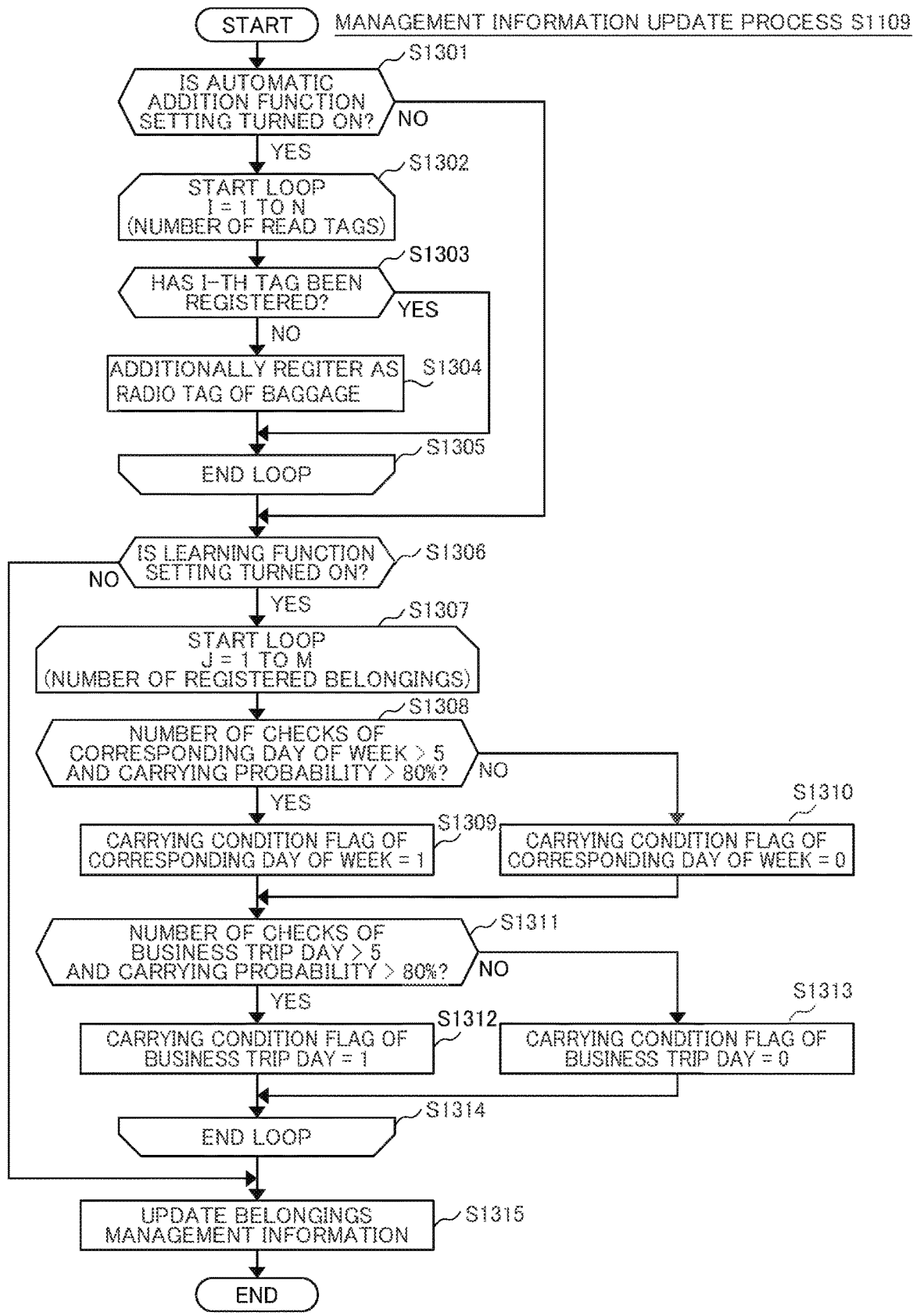
FIG. 31 is a flowchart illustrating an example of a management information update process in the fifth embodiment.

FIG. 31 is a flowchart illustrating an example of the management information update process S1109. In the management information update process, in a case in which unregistered baggage are detected, the unregistered baggage are automatically added as new baggage, and the carrying condition is set such that baggage with a high carrying frequency are automatically set as baggage to be carried.

First, in the setting of the user registration (FIG. 21B), a bifurcation process depending on whether the automatic baggage addition function checkbox 408c6 is turned on or off is performed (S1301). In a case in which the automatic baggage addition function setting is OFF (No), the process proceeds to S1306. In a case in which the setting of the automatic baggage addition function is ON (Yes), a loop process (S1302 to S1305) is repetitively performed N times up to the number N of radio tags obtained by reading a parameter I indicating an order of the read radio tag.

In step S1303, a bifurcation process depending on whether or not an I-th read radio tag ID is already registered is performed.

In a case in which the I-th read radio tag ID is unregistered (No), the unregistered I-th read radio tag is additionally registered as the radio tag of the baggage of the user identified in the user identification process S1103 (S1304). In a case in which the I-th read radio tag ID is registered (Yes), the process returns to the beginning of the loop process, and a process starting from S1303 is performed for the next parameter.

In step S1306, in the setting of the user registration (FIG. 21B), a bifurcation process is performed depending on whether or not the baggage learning function checkbox 408c5 is turned on or off (S1306). In a case in which the setting of the learning function is turned off (No), the process proceeds to S1315. In a case in which the setting of the learning function is turned on (Yes), the loop processing (S1307 to S1314) is repeated M times up to the number M of baggage obtained by registering a parameter J from 1.

In S1308, a process of determining whether or not a predetermined condition (a carrying requirement condition) is satisfied on the day of the week is performed for a J-th baggage. In this determination, the baggage checking log information 4051 of FIG. 28 is referred to. An example of the carrying requirement condition is a condition that the number of checkings of baggage on a corresponding day of the week is equal to or more than a predetermined number (for example, 5), and a probability of carrying the J-th baggage on the corresponding day of the week is equal to or larger than a predetermined value (for example, 80%). The carrying probability is calculated from a ratio of the number of readings of the radio tag of the baggage on a corresponding day of the week of FIG. 28(c) to the number of baggage checking processes performed for the baggage log information of FIG. 28(b) on the corresponding day of the week.

In a case in which the carrying requirement condition is satisfied (Yes) as a result of determination, the carrying condition flag of the day of the week for the J-th baggage is set to "1" (S1309). In a case in which the carrying requirement condition is not satisfied (No), the carrying condition flag of the day of the week for the J-th baggage is set to "0" (S1310).

In S1311, a determination process is made as to whether or not the above-mentioned carrying requirement condition is satisfied on the business trip date. As a result of the determination, in a case in which the carrying requirement condition is satisfied (Yes), the carrying condition flag of the business day is set to "1" (S1312). In a case in which the carrying requirement condition is not satisfied (No), the carrying condition flag of the business day is set to "0" (S1313).

After the loop process from S1307 to S1314 is performed, in S1315, the baggage management information of the user identified in the user identification process S1103 is updated and stored in the management information storage region 405a of the storage unit.

According to the management information update process described above, in a case in which an unregistered radio tag is read, it is possible to automatically register it as the baggage of the user determined by the user identification process S1103, and it is possible to conveniently register a new baggage. Further, even for the baggage in which the carrying condition is not set as the baggage to be carried on a corresponding day of the week or on a business trip in advance, it is possible to determine whether or the carrying requirement condition is satisfied through the learning function, regard the baggage as the baggage to be carried out automatically, and set the carrying condition.

According to the present embodiment, since the items to be carried are set in association with each day of the week or each event, it is also possible to cope with the change in the baggage depending on the condition such as the day of the week or the event. Further, it is possible to register items with high carrying frequencies automatically as baggage to be carried on the basis of the baggage checking result, and thus the usability is improved.

Sixth Embodiment

In the present embodiment, a system in which an information terminal device holding user information is connected to the apparatus for managing baggage described in the fifth embodiment, and the information terminal device and the apparatus for managing baggage manage the baggage in cooperation with each other. As a result, the baggage management function can be further expanded.

Figure 32:
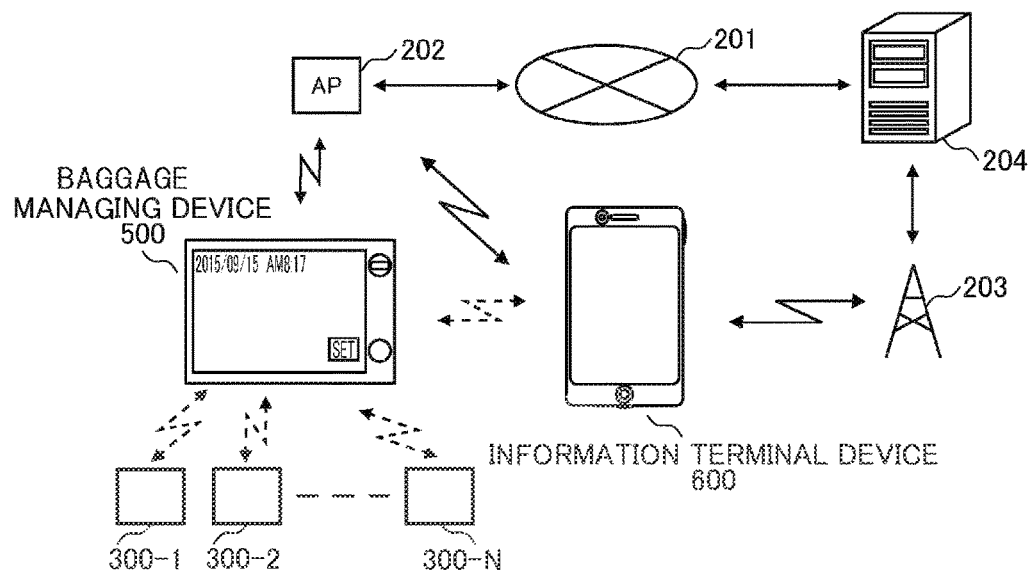
FIG. 32 is a configuration diagram illustrating a use state of a baggage management system in a sixth embodiment.

FIG. 32 is a configuration diagram illustrating a use state of the baggage managing system in the present embodiment. In the baggage managing system, an information terminal device 600 and an apparatus for managing baggage 500 establish a connection, perform communication with each other, and manage the baggage in cooperation with each other. As a communication means for that purpose, a wide area public network 201 such as the Internet, a wireless communication access point 202, a base station 203 of a mobile telephone communication network, and a mobile telephone communication server 204 are used. Accordingly, even when the information terminal device 600 is located in a place away from the apparatus for managing baggage 500, the determination function and the notification function of the forgotten baggage are expanded by performing transmission and reception of the information of the user and the information of the baggage. For example, the apparatus for managing baggage 500 can be installed at the front door to manage the baggage of all family members, and a notification of the forgotten baggage can be given to other family members through the information terminal device 600.

Figure 33A:
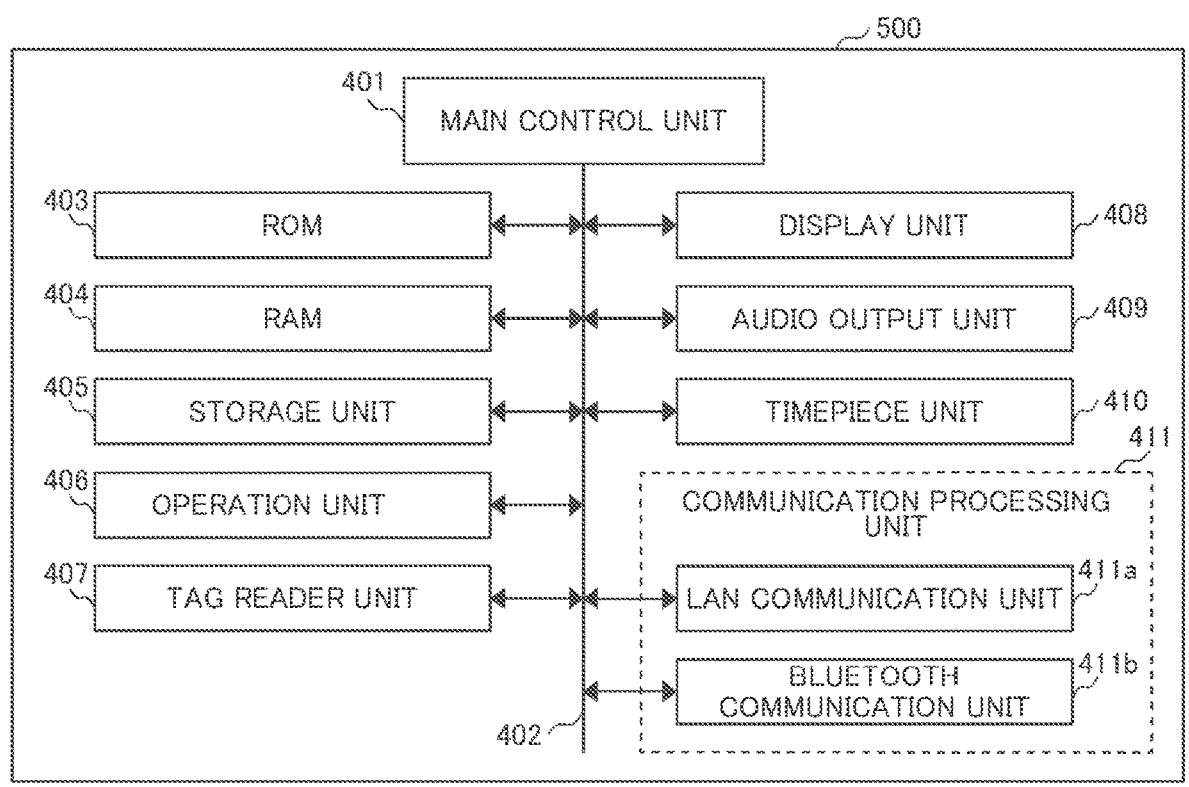
FIG. 33A is a diagram illustrating a hardware configuration of an apparatus for managing baggage in the sixth embodiment.

FIG. 33A is a diagram illustrating a hardware configuration of the apparatus for managing baggage 500. The same functional portions as those in the fifth embodiment (FIG. 17A) are denoted by the same reference numerals, and redundant description of common points is omitted. A difference from FIG. 17A lies in that a LAN communication unit 411a and a Bluetooth communication unit 411b are added as a communication processing unit 411. The communication processing unit 411 has a function similar to that of the communication processing unit 140 of FIG. 1A of the first embodiment, and thus description thereof is omitted, but instead of the LAN communication unit 411a and the Bluetooth communication unit 411b performing transmission and reception of data with the information terminal device 600, a near field communication (NFC) communication unit may be installed.

Figure 33B:
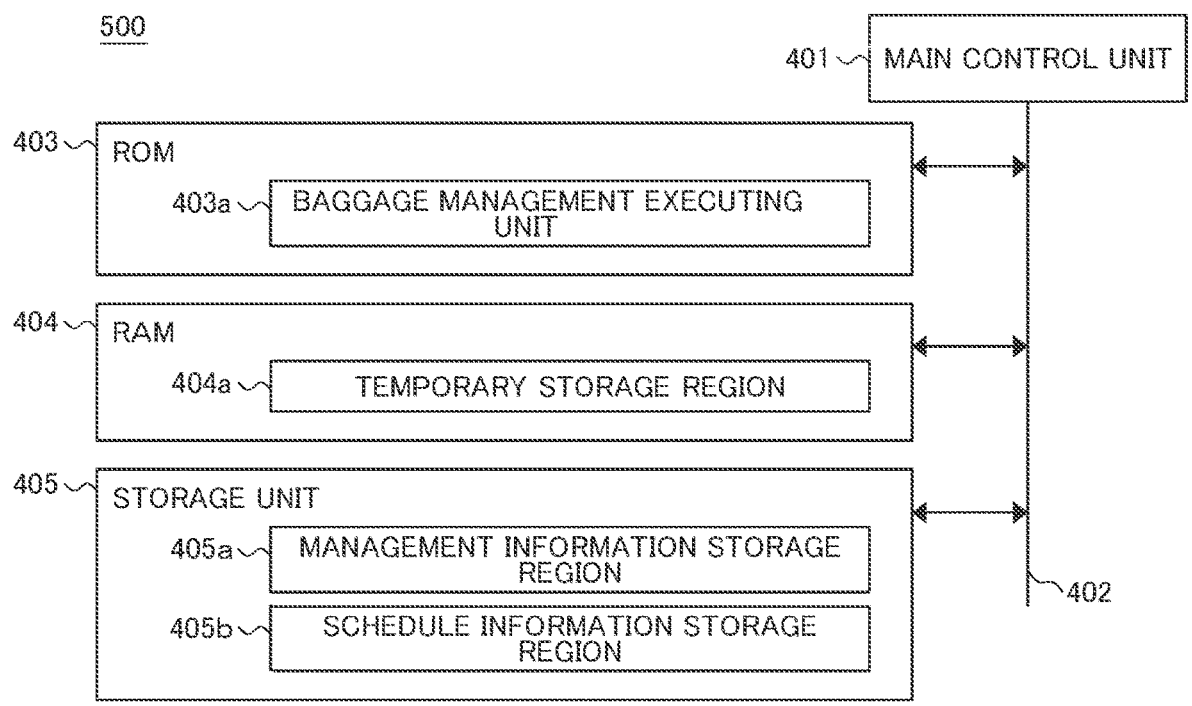
FIG. 33B is a diagram illustrating a software configuration of the apparatus for managing baggage in the sixth embodiment.

FIG. 33B is a diagram illustrating a software configuration of the apparatus for managing baggage 500 and illustrates functions of the ROM 403, the RAM 404, and the storage unit 405 in FIG. 33A. The same functional portions as those in the fifth embodiment (FIG. 17B) are denoted by the same reference numerals, and redundant description thereof is omitted. A difference from FIG. 17B lies in that the storage unit 405 has a schedule information storage region (schedule information storage unit) 405b.

Since the hardware configuration of the information terminal device 600 is similar to a configuration obtained by excluding the tag reader unit 107 from the configuration of FIG. 1A of the first embodiment, description thereof is omitted, but communication between the information terminal device 600 and the base station 203 is preferably performed in accordance with a Wideband Code Division Multiple Access (W-CDMA) (registered trademark) scheme, a Global System for Mobile Communications (GSM) (registered trademark) scheme, a Long Term Evolution (LTE) scheme, or any other communication scheme.

FIG. 34 is a diagram illustrating a software configuration of the information terminal device 600, and illustrates functions of the ROM 103, the RAM 104, and the storage unit 105. An operation of the information terminal device 600 is implemented such that a basic operation program 103a stored in the ROM 103, a notification management program 105e stored in the storage unit 105, and a schedule management program 105c are developed onto the RAM 104 and executed by a main control unit 101. Accordingly, a basic operation executing unit 104a, a notification management executing unit 104e, and a schedule management executing unit 104d are configured in the RAM 104, and various kinds of operations are controlled. Further, schedule information of the user to be managed by the apparatus for managing baggage 500 is stored in the schedule information storage region (schedule information storage unit) 105d2 of the storage unit 105. Specifically, the schedule information of the owner of the information terminal device 600 (for example, event information such as a business date and time and a lodging place) is included, but schedule information (for example, event information such as travel or shopping) of other persons (for example, a family or a child) may be included.

Figure 35:
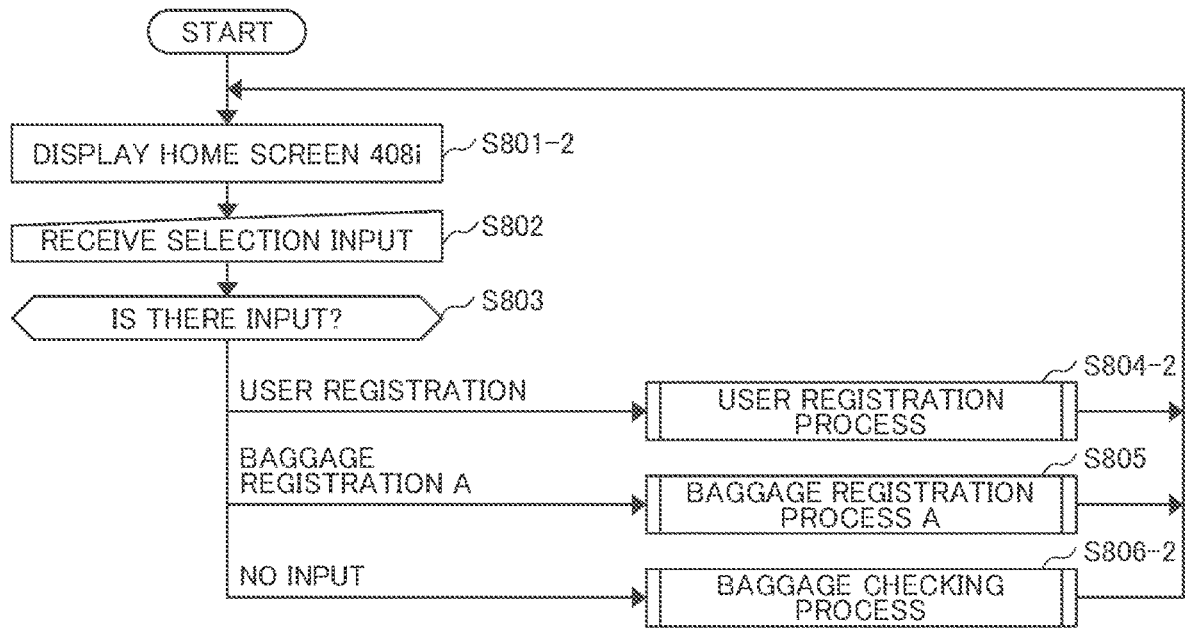
FIG. 35 is a flowchart illustrating a basic process performed by a baggage management executing unit in the sixth embodiment.

FIG. 35 is a flowchart illustrating a basic process performed by the baggage management executing unit 403a of the apparatus for managing baggage 500. The same processing portions as those in the fifth embodiment (FIG. 19) are denoted by the same reference numerals.

Figure 36:
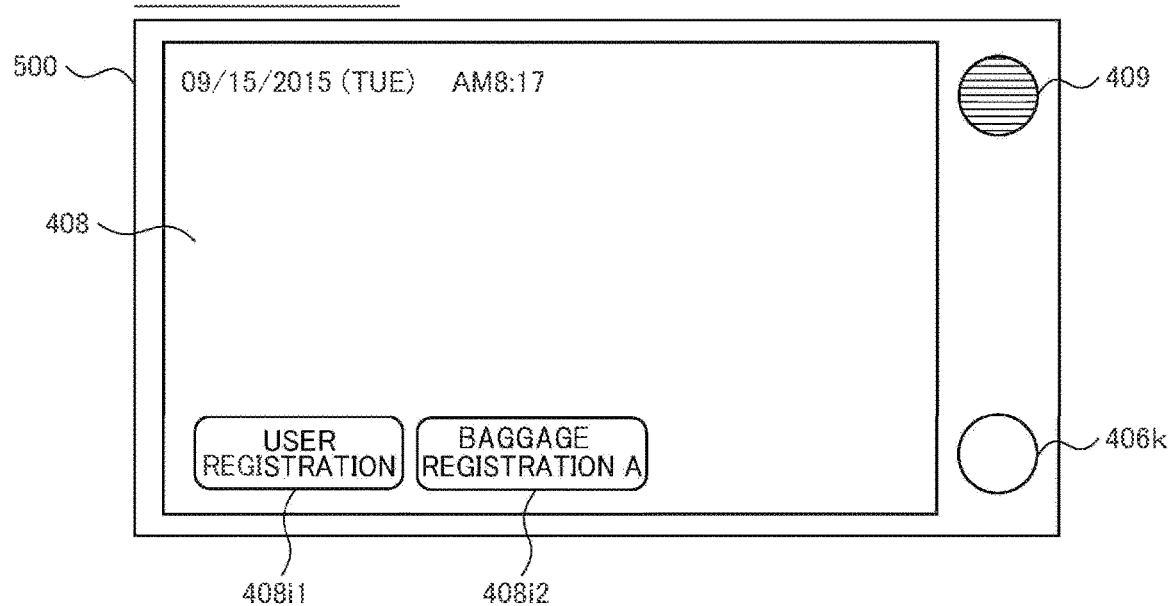
FIG. 36 is a diagram illustrating a display example of a home screen of the apparatus for managing baggage in the sixth embodiment.

In the baggage management executing unit 403a, first, a home screen 408i is displayed (S801-2). FIG. 36 is a view illustrating a display example of the home screen 408i of the apparatus for managing baggage 500. In the home screen 408i, a user registration icon 408i1 and a baggage registration A icon 408i2 are displayed as icons associated with the process executed by the baggage management. As compared with the fifth embodiment (FIG. 18), the baggage check icon 408a3 is deleted.

A selection input for the icon displayed on the home screen 408i by the tap operation or the like of the user is received (S802), and a bifurcation process is performed in accordance with the selected icon (S803). In a case in which a selection input for the user registration icon 408i1 is received, the process is bifurcated to a user registration process S804-2, and in a case in which a selection input for baggage registration A icon 408i2 is received, the process is bifurcated to a baggage registration process A S805, and in a case in which there is no selection input, the process is bifurcated to a baggage checking process S806-2. Of these, the baggage registration process A S805 is similar to that in FIG. 23, but the user registration process S804-2 and the baggage checking process S806-2 are performed in cooperation with information terminal device 600. After the respective processes of the user registration process S804-2, the baggage registration process A S805, and the baggage checking process S806-2 are executed, the process returns to S801-2, and the home screen 408i is displayed again.

Figure 37:
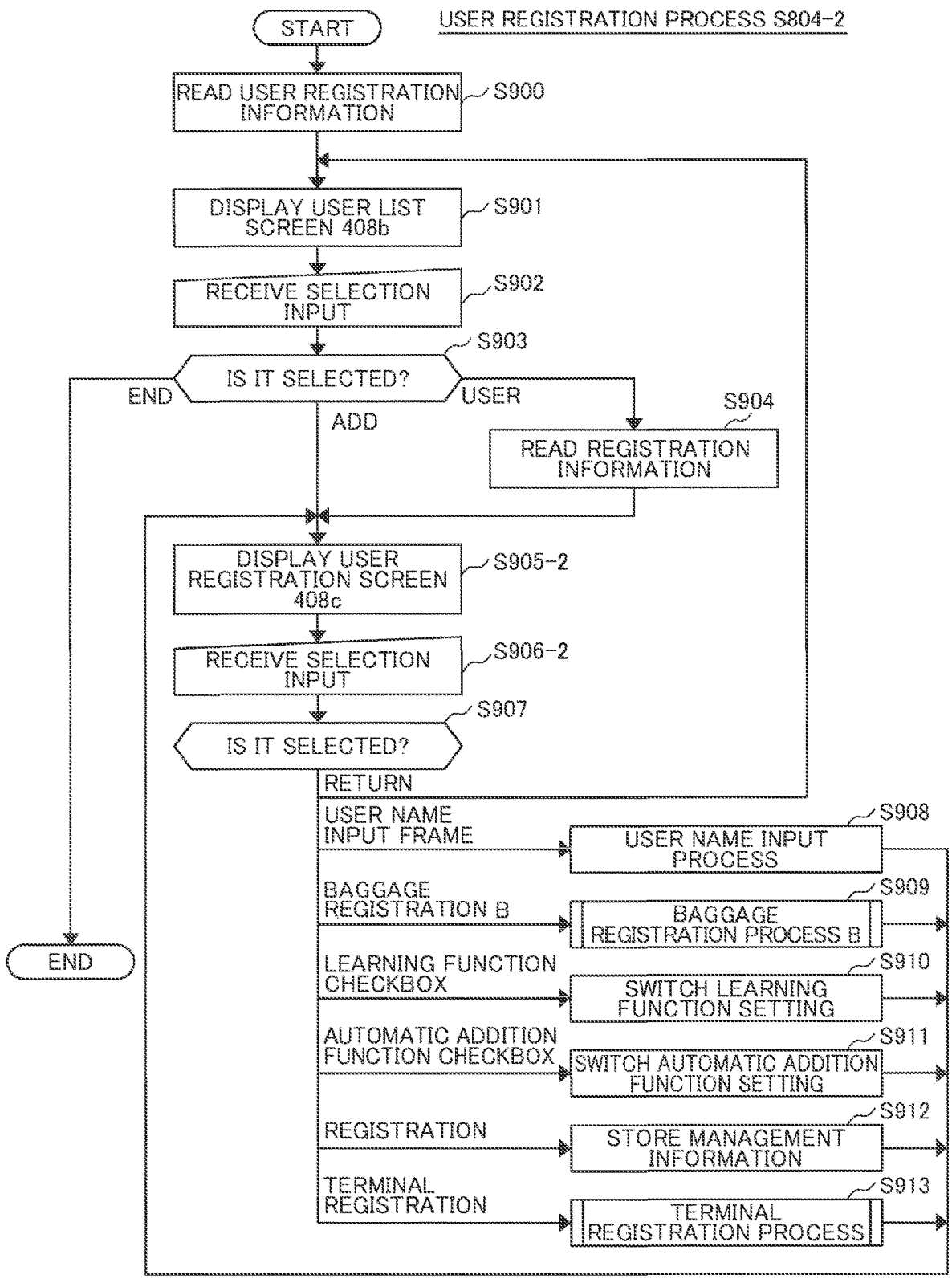
FIG. 37 is a flowchart illustrating an example of a user registration process in the sixth embodiment.

The user registration process S804-2 and the baggage checking process S806-2 will be described below. FIG. 37 is a flowchart illustrating an example of the user registration process S804-2. This corresponds to FIG. 20 of the fifth embodiment, the same processes are denoted by the same reference numerals, and new processes will be described.

Figure 38A:
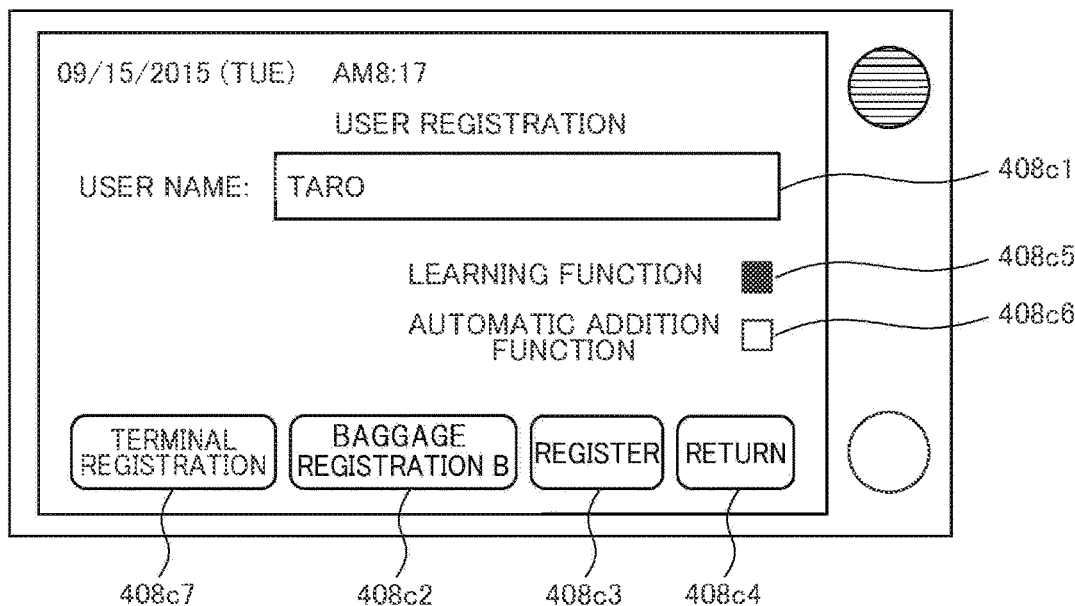
FIG. 38A is a diagram illustrating a display example of a user registration screen in the sixth embodiment.

In S905-2, a user registration screen 408c is displayed. FIG. 38A illustrates a display example of the user registration screen 408c. As compared with the user registration screen 408c of FIG. 21B, a terminal registration icon 408c7 is added.

If the terminal registration icon 408c7 is selected by the tap operation in S906-2, a terminal registration process is executed (S913). In this process, an information terminal device to cooperate for the baggage management is registered.

Figure 38B:
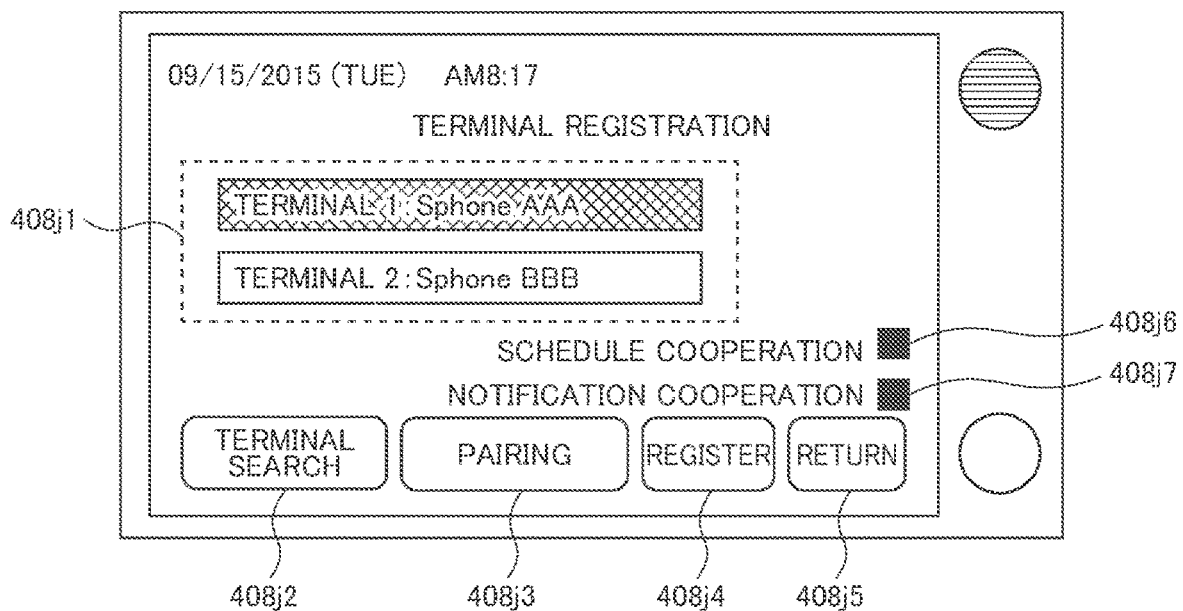
FIG. 38B illustrates a display example of a terminal registration screen in the sixth embodiment.
Figure 39:
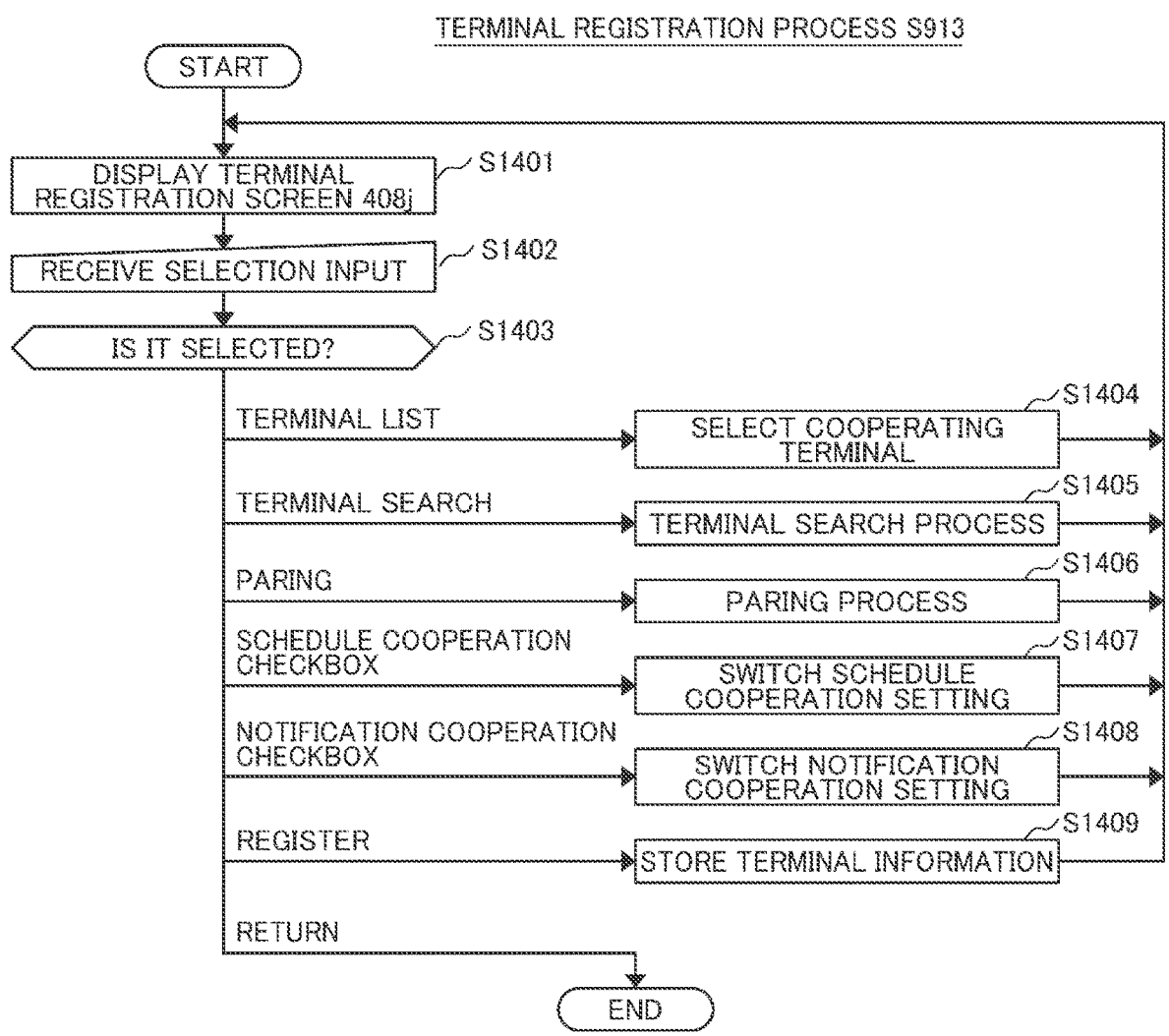
FIG. 39 is a flowchart illustrating an example of a terminal registration process in the sixth embodiment.

FIG. 39 is a flowchart illustrating an example of the terminal registration process S913. First, a terminal registration screen 408j is displayed on the display unit 408 (S1401). FIG. 38B illustrates a display example of the terminal registration screen 408j. The terminal registration screen 408j includes a terminal list 408j1 of detected information terminal devices, a terminal search icon 408j2, a pairing icon 408j3, a register icon 408j4, a return icon 408j5, a schedule cooperation checkbox 408j6, and a notification cooperation checkbox 408j7.

Then, the baggage management executing unit 403a receives a selection input for the terminal list or the icon constituting the terminal registration screen 408j by the tap operation or the like of the user (S1402) and performs a bifurcation process in accordance with the terminal list or the icon which is selected and input (S1403).

In a case in which a selection input for the information terminal device displayed in the terminal list 408j1 is received in S1402, the information terminal device that has received the selection input is selected as a target to cooperate with the apparatus for managing baggage 500, and display indicating that the information terminal device is selected is performed, for example, by inverting a display color (S1404). FIG. 38B illustrates an example in which a terminal 1 "Sphone_AAA" is selected as a target to cooperate. In a case in which the selection input for the terminal search icon 408j2 is received in S1402, the information terminal device located near the apparatus for managing baggage 500 is searched by means of Bluetooth communication, and information of the detected information terminal device is acquired (S1405). The acquired information terminal device information is displayed in the terminal list 408j1 of the terminal registration screen 408j in S1401.

In a case in which a selection input for the pairing icon 408j3 is received in S1402, a pairing process is performed by a known method such as a method of inputting the information terminal device selected as a target to cooperate in S1404 and an authentication number (S1406).

If the schedule cooperation checkbox 408j6 is selected by the tap operation S1402, switching of the ON/OFF setting of the schedule information cooperation with the paired information terminal device 600 is performed (S1407). If the notification cooperation checkbox 408j7 is selected by the tap operation in S1402, switching of the ON/OFF setting of the notification cooperation of the forgotten baggage or the like with the paired information terminal device 600 is performed (S1408).

In a case in which the selection input for register icon 408j4 is received in S1402, the information of the paired information terminal device displayed in the terminal registration screen 408j and the setting information such as the schedule cooperation are stored in the management information storage region 405a of the storage unit 405 as the baggage management information (S1409). After the process of S1404 to S1409 is executed, the process returns to S1401, and the terminal registration screen 408j is displayed again.

In a case in which the selection input for return icon 408j5 is received in S1402, the terminal registration process S913 ends.

Figure 40A:
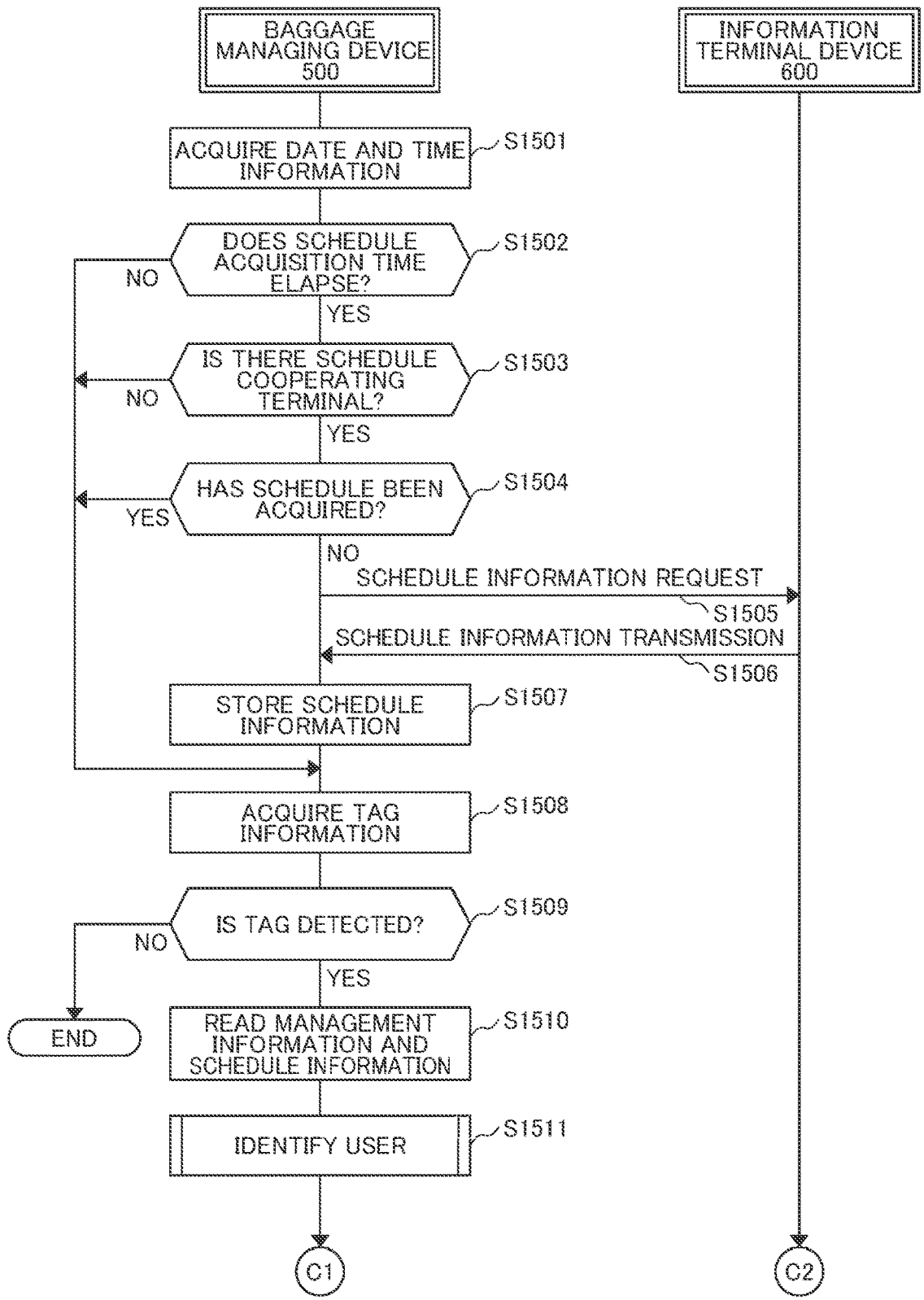
FIG. 40A is a sequence diagram (first half) illustrating an example of a baggage checking process in the sixth embodiment.
Figure 40B:
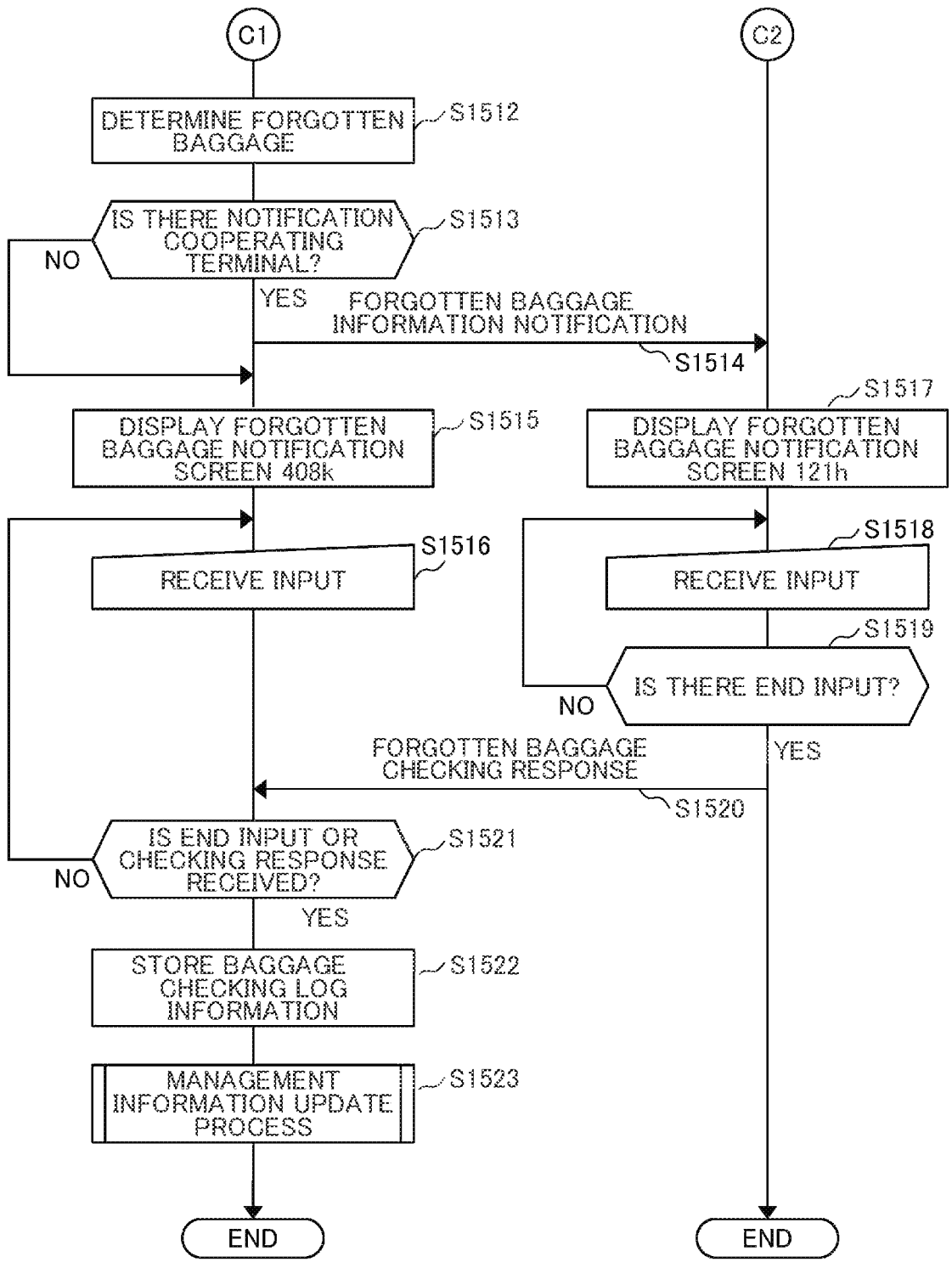
FIG. 40B is a sequence diagram (second half) illustrating an example of the baggage checking process in the sixth embodiment.
Figure 41:
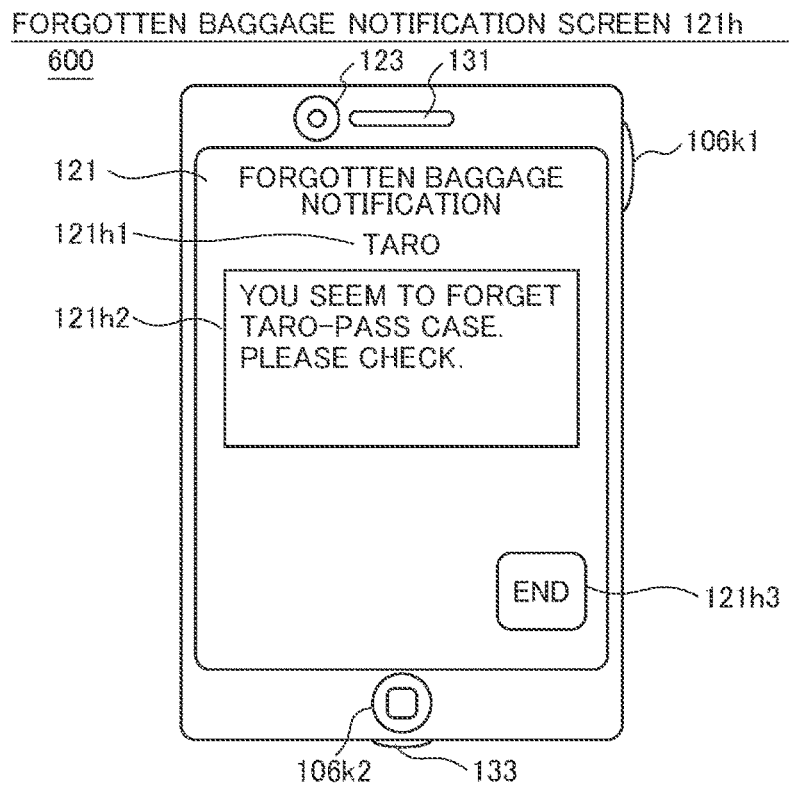
FIG. 41 is a diagram illustrating a display example of a forgotten baggage notification screen in the sixth embodiment.
Figure 42:
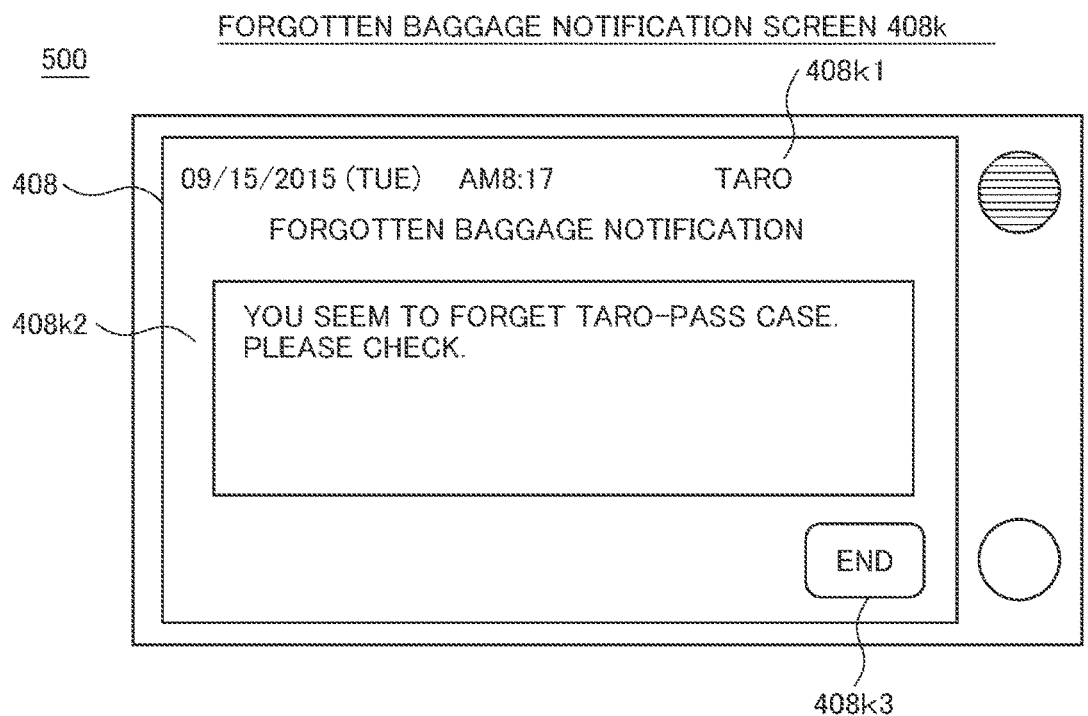
FIG. 42 is a diagram illustrating a display example of a forgotten baggage notification screen in the sixth embodiment.

FIGS. 40A and 40B are sequence diagrams illustrating an example of the baggage checking process S806-2. FIG. 40A illustrates the first half of the sequence, FIG. 40B illustrates the second half of the sequence, and the apparatus for managing baggage 500 and the information terminal device 600 perform the process in cooperation with each other. A screen being processed is illustrated in FIGS. 41 and 42.

In FIG. 40A, the apparatus for managing baggage 500 acquires the date and time information from the timepiece unit 410 (S1501) and performs a bifurcation process in accordance with whether or not a current time is a time that has passed a predetermined schedule acquisition time (S1502). As the predetermined time, for example, a time before the user goes out in a state in which the schedule of the user is fixed (for example, 4 AM) is desirable. In a case in which the predetermined time is not passed (No), the process proceeds to S1508.

In a case in which the predetermined time is passed (Yes), a bifurcation process is performed depending on whether or not there is an information terminal device that performs the schedule cooperation (S1503). In a case in which there is no information terminal device that performs the schedule cooperation (No), the process proceeds to S1508. In a case in which there is an information terminal device that performs the schedule cooperation (Yes), a bifurcation process depending on whether or not the schedule information is acquired is performed (S1504). In a case in which the schedule information is acquired (Yes), the process proceeds to S1508.

In a case in which the schedule information is determined not to be obtained in S1504 (No), an acquisition request for schedule information of a date acquired in S1501 is transmitted to the information terminal device 600 that performs the schedule cooperation (S1505). Upon receiving the request, the information terminal device 600 transmits the schedule information to the apparatus for managing baggage 500 on the basis of the schedule information stored in the schedule information storage region 105d2 of the storage unit 105 (S1506). The apparatus for managing baggage 500 stores the received schedule information in the schedule information storage region 405b of the storage unit 405 (S1507).

In S1508, the tag information of the radio tag 300 of the baggage located near the apparatus for managing baggage 500 is read by the tag reader unit 407, and a bifurcation process depending on whether or not the radio tag is detected (the tag information can be read) is performed (S1509). In a case in which the radio tag is unable to be detected (No), the baggage checking process S806-2 ends. In a case in which the radio tag is detected (Yes), the baggage management information is read from the management information storage region 405a of the storage unit, and the schedule information is read from the schedule information storage region 405b (S1510). An example of the read baggage management information is illustrated in FIG. 26, and the baggage for each day of the week and baggage on the business trip day are set in a carrying condition setting 11e. Thereafter, a user identification processing is performed on the basis of the read tag information and the baggage management information (S1511). The user identification process will be described later in detail with reference to FIG. 43.

Then, in FIG. 40B, the apparatus for managing baggage 500 performs the forgotten baggage determination on the basis of the read tag information, the baggage management information, and the schedule information (S1512). In other words, the baggage in which the carrying condition setting of the day of the week of the date and time information acquired in S1501 is a flag "1" or the baggage in which the carrying condition setting of a business trip day is a flag "1" in a case in which a corresponding day is the business trip day in accordance with the schedule information is compared with the baggage of the radio tag read in S1508 with reference to the baggage management information related to the user identified in S1511. Then, the baggage which are not included in the baggage of the read radio tag among the baggage of the flag "1" are determined as the forgotten baggage.

Then, a bifurcation process is performed in accordance with whether or not there is an information terminal device that performs the notification cooperation (S1513). In a case in which there is an information terminal device that performs the notification cooperation (Yes), a notification of the forgotten baggage information is given to the information terminal device 600 (S1514). The notification management executing unit 104e of the information terminal device 600 displays a forgotten baggage notification screen 121h to give a notification indicating the presence or absence of the forgotten baggage to the user on the basis of the received forgotten baggage information (S1517). FIG. 41 illustrates a display example of the forgotten baggage notification screen 121h. The forgotten baggage notification screen 121h includes an identified user name 121h1, a notification message 121h2 including an item name of a forgotten baggage, and an end icon 121h3.

Then, a selection input for the end icon 121h3 constituting the forgotten baggage notification screen 121h by user tap operation or the like is received (S1518), and a bifurcation process is performed in accordance with the selection input (S1519). In a case in which the selection input for the end icon 121h3 is not received in S1518 (No), the process returns to S1518, and the selection input is received again. In a case in which the selection input for the end icon 121h3 is received in S1518 (Yes), a confirmation response to the forgotten baggage notification is transmitted to the apparatus for managing baggage 500 (S1520).

In a case in which there is no information terminal device that performs the notification cooperation in S1513 (No), a forgotten baggage notification screen 408k is displayed on the display unit 408 of the apparatus for managing baggage 500 to give a notification indicating the presence/absence of the forgotten baggage (S1515). FIG. 42 illustrates a display example of the forgotten baggage notification screen 408k. The forgotten baggage notification screen 408k includes a notification message 408k2 including an identified user name 408k1, a forgotten baggage item name, and an end icon 408k3.

Then, a selection input for the end icon 408k3 constituting the forgotten baggage notification screen 408k by the tap operation or the like of the user is received (S1516). In the bifurcation process S1521, in a case in which the selection input for end icon 408k3 is not received in S1516 or in a case in which the confirmation response to the forgotten baggage notification is not received from the information terminal device 600 (No), the process returns to S1516. In a case in which the selection input for the end icon 408k3 is received in S1516 or in a case in which the confirmation response to the forgotten baggage notification is received from the information terminal device 600 (Yes), the baggage checking log information is generated for each identified user name and stored in the management information storage region 405a of the storage unit (S1522). An example of the baggage checking log information to be stored is illustrated in FIG. 28, and the number of carryings of baggage or the like on the day of the week and on the business trip day is described.

In S1523, a management information update process is executed. In the management information update process, baggage determined to be unregistered are automatically registered, and it is automatically set whether or not it is necessary to carry the baggage through the learning function. The baggage management information update process is similar to that in FIG. 31. As a result, the baggage checking process S806-2 ends, the process returns to S801-2 of FIG. 35, and the home screen 408i is displayed.

According to the baggage checking process of the present embodiment, the apparatus for managing baggage 500 and the information terminal device 600 can determine the forgotten baggage in cooperation with each other and give a notification to the user. At that time, since the schedule information of the user can be acquired from the information terminal device 600, and the notification of the forgotten baggage can be given to the information terminal device 600, the management function is improved.

In the above embodiment, in a case in which there is no information terminal device that performs the notification cooperation in S1513 (No), the forgotten baggage notification screen 408k is displayed in the display unit 408 of the apparatus for managing baggage 400, but even in a case in which there is an information terminal device that performs the notification cooperation in S1513 (Yes), the forgotten baggage notification screen 408k may be similarly displayed on the display unit 408 of the apparatus for managing baggage 500.

Figure 43:
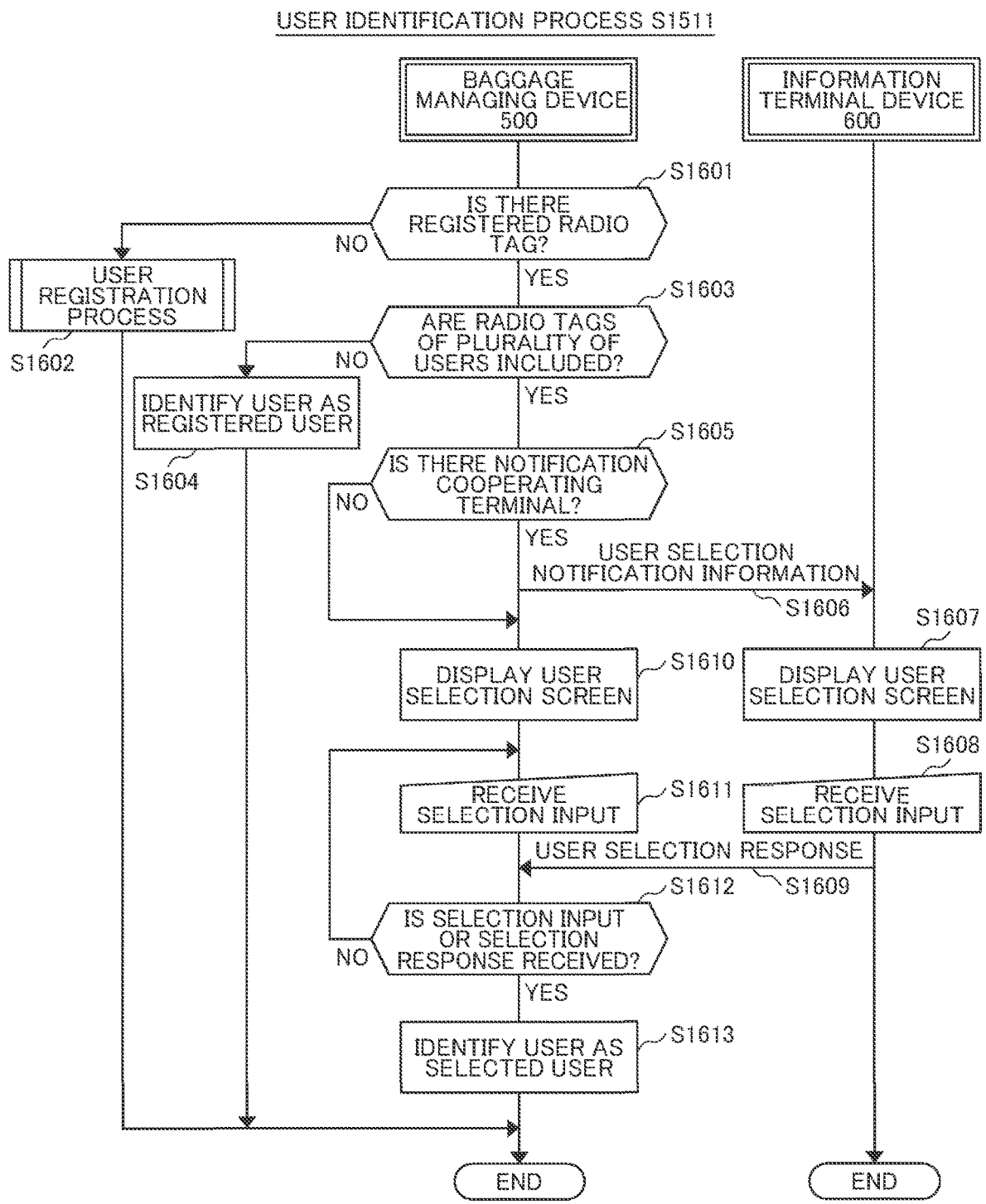
FIG. 43 is a sequence diagram illustrating an example of a user identification process in the sixth embodiment.

FIG. 43 is a sequence diagram illustrating an example of the user identification process S1511. This process is also performed in cooperation with the information terminal device 600.

First, the apparatus for managing baggage 500 performs a bifurcation process depending on whether or not there is a registered radio tag in the read radio tag (S1601).

In a case in which there is a registered radio tag among the read radio tags (Yes), a bifurcation process is performed in accordance with whether or not the radio tags of a plurality of users are included in the read radio tags (S1603). In a case in which only the radio tag of one user is included (No), it is determined that the user performing the baggage checking through the apparatus for managing baggage 400 is determined to be the user in which the read radio tag is registered (S1604).

In a case in which the radio tags of a plurality of users are included in the red radio tags (Yes), a bifurcation process is performed depending on whether or not there is an information terminal device that performs the notification cooperation (S1605). In a case in which there is an information terminal device that performs the notification cooperation (Yes), the user selection notification information is transmitted to the information terminal device 600 (S1606). The notification management executing unit 104e of the information terminal device 600 displays a user selection screen for selecting the user on the basis of the received user selection notification information (S1607). In the display unit 121 of the information terminal device 600, a user selection screen similar to that of FIG. 30 is displayed, and a list of users corresponding to the read radio tags is displayed. The selection input for the user list displayed by the tap operation or the like of the user is received (S1608), and a user selection response is transmitted to the apparatus for managing baggage 500 (S1609).

In a case in which there is no information terminal device that performs the notification cooperation in S1605 (No), the user selection screen for selecting the user is displayed on display unit 408 of the apparatus for managing baggage 500 (S1610). The user selection screen at that time is similar to that in FIG. 30. The selection input for the user list displayed by the tap operation or the like of the user is received (S1611). In bifurcation process S1612, in a case in which the input of the user selection is not received in S1611 or in a case in which the user selection response is not received from the information terminal device 600 (No), the process returns to S1611. In a case in which the input of the user selection is received in S1611 or in a case in which the user selection response is received from the information terminal device 600 (Yes), the user of the selected user name is determined to perform the baggage checking through the apparatus for managing baggage 500 (S1613).

In a case in which there is no registered radio tag among the read radio tags in S1601 (No), a user registration process is performed (S1602). In the user registration process S1602, the same process as the user registration process illustrated in FIG. 20 is performed. Accordingly, the user list screen 408*b* illustrated in FIG. 21A is displayed, and if the user is registered, the user name displayed in the list is selected, and in the user registration screen 408*c* of FIG. 21B, the baggage registration B icon 408*c*2 is selected, and the baggage are registered. In a case in which the user is not registered, the add icon 408*b*2 is selected in the user list screen 408*b* of FIG. 21A, and in the user registration screen 408*c* of FIG. 21B, the user name or the like is received, the baggage registration B icon 408*c*2 is selected, and the baggage are registered.

With the above process, it is possible to determine the user who performs the baggage checking. In the above embodiment, in a case in which there is no information terminal device that performs the notification cooperation in S1605 (No), the user selection screen for selecting the user is displayed in the display unit 408 of the apparatus for managing baggage 400, but in a case in which there is an information terminal device that performs the notification cooperation in S1605 (Yes), the user selection screen for selecting the user may be similarly displayed on the display unit 408 of the apparatus for managing baggage 500.

Accordingly to the carrying management system described above, the apparatus for managing baggage is installed, for example, at the front door, and thus it is possible to read the radio tag information when the user passes through the front door and display the notification of the forgotten baggage notification on the cooperating information terminal device for each day of the week or each event. In other words, when an information terminal device of a parent is registered as a forgotten baggage notification cooperation terminal of a child, for example, it is possible to give a notification to the information terminal device of the parent when the child forgets carrying the baggage when going to school. Further, even in a case in which a businessman should carry objects different from ordinary objects on the business trip, if the businessman carries the information terminal device in which the schedule information such as the business trip is registered, it is possible to automatically determine the forgotten baggage associated with the business trip.

In the above embodiments, the following modifications can be made. In the above example, the schedule information of the user is acquired from the information terminal device, but the schedule information of the user may be stored in a server connected to the wide area public network 201 such as the Internet, and the schedule information may be acquired through the LAN communication unit 411*a*. Further, when the forgotten baggage notification screen 408*k* or 121*h* is displayed, a warning sound may be output from the audio output unit 409 of the apparatus for managing baggage or the audio output unit 131 of the information terminal device. Accordingly, even in a case in which the user forgets the information terminal device registered as the notification cooperation terminal, it is possible to give a notification indicating that it is forgotten to carry using a sound. Further, the notification may be given from the apparatus for managing baggage to a cooperating wristwatch type information terminal device by means of Bluetooth communication or the like. Further, the information terminal device that performs the schedule cooperation and the information terminal device that performs the notification cooperation may be separately registered. Further, a plurality of information terminal devices that perform the notification cooperation may be registered.

According to the present embodiment, the notification of the baggage checking result by the apparatus for managing baggage can be given to the information terminal device that cooperates with the apparatus for managing baggage. Further, since the forgotten baggage can be determined on the basis of the schedule information of the user obtained from the information terminal device, it is possible to further expand the baggage management function.

A configuration, a function, and the like of each embodiment described above may be implemented by hardware by designing some or all of them, for example, with an integrated circuit. Alternatively, a microprocessor unit or the like may be realized by software by interpreting and executing a program of implementing each function or the like. Hardware and software may be used in combination. Further, control lines or information lines illustrated in the drawings indicate lines considered to be necessary for the sake of description and do not necessarily indicate all the control lines or the information lines on a product. In practice, almost all the structures are considered to be connected with one another.

The exemplary embodiments of the present invention have been described above, but the present invention is not limited to the above-described embodiments but includes various modified examples. For example, the above-described embodiments have been described in detail in order to facilitate understanding of the present invention and are not necessarily limited to those having all the components described above. For example, it is possible to replace a part of a configuration of a certain embodiment with a configuration of another embodiment, and it is also possible to add a configuration of another embodiment to a configuration of a certain embodiment. It is also possible to perform addition, deletion, and replacement of configurations of other embodiments on a part of the configurations of each embodiment.

REFERENCE SIGNS LIST

100 baggage managing device
101 main control unit 102 system bus
103 ROM
104 RAM
104*a* basic operation executing unit
104*b* baggage management function executing unit
104*c* position information acquisition executing unit
104*d* schedule management executing unit
105 storage unit
106 operation unit
107 tag reader unit
110 sensor unit
120 video processing unit
121 display unit
130 audio processing unit
140 communication processing unit
104*e* notification management executing unit
105*e* notification management program
105*d*2 schedule information storage region (schedule information storage unit)
300 radio tag
400, 500 baggage managing device
403*a* baggage management executing unit
405*a* management information storage region (management information storage unit)
405*b* schedule information storage region (schedule information storage unit)
407 tag reader unit (tag information reading unit)
410 timepiece unit
411 communication processing unit
4050 baggage management information
4051 baggage checking log information
600 information terminal device

The invention claimed is:

1. An apparatus for managing baggage, comprising:
a reader that reads tag information of a radio tag installed in a baggage;
a storage that stores the tag information read by the reader; and
a controller that determines whether there is a forgotten baggage by collating the tag information,
wherein the controller controls the reader to read the tag information of the radio tag installed in the baggage as first tag information when leaving from a first position or arriving at a second position,
wherein the controller controls the reader to read the tag information as second tag information when moving out of a predetermined range from the second position,
wherein the controller compares the first tag information with the second tag information, and determines whether there is the forgotten baggage.

2. The apparatus for managing baggage according to claim 1, further comprising:
a signal receiver that acquires a position calculation signal; and
a position information acquiring unit that acquires position information indicating the first position or the second position from the position calculation signal received by the signal receiver,
wherein the storage stores the position information acquired by the position information acquisition unit.

3. The apparatus for managing baggage according to claim 2, further comprising:
a transceiver that performs transmission and reception of information with an external device;
wherein the controller notifies that there is the forgotten baggage to the external device via the transceiver when it is determined that there is the forgotten baggage.

4. The apparatus for managing baggage according to claim 1, further comprising:
a schedule information acquiring unit that acquires schedule information; and
a moving destination position information acquiring unit that acquires moving destination position information indicating the second position from the schedule information acquired by the schedule information acquiring unit,
wherein the storage stores the moving destination position information acquired by the moving destination position information acquiring unit.

5. The apparatus for managing baggage according to claim 4, further comprising:
a transceiver that performs transmission and reception of information with an external device;
wherein the controller notifies that there is the forgotten baggage to the external device via the transceiver when it is determined that there is the forgotten baggage.

6. The apparatus for managing baggage according to claim 1, further comprising:
a transceiver that performs transmission and reception of information with an external device;
wherein the controller notifies that there is the forgotten baggage to the external device via the transceiver when it is determined that there is the forgotten baggage.

7. A method for managing baggage, comprising:
a first tag information reading process of reading the tag information of a radio tag installed in a baggage as first tag information when leaving from a first position or arriving at a second position,
a process of storing the tag information read by the first tag information reading process;
a second tag information reading process of reading the tag information of the radio tag installed in the baggage as second tag information when moving out of a predetermined range from the second position, and
a process of comparing the first tag information with the second tag information and determining whether there is a forgotten baggage.

8. The baggage managing method according to claim 7, further comprising:
a position information acquisition process of acquiring position information indicating the first position or the second position; and;
a process of storing the position information acquired in the position information acquisition process.

9. The baggage managing method according to claim 8, further comprising:
a process of notifying of the forgotten baggage to an external device when it is determined that there is the forgotten baggage.

10. The baggage managing method according to claim 7, further comprising:
a schedule information acquisition process of acquiring schedule information;
a moving destination position information acquisition process of acquiring moving destination position information indicating the second position from the schedule information acquired in the schedule information acquisition process; and
a process of storing the moving destination position information.

11. The baggage managing method according to claim 10, further comprising:

a process of notifying of the forgotten baggage to an external device when it is determined that there is the forgotten baggage.

12. The baggage managing method according to claim 7, further comprising:
a process of notifying of the forgotten baggage to an external device when it is determined that there is the forgotten baggage.

\* \* \* \* \*